US009557482B2

(12) United States Patent
Oka et al.

(10) Patent No.: US 9,557,482 B2
(45) Date of Patent: Jan. 31, 2017

(54) HIGH-ORDER POLARIZATION CONVERSION DEVICE, OPTICAL WAVEGUIDE DEVICE, AND DP-QPSK MODULATOR

(71) Applicant: Fujikura Ltd., Tokyo (JP)

(72) Inventors: Akira Oka, Sakura (JP); Kazuhiro Goi, Sakura (JP); Kensuke Ogawa, Sakura (JP); Hiroyuki Kusaka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/976,603

(22) Filed: Dec. 21, 2015

(65) Prior Publication Data
US 2016/0178841 A1 Jun. 23, 2016

Related U.S. Application Data

(63) Continuation of application No. PCT/JP2014/066846, filed on Jun. 25, 2014.

(30) Foreign Application Priority Data

Jun. 27, 2013 (JP) ................................. 2013-135490

(51) Int. Cl.
*G02B 6/00* (2006.01)
*G02B 6/10* (2006.01)
(Continued)

(52) U.S. Cl.
CPC .............. *G02B 6/126* (2013.01); *G02B 6/105* (2013.01); *G02B 6/1228* (2013.01); *G02B 6/2726* (2013.01); *G02B 6/2766* (2013.01); *G02B 2006/12038* (2013.01); *G02B 2006/12061* (2013.01)

(58) Field of Classification Search
None
See application file for complete search history.

(56) References Cited

U.S. PATENT DOCUMENTS 5,694,496 A * 12/1997 Ando ................. C08G 73/1039
385/11
5,933,554 A * 8/1999 Leuthold ............... G02F 1/3517
385/14
(Continued)

FOREIGN PATENT DOCUMENTS

JP  2013-125276 A  6/2013
JP  2013-171186 A  9/2013
(Continued)

OTHER PUBLICATIONS

Daoxin Dai, et al., "Novel concept for ultracompact polarization splitter-rotator based on silicon nanowires", Optics Express, 2011, pp. 10940-10949, vol. 19, No. 11.
(Continued)

*Primary Examiner* — Uyen Chau N Le
*Assistant Examiner* — Chris Chu
(74) *Attorney, Agent, or Firm* — Sughrue Mion, PLLC

(57) ABSTRACT

A high-order polarization conversion device configured of a planar optical waveguide, includes: a substrate; a lower clad disposed on the substrate; a core including a lower core and an upper core, the lower core being disposed on the lower clad and having a fixed height in a rectangular sectional shape, the upper core being formed of the same material as the lower core and having a fixed height in a rectangular sectional shape that is disposed continuously on the lower core; and an upper clad that is disposed on the core and the lower clad and is formed of the same material as the lower clad. The high-order polarization conversion device performs high-order polarization conversion between $TE_1$ of the start portion and $TM_0$ of the end portion.

10 Claims, 45 Drawing Sheets

(51) Int. Cl.
   G02B 6/126    (2006.01)
   G02B 6/122    (2006.01)
   G02B 6/27     (2006.01)
   G02B 6/12     (2006.01)

(56) References Cited

U.S. PATENT DOCUMENTS

| | | | |
|---|---|---|---|
| 6,944,192 B2* | 9/2005 | Prassas | H01S 3/063 372/6 |
| 2004/0202440 A1* | 10/2004 | Gothoskar | G02B 6/1228 385/129 |
| 2005/0152649 A1* | 7/2005 | Benisty | B82Y 20/00 385/50 |
| 2013/0011093 A1 | 1/2013 | Goh et al. | |
| 2013/0156361 A1* | 6/2013 | Kojima | G02B 6/14 385/11 |
| 2013/0216175 A1 | 8/2013 | Onishi | |
| 2014/0126855 A1 | 5/2014 | Onishi | |

FOREIGN PATENT DOCUMENTS

| | | |
|---|---|---|
| JP | 2014-092759 A | 5/2014 |
| WO | 2011-114753 A1 | 9/2011 |

OTHER PUBLICATIONS

Daoxin Dai, et al., "Mode conversion in tapered submicron silicon ridge optical waveguides", Optics Express, 2012, pp. 13425-13439, vol. 20, No. 12.

Kazuhiro Goi, et al., "20-Gbps BPSK silicon Mach-Zehnder modulator with excellent chirp-free performance", OECC, 2012, pp. 238-239, vol. 4D3-5.

P. Dong, et al., "112-Gb/s Monolithic PDM-QPSK Modulator in Silicon", European Conference and Exhibition on Optical Communication, Jun. 16, 2012, vol. 1, pp. Th. 3.B.1.

C. R. Doerr, et al., "Packaged Monolithic Silicon 112-Gb/s Coherent Receiver", IEEE Photonics Technology Letters, 2011, pp. 762-764, vol. 23, No. 12.

Qing Fang, et al., "Suspended optical fiber-to-waveguide mode size converter for silicon photonics", Optics Express, 2010, pp. 7763-7769, vol. 18, No. 8.

Hiroshi Fukuda, et al., "Silicon photonic circuit with polarization diversity", Optics Express, 2008, pp. 4872-4880, vol. 16, No. 7.

Wangqing Yuan, et al., "Mode-evolution-based polarization rotator-splitter design via simple fabrication process", Optics Express, 2012, pp. 10163-10169, vol. 20, No. 9.

Yu Wakabayashi, et al., "A polarization converter using an L-figured Si wire waveguide", IEICE Technical Report (OPE2010-73), Aug. 19, 2010, pp. 103-108, vol. 110, No. 181.

Wesley D. Sacher, et al., "Silicon-on-Insulator Polarization Splitter-Rotator Based on TM0-TE1 Mode Conversion in a Bi-level Taper", Technical Digest, CLEO: 2013, Jun. 2013, pp. 1-2.

Welsey D. Sacher, et al., "Polarization rotator-spliters in standard active silicon photonics platforms", Optics Express, 2014, pp. 3777-3786, vol. 22, No. 4.

Notice of Allowance for Application No. 2014-552239 dated Mar. 17, 2015.

Communication dated Oct. 10, 2016 from the State Intellectual Property Office of the P.R.C. in counterpart application No. 201480035844.8.

* cited by examiner

HIGH-ORDER POLARIZATION CONVERSION DEVICE, OPTICAL WAVEGUIDE DEVICE, AND DP-QPSK MODULATOR

CROSS REFERENCE TO RELATED APPLICATIONS

This application is a continuation application based on a PCT Patent Application No. PCT/JP2014/066846, filed Jun. 25, 2014, whose priority is claimed on Japanese Patent Application No. 2013-135490, filed on Jun. 27, 2013, the entire content of which are hereby incorporated by reference.

BACKGROUND OF THE INVENTION

Field of the Invention

The present invention relates to a planar optical waveguide device used in, for example, optical fiber communication, and in particular, to a high-order polarization conversion device for performing polarization conversion, an optical waveguide device, and a DP-QPSK modulator.

Description of the Related Art

Currently, the amount of information transmitted by optical communication has been increasing with the spread of high-speed Internet access services, smartphones, and the like. In order to respond to such an increase in the amount of information, measures have been taken increase signal speed, increase the number of channels due to wavelength multiplexing communication, and the like. In particular, in the next generation of digital coherent transmission technology with transmission speeds of 100 Gbps (gigabits per second) for high-speed information communication, in order to double the amount of information per unit time, a polarization multiplexing scheme for carrying information in each of two polarized waves having electric fields perpendicular to each other is used. However, in modulation schemes for high-speed communication including the polarization multiplexing scheme, the structure of optical circuit components that form an optical modulator is complicated. For this reason, problems, such as increases in device size and cost, occur.

In addition, the required number of optical circuit components, such as a transceiver, increases with an increase in the amount of information transmitted by optical communication. Therefore, in order to increase the number of optical circuit components in a limited space, miniaturization and high-density integration of optical elements forming an optical circuit component are required.

In order to solve such problems, an optical circuit component (light modulator or the like) having a planar optical waveguide using silicon (silicon optical waveguide), which is advantageous in terms of easy processing, size reduction by integration, and cost reduction by mass production, has been studied and developed.

The silicon optical waveguide is a so-called large relative refractive index difference optical waveguide in which a silicon based material (Si, $Si_3N_4$, or the like) having a large refractive index is used for the core and a material ($SiO_2$, air, $Si_3N_4$, or the like) having a large refractive index difference with respect to the core is used for a clad. If the relative refractive index difference is large, the confinement of light in the core is increased. Accordingly, since sharp bending becomes possible, it is suitable for the miniaturization and high-density integration of optical elements.

However, the polarization multiplexing in the planar optical waveguide has the following problems. In general, the planar optical waveguide has a shape in which a width direction parallel to the substrate and a height direction perpendicular to the substrate are asymmetric. For this reason, in two types of polarization modes of a mode substantially having only an electric field component in the width direction (hereinafter, referred to as a TE mode) and a mode substantially having only an electric field component in the height direction (hereinafter, referred to as a TM mode), the characteristics, such as an effective refractive index, are different. In these modes, a fundamental TE mode ($TE_0$) and a fundamental TM mode ($TM_0$) are used in many cases. Here, $TE_0$ refers to a mode having the largest effective refractive index of the TE modes. In addition, $TM_0$ refers to a mode having the largest effective refractive index of the TM modes.

It is difficult to perform an optical modulation operation for these modes having different characteristics with a single planar optical waveguide device. When a planar optical waveguide device optimized for each mode is required, a lot of effort is required in terms of the development of the planar optical waveguide devices.

As a method for solving this problem, a method can be mentioned in which $TE_0$ is used as light incident on a desired planar optical waveguide device optimized for $TE_0$ and the output is polarization-converted to $TM_0$. The polarization conversion herein indicates a conversion from $TE_0$ to $TM_0$ or a conversion from $TM_0$ to $TE_0$. In order to perform the operation described above, a planar optical waveguide device for performing polarization conversion on the substrate is required.

As a technique of performing such polarization conversion on the substrate, there is a method of converting $TE_0$ to a high-order TE mode ($TE_1$) and then converting $TE_1$ to $TM_0$. Here, $TE_1$ indicates a TE mode having the second largest effective refractive index. Since $TE_1$ has an electric field component in the same direction as $TE_0$, the conversion can be realized by using a directional coupler that can be manufactured through a simple process, such as arranging rectangular optical waveguides in parallel. Therefore, if the device that converts $TE_1$ to $TM_0$ is realized, it is possible to perform polarization conversion through $TE_1$.

In general, since the silicon optical waveguide has a large birefringence, the silicon optical waveguide has strong polarization dependence. For example, when $TE_0$ and $TM_0$ are input to an optical element, the characteristics of the optical element are significantly different. In order to solve this problem, a polarization diversity scheme to input the same mode to the optical element using a polarization conversion device for converting $TM_0$ into $TE_0$ (or vice versa) is used. Therefore, in order to perform miniaturization and high-density integration of optical elements, a small polarization conversion device is essential.

As a technique for the polarization conversion device using a silicon optical waveguide, a method of converting $TE_0$ to $TE_1$ and then converting $TE_1$ to $TM_0$ has been proposed.

As a technique for performing polarization conversion using such conversion between $TE_1$ and $TM_0$ (hereinafter, referred to as high-order polarization conversion) on the planar optical waveguide, Daoxin Dai and John E. Bowers, "Novel concept for ultracompact polarization splitter-rotator based on silicon nanowires," Optics Express, Vol. 19, No. 11, pp. 10940 (2011) (hereinafter, referred to as NPL 1) can be mentioned.

An example thereof is shown in FIGS. 2(a) and 2(b) in NPL 1.

The optical waveguide device disclosed in NPL 1 is configured to include a directional coupler portion (coupling portion) and a tapered optical waveguide portion (tapered portion), and has a structure in which the emission end of the coupling portion is connected to the tapered portion. The coupling portion converts $TE_0$ to $TE_1$, and the tapered portion is a planar optical waveguide device that converts $TE_1$ to $TM_0$. The sectional distribution perpendicular to the guiding direction of the refractive index of the optical waveguide used in the two portions is shown in the graphs of FIGS. 1(a) and 1(c) in NPL 1. A rectangular portion called a core, a lower clad that is located below the core and has a lower refractive index than the core, and an upper clad that has a lower refractive index than the core and covers a different core from the lower clad are shown in these diagrams.

In FIGS. 1(a) and 1(c) in NPL 1, the graph of the effective refractive index with respect to the core width is shown. The core is formed of Si and has a refractive index of 3.455, the lower clad is formed of $SiO_2$ and has a refractive index of 1.445, and the upper clad is formed of air (refractive index is 1.0) or $Si_3N_4$ (refractive index is 2.0). The height of the core is set to 220 nm.

In addition, the graph of the effective refractive index of the optical waveguide having a vertically symmetric refractive index sectional shape, in which the upper clad and the lower clad have the same refractive index is shown in FIG. 1(b) in NPL 1.

As can be seen from these diagrams, when the refractive index section has a vertically asymmetric refractive index sectional structure, in the graph of a change in the effective refractive index of each mode with respect to a change in the width direction, points of degenerate $TE_1$ and $TM_0$ are separated from each other in a waveguide having a vertically symmetric refractive index sectional structure.

For example, in the graph of FIG. 1(a) in NPL 1, near the waveguide width of 0.7 μm, as the waveguide width increases, a change from $TM_0$ (fundamental TM mode) to $TE_1$ (high-order TE mode) is shown in a mode having the second highest effective refractive index, and a change from $TE_1$ (high-order TE mode) to $TM_0$ (fundamental TM mode) is shown in a mode having the third highest effective refractive index. Accordingly, since $TE_1$ and $TM_0$ are continuously connected to each other in the effective refractive index curve shape, it is possible to perform high-order polarization conversion with low loss by gently changing the waveguide width. Using this phenomenon, high-order polarization conversion is performed by forming the tapered portion in the polarization conversion device described above in a tapered structure in which the waveguide width is gently changed in the range of conversion from $TE_1$ to $TM_0$.

Daoxin Dai, Yongbo Tang, and John E Bowers, "Mode conversion in tapered submicron silicon ridge optical waveguides," Optics Express, Vol. 20, No. 12, pp. 13425-13439 (2012) (hereinafter, referred to as NPL 2) discloses performing high-order polarization conversion by making the sectional structure of the core vertically asymmetric using the same material ($SiO_2$) for the upper and lower clads.

NPL 2 discloses a high-order polarization conversion device, in which one end of the section of an input and output portion has a sectional structure of a rib waveguide and the other end has a sectional structure of a rectangular waveguide, in FIG. 11 and the like.

NPL 1 discloses that materials having different refractive indices are required for the upper clad and the lower clad in the tapered portion for performing high-order polarization conversion. When using such new materials, an extra process occurs, or materials that are not used in other optical waveguide portions originally are required. Therefore, this is disadvantageous in terms of efficiency or cost. If different materials are used for the upper clad and the lower clad, distortion occurs due to a difference in linear expansion coefficients or the like. This lowers the yield. In addition, it is also possible to mention a method in which the lower clad is formed of a material used for the optical waveguide and the material of the upper clad is air. However, since the optical waveguide is exposed during the manufacturing process, the characteristics are degraded due to adhesion of foreign matter. As a result, the yield is reduced.

In the structure disclosed in NPL 2, the clad region in the width direction of the rib waveguide is narrow. Accordingly, since the confinement of light in the width direction is weak, large loss may occur in a bent waveguide portion due to a steep bending radius. For this reason, when using the rib waveguide, it is necessary to increase the bending radius (several tens to several hundreds of micrometers), and it is difficult to realize high-density integration in the structure disclosed in NPL 2. That is, in order to realize the high-density integration of optical elements in an optical circuit component, the optical elements need to be connected to each other by a rectangular waveguide that is sufficiently covered by the clad in the width direction. In addition, even if a structure for conversion from the rib waveguide to the rectangular waveguide is combined at the end of the rib waveguide disclosed in NPL 2, a rectangle-rib conversion portion is required. Therefore, it is difficult to miniaturize the optical element.

The present invention has been made in view of the aforementioned situation, and it is an object of the present invention to provide a high-order polarization conversion device and an optical waveguide device capable of performing polarization conversion between $TE_1$ and $TM_0$ even if the upper clad and the lower clad have different refractive indices, and to provide a high-order polarization conversion device and an optical waveguide device in which both miniaturization and high-density integration are possible.

SUMMARY

In order to solve the above problem, a high-order polarization conversion device according to a first aspect of the present invention includes: a substrate; a lower clad disposed on the substrate; a core including a lower core and an upper core, the lower core being disposed on the lower clad and having a fixed height in a rectangular sectional shape, the upper core being formed of the same material as the lower core and having a fixed height in a rectangular sectional shape that is disposed continuously on the lower core; and an upper clad that is disposed on the core and the lower clad and is formed of the same material as the lower clad. The core forms an optical waveguide through which light is configured to be guided from a start portion, at which a width of the lower core and a width of the upper core are the same, to an end portion, at which the width of the lower core and the width of the upper core are the same, at least one of the width of the upper core and the width of the lower core continuously decreases in a guiding direction of the light between the start portion and the end portion, and neither of the width of the upper core nor the width of the lower core is increased from the start portion to the end portion, at the start portion, an effective refractive index of $TE_0$ is larger than an effective refractive index of $TE_1$, and the effective refractive index of the $TE_1$ is larger than an effective refractive index of $TM_0$, at the end portion of the optical waveguide, the effective refractive index of the $TE_0$ is larger than the effective refractive index of the $TM_0$, and the effective refractive index of the $TM_0$ is larger than the effective refractive index of the $TE_1$, in a portion of the optical waveguide between the start portion and the end portion excluding the start portion and the end portion, the core has a vertically asymmetric structure in which the width of the upper core and the width of the lower core are different, and the high-order polarization conversion device performs high-order polarization conversion between $TE_1$ of the start portion and $TM_0$ of the end portion.

between the start portion and the end portion, the width of the lower core may be consistently larger than the width of the upper core, and a lower side of the upper core may be consistently included in an upper side of the lower core in a section perpendicular to a direction in which the light is guided.

Between the start portion and the end portion, both ends of the upper core in a width direction may be consistently arranged without overlapping both ends of the lower core in the width direction between the start portion and the end portion, one end of the upper core in a width direction consistently may overlap one end of the lower core in the width direction.

At the start portion, a height of the core may be 210 nm or more and 230 nm or less, and a width of the core may be 700 nm or more. At the end portion, the height of the core may be 210 nm or more and 230 nm or less, and the width of the core may be 620 nm or less.

The lower core and the upper core may be formed of Si, and the lower clad and the upper clad may be formed of $SiO_2$.

The width of the upper core may decrease from the start portion to an intermediate portion and be fixed from the intermediate portion to the end portion, and the width of the lower core may be fixed from the start portion to the intermediate portion and decrease from the intermediate portion to the end portion.

In addition, an optical waveguide device according to a second aspect of the present invention includes the high-order polarization conversion device described above and a directional coupler configured to include a first optical waveguide, to which the high-order polarization conversion device is not connected, and a second optical waveguide connected to the start portion of the high-order polarization conversion device. In addition, $TE_0$ can be guided through the first optical waveguide, $TE_1$ can be guided through the second optical waveguide, and $TE_0$ of the first optical waveguide can be coupled to $TE_1$ of the second optical waveguide.

A difference between an effective refractive index of $TE_0$ of the first optical waveguide and an effective refractive index of $TE_0$ of the second optical waveguide may be 0.2 or more.

In addition, a DP-QPSK modulator according to a third aspect of the present invention includes the optical waveguide device described above.

According to the above aspects of the present invention, even if the upper clad and the lower clad have different refractive indices, it is possible to perform high-order polarization conversion by forming the core of an optical waveguide in a vertically asymmetric core shape including an upper core and a lower core that have different widths.

DETAILED DESCRIPTION OF THE PREFERRED EMBODIMENTS

Hereinafter, the present invention will be described through preferred embodiments with reference to the accompanying diagrams.

Figure 1A:
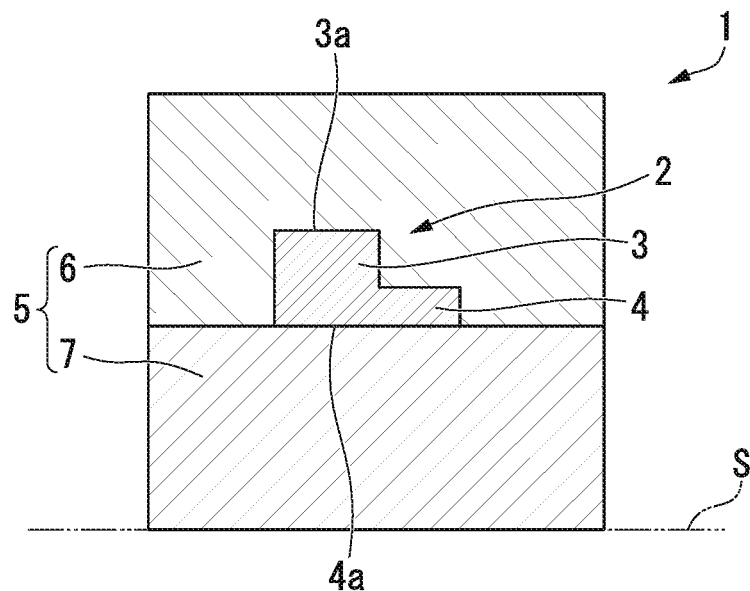
FIG. 1A is a sectional view of an optical waveguide of an example of a high-order polarization conversion device according to an embodiment of the present invention.

FIGS. 1A to 2B schematically illustrate the structures of high-order polarization conversion devices of the present invention. As shown in FIGS. 1A and 2A, each of these high-order polarization conversion devices is constituted of a planar optical waveguide device including an optical waveguide 1 in which a core 2 and a clad 5 are formed on a substrate S. The core 2 has a shape in which two rectangles which having different widths overlap each other in a section perpendicular to the guiding direction. In this application, "section" written simply indicates a section perpendicular to the guiding direction of light.

Hereinafter, an upper portion having a rectangular sectional shape is referred to as an upper core 3, a lower portion having a rectangular sectional shape is referred to as a lower core 4, a portion where the lower core 4 and a lower clad 7 are connected to each other is referred to as a lower base 4a, and an upper portion of the upper core 3 is referred to as an upper bottom 3a. The upper core 3 is formed of the same material as the lower core 4. The clad 5 includes the lower clad 7 disposed between the substrate S and the core 2 and an upper clad 6 disposed on the core 2 and the lower clad 7.

That is, the core 2 including the lower core 4 and the upper core 3 is disposed on the lower clad 7 disposed on the substrate S. The upper clad 6 is disposed on the core 2 and the lower clad 7.

Figure 1B:
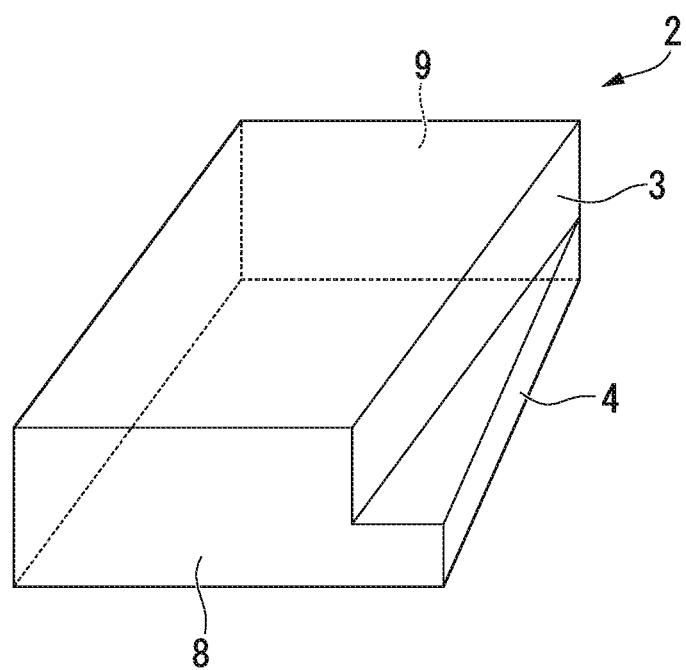
FIG. 1B is a perspective view of the core of the example of the high-order polarization conversion device according to the embodiment of the present invention.
Figure 2A:
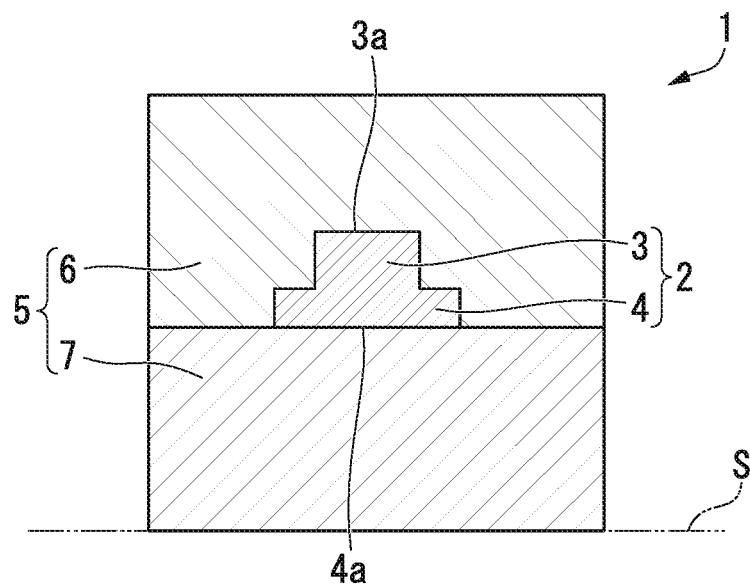
FIG. 2A is a sectional view of an optical waveguide of another example of the high-order polarization conversion device according to the embodiment of the present invention.
Figure 2B:
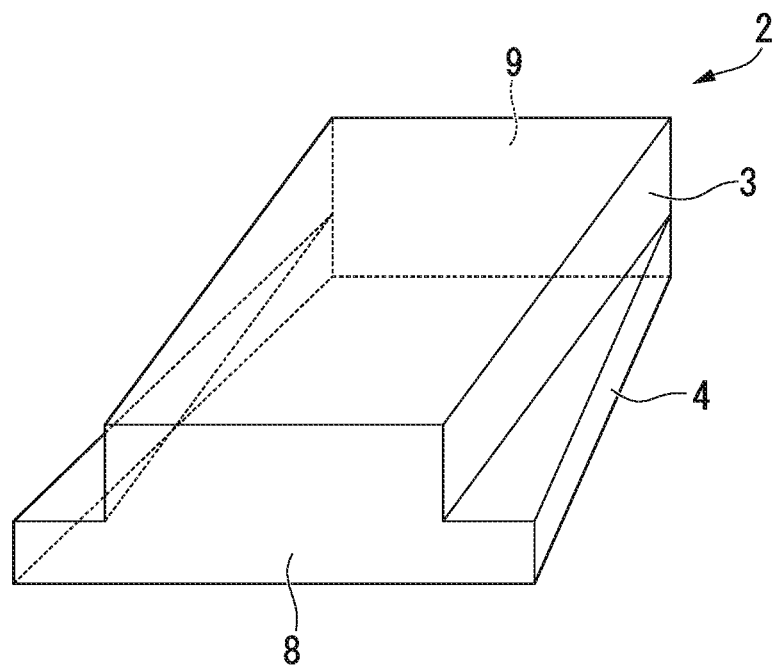
FIG. 2B is a perspective view of the core of another example of the high-order polarization conversion device according to the embodiment of the present invention.

An example of the core shape of the optical waveguide having such a section is shown in FIGS. 1B and 2B. FIG. 1B is an example of the core shape of the optical waveguide having a section of FIG. 1A, and FIG. 2B is an example of the core shape of the optical waveguide having a section of FIG. 2A.

In order for the optical waveguides in FIGS. 1A to 2B to function as high-order polarization conversion devices, it is required that three or more modes (for example, the effective refractive index of $TE_0$ (fundamental TE mode) is larger than the effective refractive index of $TE_1$ (high-order TE mode) and the effective refractive index of $TE_1$ (high-order TE mode) is larger than the effective refractive index of $TM_0$ (fundamental TM mode)) are given at a start portion 8 of the optical waveguide and that three or more modes (for example, the effective refractive index of $TE_0$ is larger than the effective refractive index of $TM_0$ and the effective refractive index of $TM_0$ is larger than the effective refractive index of $TE_1$) are given at an end portion 9 of the optical waveguide. In order to have this relationship, it is preferable that the core width (the width of the upper core 3 or the width of the lower core 4) at the end portion 9 is smaller than the core width at the start portion 8.

That is, it is preferable to satisfy at least one of (1) the width of the upper core 3 at the end portion 9 is smaller than the width of the upper core 3 at the start portion 8 and (2) the width of the lower core 4 at the end portion 9 is smaller than the width of the lower core 4 at the start portion 8.

In addition, in order for the high-order polarization conversion device to serve as a device for performing polarization conversion between $TE_1$ of the start portion 8 and $TM_0$ of the end portion 9, it is necessary that the core shape of the optical waveguide between the start portion 8 and the end portion 9 has a vertically asymmetric structure in which the width of the upper core and the width of the lower core are different and that the width of the upper core 3 or the width of the lower core 4 changes continuously in the light guiding direction of the optical waveguide. That is, it is preferable to satisfy at least one of (3) having a structure, in which the width of the upper core 3 changes continuously and sufficiently slowly, between the start portion 8 and the end portion 9 and (4) having a structure, in which the width of the lower core 4 changes continuously and sufficiently slowly, between the start portion 8 and the end portion 9. It is more preferable that (5) the width of the upper core 3 or the width of the lower core 4 decreases continuously with respect to the traveling direction of the light between the start portion and the end portion and the widths of the upper core 3 and the lower core 4 do not increase between the start portion 8 and the end portion 9.

Figure 4A:
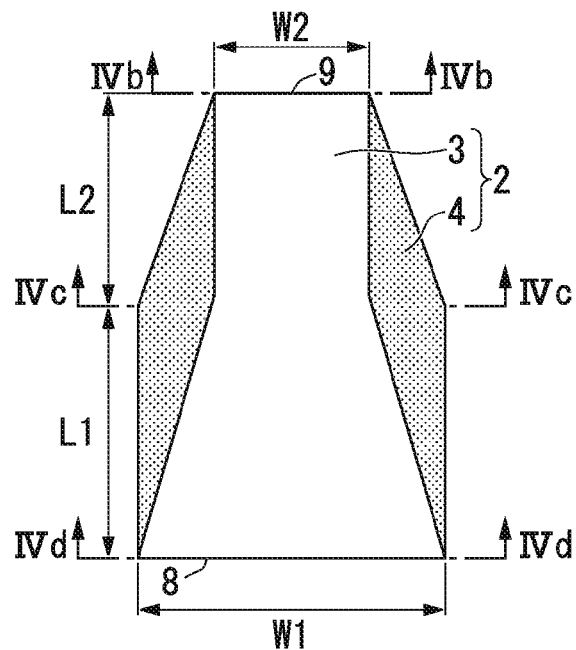
FIG. 4A is a plan view of the core of a high-order polarization conversion device according to a first embodiment of the present invention.

In the present application, "continuously decrease" includes not only a case of a constant decrease from the start portion 8 to the end portion 9, such as the width of the upper core 3 and the width of the lower core 4 in FIG. 2A, but also a portion having a fixed width, such as the width of the upper core 3 or the width of the lower core 4 in FIG. 4A.

In this case, when $TE_1$ is input from the start portion 8, $TM_0$ is output from the end portion 9. Conversely, when $TM_0$ is input from the end portion 9, $TE_1$ is output from the start portion 8. That is, this high-order polarization conversion device functions as a device that performs polarization conversion (high-order polarization conversion) between $TE_1$ of the start portion 8 and $TM_0$ of the end portion 9.

Hereinafter, in the structure in which $TM_0$ is output from the end portion 9 when $TE_1$ is input from the start portion 8, $TE_1$ is output from the start portion 8 when $TM_0$ is input to the end portion 9.

In FIGS. 1A and 1B, one end of the upper core 3 in the width direction and one end of the lower core 4 in the width direction overlap each other, and there is a step between the other opposite ends. In FIGS. 2A and 2B, both ends of the upper core 3 in the width direction do not overlap both ends of the lower core 4 in the width direction. Accordingly, there is a step between the two ends on the right side and between the two ends on the left side.

The vertically asymmetric sectional structure is not limited to FIGS. 1A to 2B, and a structure may be used in which one or more steps are provided in any of the upper right, lower right, upper left, and lower left corners in a sectional view. As the vertically asymmetric structure, it is also possible to use a structure in which the width of the upper core 3 is larger than the width of the lower core 4, without being limited to the structure in which the width of the upper core 3 is smaller than the width of the lower core 4 as shown in FIGS. 1A to 2B. In the case of providing the upper core 3 having a smaller width on the lower core 4, the upper core 3 and the lower core 4 formed of the same material can be easily manufactured using a method of removing a part of an upper portion of the core material layer disposed on the substrate (and the lower clad) by etching or the like. Therefore, it is preferable to dispose the upper core 3 with a smaller width on the lower core 4.

For the arrangement of the upper core 3 with respect to the lower core 4, when the upper core 3 is close to the center position of the lower core 4 in the width direction, polarization conversion efficiency is high. In this case, it is possible to shorten the taper length that is the length of the device.

From this point of view, as shown in FIGS. 2A and 2B, it is preferable to provide a step on both ends in the width direction of the core. When the width of the lower core 4 is larger than the width of the upper core 3 and the lower side of the upper core 3 is included in the upper side of the lower core 4, as shown in the sectional view of FIG. 2A, it is possible to use the process of manufacturing the rib waveguide.

On the other hand, as shown in FIGS. 1A and 1B, in the core shape in which one end of the lower core 4 and one end of the upper core 3 in the width direction overlap each other, a step is generated only on the other ends on the opposite side in the width direction, and the protrusion of the lower core 4 increases in size. Therefore, since the required accuracy of the manufacturing process is reduced, it is possible to increase the production efficiency.

It is preferable that the upper core 3 and the lower core 4 are formed of the same material. For example, both the upper core 3 and the lower core 4 can be formed of Si. Si of the core may contain intentional impurities (dopant) or unavoidable impurities.

According to the high-order polarization conversion device of the present embodiment, even if the refractive indices of the upper clad 6 and the lower clad 7 are different, it is possible to perform high-order polarization conversion. Therefore, even if the materials of the upper clad and the lower clad are the same, it is possible to perform high-order polarization conversion that is conversion from $TE_1$ to $TM_0$ and conversion from $TM_0$ to $TE_1$ on the optical waveguide. For example, when $SiO_2$ is used as a material of the lower clad 7, it is preferable to use $SiO_2$ for the upper clad 6. When depositing $SiO_2$ of the upper clad 6, unintended impurities (dopant) or unavoidable impurities may be contained.

Even if the materials of the upper clad and the lower clad are not the same material, the upper clad and the lower clad can be formed of the same element species. Here, the definition of "two materials are the same element species" is that all elements forming the two materials are the same. For example, the element species of silicon (Si) is only Si, and the element species of silica ($SiO_2$) are Si and O. Although the material formed of two element species of Si and O can be said to be the same element species as $SiO_2$, neither the material (Si or the like) formed of only Si nor the material ($Si_3N_4$ or the like) containing element species other than Si and O can be said to be the same element species as $SiO_2$.

Next, the principle of high-order polarization conversion that occurs by the optical waveguide device having the above structure will be described. In general, the effective refractive index of each mode is changed according to the strength of the confinement of light in the optical waveguide. The strength of the confinement depends on the size of the core when the refractive indices of the core and the clad are fixed, and increases as the core becomes large. Therefore, the effective refractive index is changed by changing the size of the core. Here, changes in the width direction are considered. For the amount of change in the size of the core in the width direction, the effective refractive index of the TE mode is changed to be larger than the effective refractive index of the TM mode. Accordingly, there are close points in $TE_1$ and $TM_0$ in a graph (effective refractive index curve) showing a change in the effective refractive index with respect to the waveguide width.

In the vertically symmetric optical waveguide shape, the effective refractive index curve of $TE_1$ and the effective refractive index curve of $TM_0$ cross each other, and the effective refractive indices of $TE_1$ and $TM_0$ degenerate. In this case, mode conversion before and after this intersection does not occur.

On the other hand, in the case of an optical waveguide having a vertically asymmetric core shape, the refractive index distribution of the refractive index section is vertically asymmetric as described in NPL 1. Therefore, in the waveguide having a vertically symmetric core shape, the points of degenerate $TE_1$ and $TM_0$ are separated from each other. In this case, since $TE_1$ and $TM_0$ are continuously connected to each other in the same effective refractive index curve, it is possible to perform high-order polarization conversion by gently changing the waveguide width. Detailed specific examples will be described in Calculation Example 1 and in each example.

Subsequently, the advantages of the fabrication of the optical waveguide device of the present embodiment will be described. The optical waveguide having a core shape as in the present embodiment can be manufactured in a process of manufacturing the rib waveguide. In the planar optical waveguide, a rectangular waveguide and a rib waveguide with less loss than the rectangular waveguide are often used in combination. Accordingly, the two-step overlapping core shape shown in FIGS. 1A to 2B can be manufactured without requiring an extra process in many cases. It is possible to use the same material for the lower core and the upper core. In particular, in the case of integration with an optical modulator having a rib type phase modulation portion (reference: K. Goi et al., "20-Gbpsk BPSK silicon Mach-Zehnder modulator with excellent chirp-free performance," OECC 2012, 4D3-5), it is possible to create the present invention collectively when forming the phase modulation portion. Therefore, it becomes very easy to form a DP-QPSK modulator. In addition, since the same material as the lower clad can be used for the upper clad, it is possible to simplify the manufacturing process compared with a high-order polarization conversion device for which it is necessary to use different materials. If different materials are used for the upper clad and the lower clad, distortion occurs due to a difference in linear expansion coefficients or the like. This lowers the yield. Therefore, it is also possible to improve the yield by manufacturing the upper clad and the lower clad with the same material. In particular, in the optical waveguide using a silicon on insulator (SOI) substrate, a buried oxide (BOX) layer serving as a lower clad is $SiO_2$, and $SiO_2$ is also often used for the upper clad. Therefore, if the high-order polarization conversion using the same material for the upper clad and the lower clad as in the present embodiment is possible, this can also be used for the optical waveguide using the SOI substrate.

In the structure described in NPL 1, when the refractive indices of the upper clad and the lower clad are different but the refractive index difference is not large, vertical asymmetry is reduced, and the effective refractive indices of $TE_1$ and $TM_0$ become close to each other. Accordingly, the length of the tapered portion required to perform sufficient conversion is increased. This is disadvantageous in terms of miniaturization. In addition, even if different materials are used for the upper clad and the lower clad in the optical waveguide and these materials are available, high-order polarization conversion cannot be performed in a small shape if the refractive index difference is small. In addition, even if time and effort for the extra process, such as increasing the refractive index difference by changing the doping conditions in the upper clad and the lower clad formed of the same material, is small, high-order polarization conversion cannot be performed in a small shape if the refractive index difference is small similar to that described above. In such a case, a method of performing high-order polarization conversion with elements on the small planar optical waveguide can be mentioned as a problem. In the present invention, even if there is a refractive index difference between the clads as described above, it is possible to increase the vertical asymmetry of the waveguide section by forming the core shape asymmetrically, so that it is possible to perform polarization conversion in a short distance.

In a rib structure, since different masks are used when using a rib (upper core) and a slab (lower core), the lower core and the upper core may be shifted from each other in the width and longitudinal directions. In the present embodiment, however, since the waveguide may be formed in a vertically asymmetric structure, the influence of such manufacturing variations on the high-order polarization conversion is small. In addition, the height of the lower core may also be varied at the time of manufacturing, but the influence on the high-order polarization conversion is small for the same reason. For the influence on conversion loss, the influence is small if a section in which the upper core and the lower core are disposed is short. Therefore, in the high-order polarization conversion device of the present embodiment, manufacturing variations do not matter since the manufacturing variations are almost the same as in the conventional waveguide having a rib structure. Accordingly, it is possible to use the same (integrated) mask in the manufacturing of the upper core of the high-order polarization conversion device and the rib of the rib structure or to use the same (integrated) mask in the manufacturing of the lower core of the high-order polarization conversion device and the slab of the rib structure. When the rib process used in other locations on the mask is used in combination, the heights of the lower core and the upper core cannot be freely selected. However, this is possible in the high-order polarization conversion for the same reason.

When the effective refractive index of $TE_0$ guided through the high-order polarization conversion device is largely different from the effective refractive indices of $TM_0$ and $TE_1$, conversion of $TE_0$ to another waveguide mode is unlikely to occur. When $TE_0$ and $TE_1$ are simultaneously input for such effective refractive indices, this also acts as a device that simultaneously outputs $TE_0$, which is hardly converted, and $TE_1$ converted to $TM_0$. From this point of view, it is preferable that the difference between the effective refractive index of $TE_0$ and the effective refractive index of $TE_1$ is 0.2 or more. For the same reason, it is preferable that the difference between the effective refractive index of $TE_0$ and the effective refractive index of $TM_0$ is 0.2 or more. Preferably, the requirements regarding the effective refractive index difference are satisfied over the entire length between the start portion and the end portion of the optical waveguide.

Figure 3A:
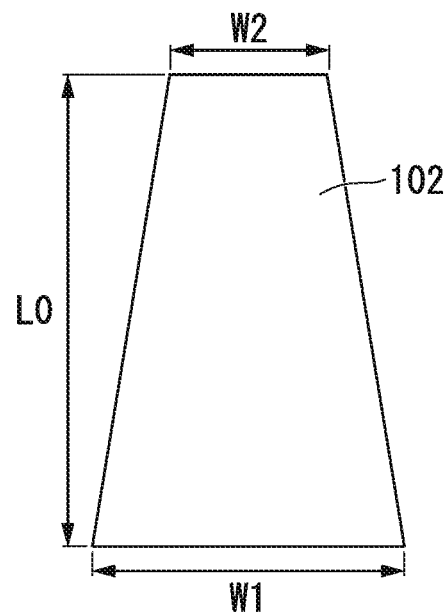
FIG. 3A is a plan view of the core showing an example of the structure using a refractive index difference between an upper clad and a lower clad.
Figure 3B:
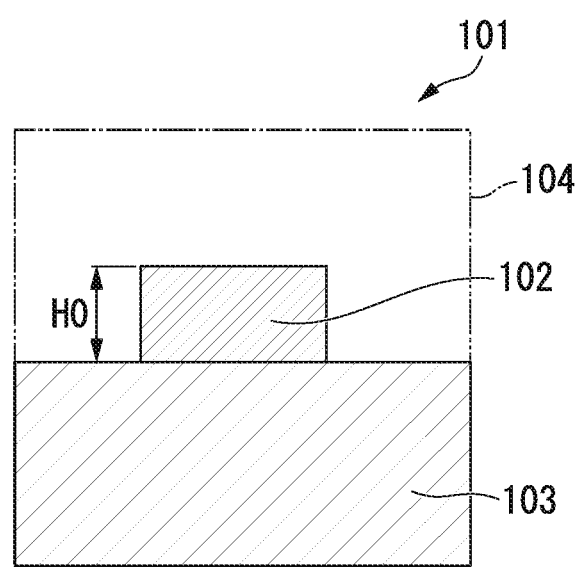
FIG. 3B is a sectional view of an optical waveguide showing an example of the structure using a refractive index difference between the upper clad and the lower clad.

When the structure having a vertically asymmetric core shape as in the present embodiment is compared with the structure (refer to NPL 1) using the refractive index difference between the upper clad and the lower clad as shown in FIGS. 3A and 3B, conversion loss from $TE_1$ to $TM_0$ in the high-order polarization conversion device of the present embodiment may be smaller. For example, as will be mentioned in Example 1 (FIGS. 4A to 4D) and Comparative Example 1 (FIGS. 3A and 3B) to be described later, when the core shapes of the start portion (input section) and an end portion (output section) are the same and the lengths of these sections in the longitudinal direction are also the same, conversion in Example 1 (0.004 dB) can be performed with in smaller loss than in Comparative Example 1 (0.587 dB).

Figure 4B:
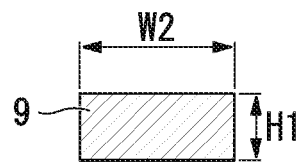
FIG. 4B is a sectional view taken along the line IVb-IVb of FIG. 4A.
Figure 4C:
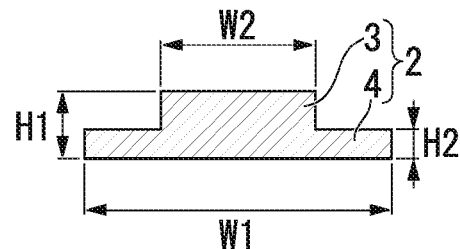
FIG. 4C is a sectional view taken along the line IVc-IVc of FIG. 4A.
Figure 4D:
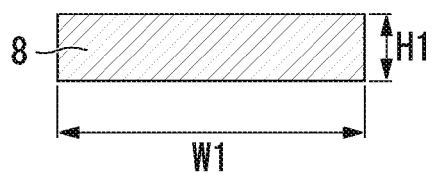
FIG. 4D is a sectional view taken along the line IVd-IVd of FIG. 4A.

FIGS. 4A to 4D show a high-order polarization conversion device according to a first embodiment of the present invention. FIG. 4A shows a plan view of the core 2, and FIGS. 4B to 4D show sectional views of an end portion, an intermediate portion, and a start portion of the high-order polarization conversion device, respectively. Although the clad 5 is disposed around the core 2 as in FIG. 2A, the clad 5 is not shown in FIGS. 4A to 4D. The details of this structure will be described later in Example 1.

In FIG. 4A, a stepped portion formed by the protrusion of the lower core 4 to the outside of the upper core 3 is shaded. Also in FIG. 5A or the like to be described later, shading may be similarly given in a plan view.

In the present embodiment, from the start portion 8 to the end portion 9, the upper core 3 is located at the center of the lower core 4 in the width direction. However, the high-order polarization conversion is also possible in a structure in which the upper core is disposed in a position other than the center of the lower core. In particular, when the above-described structure is manufactured in the process of manufacturing the rib waveguide, the conversion efficiency is reduced but the high-order polarization conversion is possible even when the upper core is shifted from the center position due to the shift of the mask that determines the design of the upper core and the lower core.

At the start portion 8 and the end portion 9, both ends of the upper core 3 in the width direction overlap both ends of the lower core 4 in the width direction, the width of the upper core 3 is the same as the width of the lower core 4, and the sections have rectangular shapes as shown in FIGS. 4B and 4D. The core width W1 of the start portion 8 is larger than the core width W2 of the end portion 9.

In a portion between the start portion 8 and the end portion 9 excluding the start portion 8 and the end portion 9, both ends of the upper core 3 in the width direction do not always overlap both ends of the lower core 4 in the width direction similar to the rib structure. That is, as shown in FIG. 4C, the width of the lower core 4 is larger than the width of the upper core 3, and the lower side of the upper core 3 is included in the upper side of the lower core 4 in a section perpendicular to the guiding direction. The distance from the upper bottom to the lower base is equal to the core height H1 of the start portion 8 and the end portion 9, and the height H2 of the lower core 4 is fixed.

In the core 2 shown in FIG. 4A, in the longitudinal direction, the width of the lower core 4 is fixed by changing only the width of the upper core 3 in the section of L1, and the width of the upper core 3 is fixed by changing only the width of the lower core 4 in the section of L2. When changing the width of the upper core 3 and the width of the lower core 4 in the same section in the longitudinal direction, the width of the upper core 3 and the width of the lower core 4 are changed in the longitudinal direction while keeping the difference between the widths small. Accordingly, vertical asymmetry is small. That is, this change is a change in a range where the effective refractive index difference between $TE_1$ and $TM_0$ is small, and the conversion efficiency is reduced. Therefore, in a structure in which the width of the lower core 4 is reduced on the end portion 9 side after increasing the difference between the widths of the upper core 3 and the lower core 4 by changing the width of the upper core 3 on the start portion 8 side, the conversion efficiency is high. Accordingly, it is possible to shorten the taper length (sum of the lengths of L1 and L2) that is the length of the device.

As a method of changing the width of the core 2 in the longitudinal direction, the width is linearly changed with respect to the distance in the longitudinal direction. Although this change in width can be changed to any continuous curved shape change, such as a quadratic function, reproducibility in the case of the curved waveguide structure is lower than that in the case of linear change. Therefore, the influence of the manufacturing process can be reduced by adopting the core 2 as shown in FIG. 4A.

In the structure of the present embodiment, the degree of separation of the effective refractive index curves of $TE_1$ and $TM_0$ is larger than in the structure in which the sizes of the upper core and the lower core are the same and the upper core is located in a range other than the center that does not protrude from the lower core. Therefore, in the present embodiment, since the efficiency of high-order polarization conversion becomes high as the effective refractive index difference between $TE_1$ and $TM_0$ becomes large, it is possible to shorten the taper length that is the length of the device.

Figure 5A:
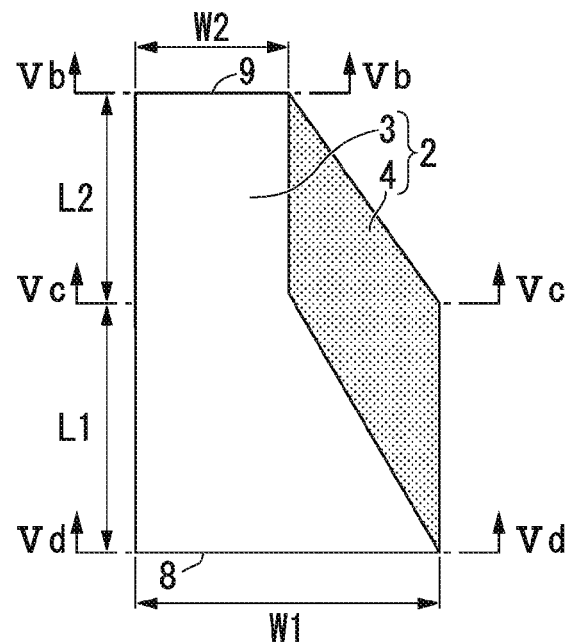
FIG. 5A is a plan view of the core of a high-order polarization conversion device according to a second embodiment of the present invention.
Figure 5B:
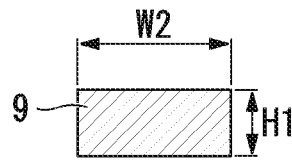
FIG. 5B is a sectional view taken along the line Vb-Vb of FIG. 5A.
Figure 5C:
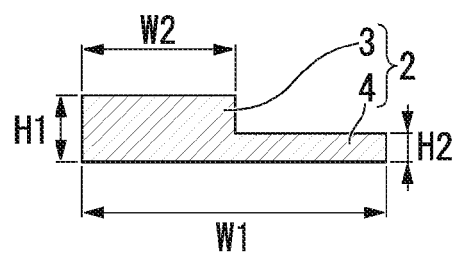
FIG. 5C is a sectional view taken along the line Vc-Vc of FIG. 5A.
Figure 5D:
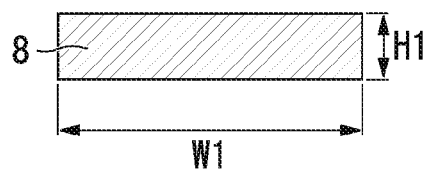
FIG. 5D is a sectional view taken along the line Vd-Vd of FIG. 5A.

FIGS. 5A to 5D show a high-order polarization conversion device according to a second embodiment of the present invention. FIG. 5A shows a plan view of the core 2, and FIGS. 5B to 5D show sectional views of an end portion, an intermediate portion, and a start portion of the high-order polarization conversion device, respectively. Although the clad 5 is disposed around the core 2 as in FIG. 1A, the clad 5 is not shown in FIGS. 5A to 5D. The details of this structure will be described later in Example 2.

In the present embodiment, a structure is used in which, from the start portion 8 to the end portion 9, one end of the upper core 3 and one end of the lower core 4 in the width direction match each other. The characteristics of the change in the sectional shape of the core 2 in the longitudinal direction or the method of changing the width is the same as that in the first embodiment shown in FIGS. 4A to 4D.

In this structure of the second embodiment, since the effective refractive index difference is small, the polarization conversion efficiency is reduced. However, compared with the structure of the first embodiment, a portion of the lower core that is not covered with the upper core is wide. Therefore, since the required accuracy in manufacturing is lower than that in the first embodiment, it is possible to manufacture a highly reproducible structure.

Figure 6A:
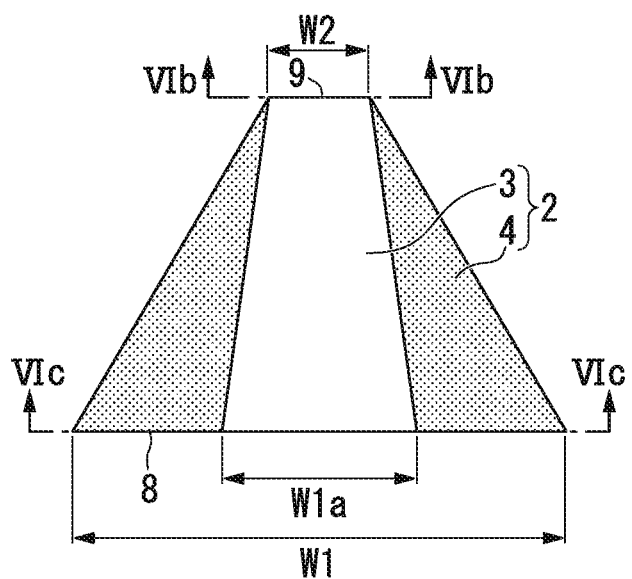
FIG. 6A is a plan view of the core of a third embodiment of the high-order polarization conversion device according to the embodiment of the present invention.
Figure 6B:
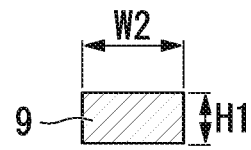
FIG. 6B is a sectional view taken along the line VIb-VIb of FIG. 6A.
Figure 6C:
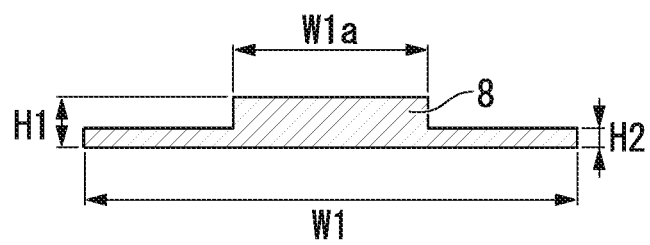
FIG. 6C is a sectional view taken along the line VIc-VIc of FIG. 6A.

FIGS. 6A to 6C show a high-order polarization conversion device according to a third embodiment of the present invention. FIG. 6A shows a plan view of the core 2, and FIGS. 6B and 6C show sectional views of an end portion and a start portion of the high-order polarization conversion device, respectively. Although the clad 5 is disposed around the core 2 as in FIG. 1A, the clad 5 is not shown in FIGS. 6A to 6C. The details of this structure will be described later in Example 3.

A structure is used in which the sectional shape of the start portion 8 is a rib waveguide, the sectional shape of the end portion 9 is a rectangular waveguide, and the center of the upper core 3 and the center of the lower core 4 in the width direction match each other. As shown in FIG. 6C, at the start portion 8, the width of the lower core 4 is larger than the width of the upper core 3. As shown in FIG. 6B, at the end portion 9, the width of the lower core 4 is the same as the width of the upper core 3. As a method of changing the width of the core 2 in the longitudinal direction, the width is linearly changed with respect to the distance in the longitudinal direction. Between the start portion 8 and the end portion 9, the ratio between the width of the lower core 4 and the width of the upper core 3 changes, but the sectional shape is the same as in FIG. 6C.

By gradually changing the length of the upper bottom from W1a to W2 and the length of the lower base from W1 to W2 along the longitudinal direction of the optical waveguide between the start portion 8 and the end portion 9, conversion from $TE_1$ to $TM_0$ is possible. The change in the sectional shape of the core 2 in the longitudinal direction in this structure is characterized in that the width of the upper core 3 and the width of the lower core 4 are linearly changed from the start portion 8 to the end portion 9. In this structure, a rib structure is adopted on the start portion 8 side except for the end portion 9 and the vicinity thereof. Accordingly, since the difference between the width of the upper core 3 and the width of the lower core 4 is large, vertical asymmetry is large. For this reason, since the width is changed in a range where the effective refractive index difference is large, it is possible to increase the conversion efficiency.

In the rib waveguide, loss due to side wall roughness caused by the manufacturing process is smaller than in the rectangular waveguide. In general, compared with $TE_0$ that is used in propagation, $TE_1$ having a wide electric field distribution has large loss due to side wall roughness. Therefore, propagation with low loss can be realized by making light be guided through the rib waveguide. In the structure described above, there is a characteristic of a structure capable of directly converting $TE_1$ having propagated through the rib waveguide to $TM_0$. Since it is possible to convert $TE_1$ to $TM_0$ without converting $TE_1$ to the rectangular waveguide once, light does not need to propagate through the extra distance. Accordingly, it is possible to eliminate the loss caused by side wall roughness or the conversion of the waveguide.

The high-order polarization conversion device of the present invention is not limited to the embodiments described above, and various modifications can be made without departing from the scope of the present invention. For example, high-order polarization conversion devices having a structure in which input and output sections (a start portion and an end portion) or a change in the longitudinal direction is as follows are also possible.

FIGS. 7A to 7D show modification examples of the high-order polarization conversion device according to the first or second embodiment of the present invention. FIGS. 7A to 7D are plan views of respective cores. As in the first or second embodiment, each of these devices has a vertically symmetric structure, and the sections of the start portion 8 and the end portion 9 are rectangular shapes. That is, the width of the lower core 4 and the width of the upper core 3 in the section of the start portion 8 are the same, and the width of the lower core 4 and the width of the upper core 3 in the section of the end portion 9 are the same. In addition, as in the first or second embodiment, the width of the upper core 3 is always smaller than the width of the lower core 4 between the start portion 8 and the end portion 9.

Figure 7A:
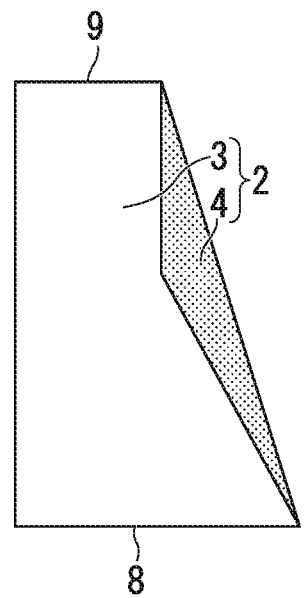
FIG. 7A is a plan view of the core of a modification example of the first or second embodiment of the high-order polarization conversion device according to the embodiment of the present invention.
Figure 7B:
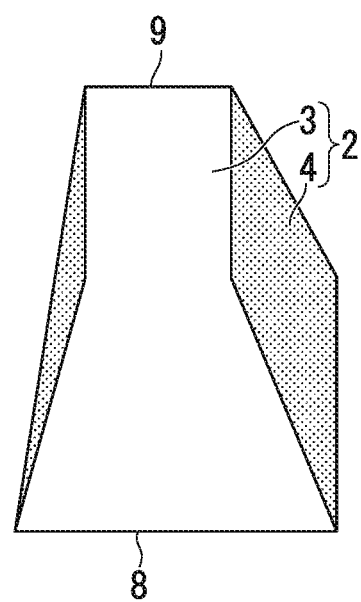
FIG. 7B is a plan view of the core of a modification example of the first or second embodiment of the high-order polarization conversion device according to the embodiment of the present invention.
Figure 7C:
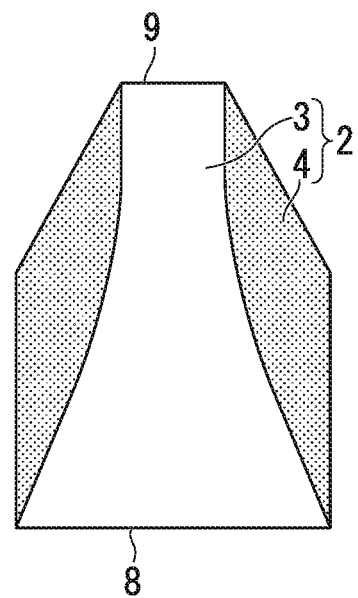
FIG. 7C is a plan view of the core of a modification example of the first or second embodiment of the high-order polarization conversion device according to the embodiment of the present invention.
Figure 7D:
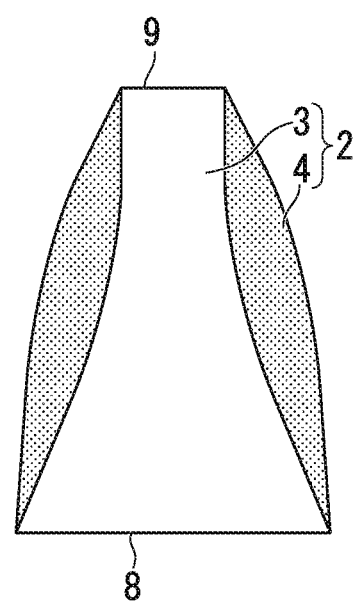
FIG. 7D is a plan view of the core of a modification example of the first or second embodiment of the high-order polarization conversion device according to the embodiment of the present invention.

In FIG. 7A, similar to FIG. 5A, there is a stepped portion, which is formed by the protrusion of the lower core 4, on one side of the upper core 3. In FIG. 7B, similar to FIG. 4A, there is a stepped portion, which is formed by the protrusion of the lower core 4, on both sides of the upper core 3. However, the upper core 3 may not be located at the center of the lower core 4 in the width direction, and may be horizontally asymmetric. In FIG. 7C, width changes in the tapered portion of the upper core 3 and the lower core 4 are continuous changes. However, these are not linear shapes (straight lines) but curved shapes. That is, the width of the upper core 3 decreases in a curved shape toward the end portion 9 from the start portion 8. In FIG. 7D, the widths of the upper core 3 and the lower core 4 decrease in a curved shape toward the end portion 9 from the start portion 8.

In the case of the optical waveguide of the first or second embodiment, as a specific example of the sizes, it is preferable that the height of the entire core be 220 nm and the width of the entire core be 700 nm or more in the section of the start portion and the height of the entire core be 220 nm and the width of the entire core be 620 nm or less in the section of the end portion. Thus, if the height of the core is fixed to a specific value so that only the core width is changed, the process of manufacturing an optical waveguide from a substrate with a core material (Si) layer having a specific thickness, such as an SOI substrate, becomes easy. When the manufacturing error is set to ±10 nm, it is preferable that the height of the entire core in the section of each of the start portion and the end portion be approximately 210 nm to 230 nm. In consideration of manufacturing error, it is preferable that the height of the lower core be approximately 75 nm to 115 nm.

The first or second embodiment will be described in more detail with reference to FIGS. 4A, 5A, and 7A to 7D.

In FIGS. 4A, 5A, and 7A to 7D, in a portion between the start portion 8 and the end portion 9 excluding the start portion 8 and the end portion 9, the width of the upper core 3 is always smaller than the width of the lower core 4. For this reason, it is possible to form an optical waveguide by performing etching twice. Therefore, for example, it is possible to form an optical waveguide by removing an SI layer, which is an upper layer of the SOI substrate, by etching and depositing $SiO_2$ thereon.

In addition, for the traveling direction of light, the change in the core width may be gradual as shown in FIG. 4A or may be continuous as shown in FIG. 7D. Design for the gradual change in the core width is easy. On the other hand, when the change in the core width is continuous, it is possible to change the waveguide structure more smoothly. Accordingly, it is possible to further reduce loss.

In addition, a portion of the lower core protruding from the upper core may be the protrusion on both sides with respect to the traveling direction of light as shown in FIG. 4A or the like, or may be the protrusion on a single side with respect to the traveling direction of light as shown in FIG. 5A or the like. When a portion of the lower core protruding from the upper core is the protrusion on both sides, high-order polarization conversion efficiency is high. When a portion of the lower core protruding from the upper core is the protrusion on a single side, it is possible to keep the protrusion of the lower core wide. Accordingly, it is possible to reduce the resolution required at the time of manufacturing.

In the optical waveguide of the embodiment described above, rectangular waveguides having different waveguide widths can be connected to each other using an efficient tapered waveguide, and a high-order polarization conversion portion is provided (embedded) in a waveguide (tapered waveguide) in which the width of the core 2 decreases toward the end portion 9 from the start portion 8. Through this configuration, high-order polarization conversion in a short distance is possible.

Hereinafter, the principle of the high-order polarization conversion device according to the above embodiment will be described with reference to FIG. 39.

Figure 39:
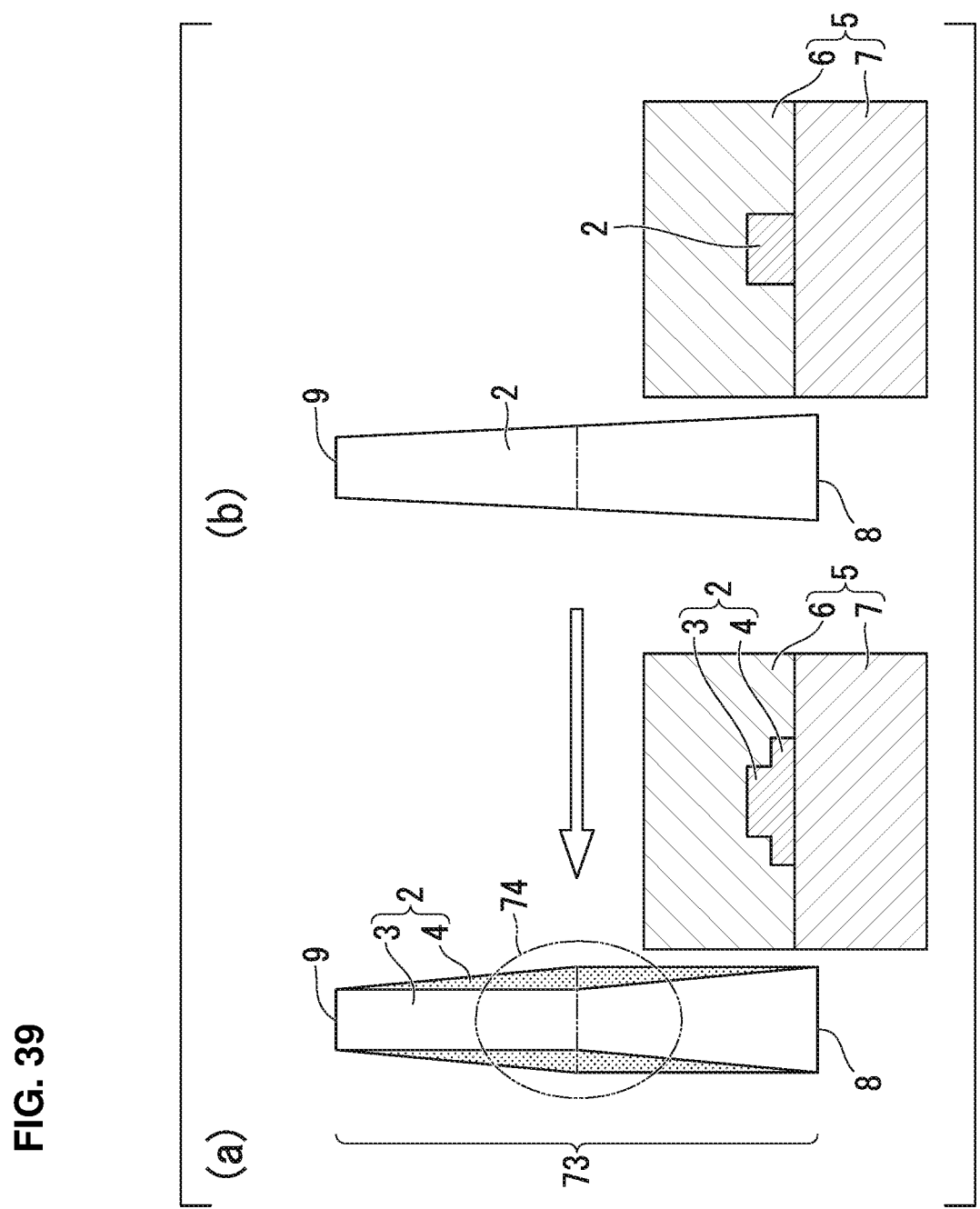
FIG. 39 is an image diagram of embedding in a tapered waveguide when using the configuration shown in FIGS. 4A to 4D.

FIG. 39 diagram (b) is a tapered waveguide including a core 2 in which a section from a start portion to an end portion is always a rectangular shape and the width decreases toward the end portion 9 from the start portion 8, and FIG. 39 diagram (a) is a high-order polarization conversion device in which a high-order polarization conversion portion 74 is embedded in the tapered waveguide of FIG. 39 diagram (b).

First, when performing high-order polarization conversion, at the start portion 8 (input section), the effective refractive index of $TE_0$ needs to be larger than the effective refractive index of $TE_1$, and the effective refractive index of $TE_1$ needs to be larger than the effective refractive index of $TM_0$. In addition, at the end portion 9 (output section), the effective refractive index of $TE_0$ needs to be larger than the effective refractive index of $TM_0$, and the effective refractive index of $TM_0$ needs to be larger than the effective refractive index of $TE_1$. In addition, the core 2 between the start portion 8 and the end portion 9 needs to have a structure in which waveguides are continuously connected to each other, and needs to have a two-stage tapered waveguide structure of the upper core 3 and the lower core 4 as shown in FIG. 39 diagram (a). Hereinafter, a portion having a two-stage tapered waveguide structure is referred to as a two-stage tapered portion 73.

If a case is considered in which the width of the upper core and the width of the lower core are always the same from the start portion to the end portion as shown in FIG. 39 diagram (b), the effective refractive indices of $TE_1$ and $TM_0$ are changeable (have a degenerate point), and high-order polarization conversion is not performed.

On the other hand, as shown in FIG. 39 diagram (b), when the widths of the upper core 3 and the lower core 4 are different, the section of the two-stage tapered portion 73 has a vertically asymmetric refractive index distribution. In the vertically asymmetric refractive index distribution, the effective refractive indices of $TE_1$ and $TM_0$ are not changeable (have no degenerate point). Accordingly a waveguide mode in which $TE_1$ and $TM_0$ called a hybrid mode are mixed is generated. By using the hybrid mode, high-order polarization conversion is performed. Hereinafter, a portion in which a hybrid mode is generated is referred to as the high-order polarization conversion portion 74. In order to perform high-order polarization conversion with high conversion efficiency, it is necessary to lengthen the taper length in the high-order polarization conversion portion 74 so that a continuous change (heat insulation conversion) of the electric field is performed.

In this case, when the height of the upper core 3 and the lower core 4 are fixed, if the conditions of the order of the effective refractive indices of the start portion 8 and the end portion 9 are satisfied, the width of the upper core 3 of the start portion 8 is always larger than the width of the upper core 3 of the end portion 9. In addition, the width of the lower core 4 of the start portion 8 is always larger than the width of the lower core 4 of the end portion 9.

This is based on the following reasons.

As the width of the core 2 decreases, the confinement of light of $TE_1$, in which the electric field component in the width direction is dominant, becomes weak. If the confinement of light is weak, the electric field extends to the clad 5. Accordingly, since the influence of the refractive index of the clad 5 is received rather than the core 2, the effective refractive index is reduced. In contrast, in the case of $TM_0$, the electric field component in the height direction is dominant. Accordingly, the change in the effective refractive index due to the core width decrease is smaller than $TE_1$. Therefore, when the aforementioned prerequisites are satisfied, the width of the core of the start portion 8 is always larger than the core width of the end portion 9.

In the high-order polarization conversion device, therefore, it is necessary to connect rectangular waveguides having different widths to each other using a tapered waveguide. When considering the miniaturization of a normal optical element that does not have a function of high-order polarization conversion among such optical elements, in order to efficiently connect rectangular waveguide having different widths to each other, there is a method of using a tapered waveguide having a width that monotonically decreases from the wide rectangular waveguide (start portion 8) to the narrow rectangular waveguide (end portion 9).

Based on the tapered waveguide described above, the high-order polarization conversion portion 74 is provided in the waveguide. The high-order polarization conversion portion 74 can be realized by providing a vertically asymmetric refractive index section. Therefore, in the above embodiment, for the tapered waveguide described above, an upper core and a lower core are disposed, and a two-stage tapered waveguide structure in which changes in the widths of the upper core and the lower core are different in the traveling direction of light is provided between the start portion 8 and the end portion 9. In this case, in order to obtain a vertically asymmetric refractive index distribution between the start portion 8 and the end portion 9, the width of the lower core 4 and the width of the upper core 3 in a section from the start portion 8 to the end portion 9 are always different. In addition, the width of the upper core 3 or the lower core 4 decreases monotonically, and the widths of both the upper core and the lower core are not increased. Then, it is possible to efficiently connect the rectangular waveguides having different widths, each of which has the start portion 8 and the end portion 9, and to provide the high-order polarization conversion portion 74 between the rectangular waveguides. Therefore, it is possible to realize a high-order polarization conversion device that is small and can be integrated with high density.

If the high-order polarization conversion device of the above embodiment is used, the embedding position of the high-order polarization conversion portion 74 can be arbitrarily designed since a high-order polarization conversion portion is provided in a normal tapered waveguide.

Figure 40:
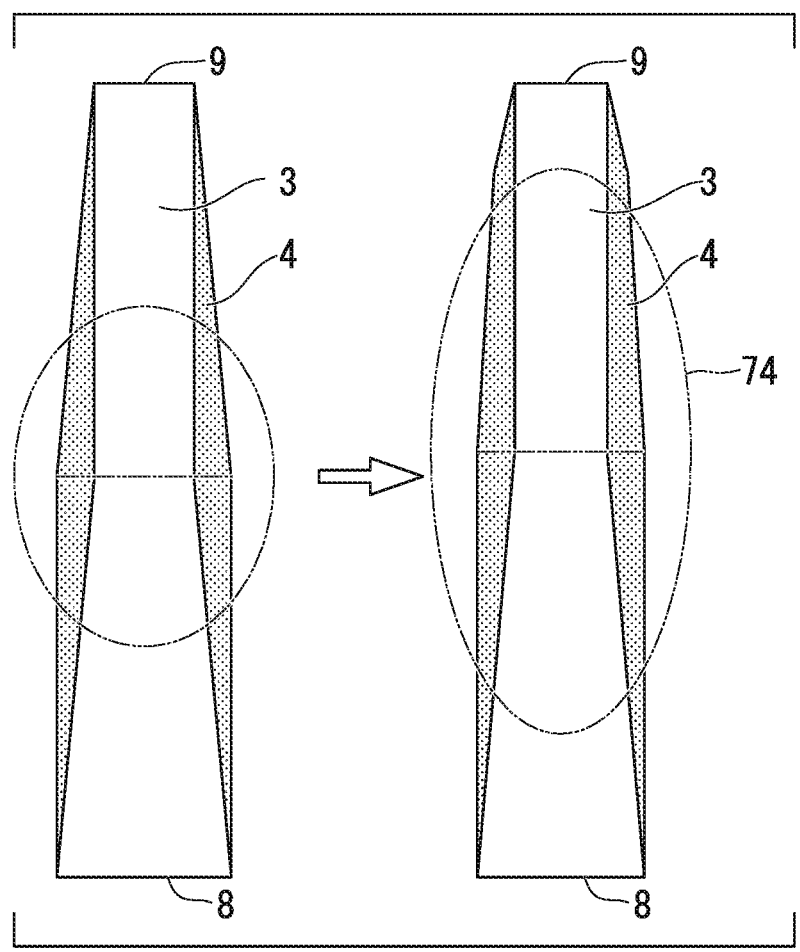
FIG. 40 is a diagram showing a design example of a high-order polarization conversion portion using the embodiment according to the present invention.

For example, as shown in FIG. 40, for the start portion 8 and the end portion 9 having fixed structures, the proportion of the high-order polarization conversion portion 74 with respect to the total device length can also be arbitrarily designed when using the high-order polarization conversion device of the above embodiment. This is made possible by adjusting the manner of change of the two-stage taper for the guiding direction of light. The efficiency of high-order polarization conversion increases as the proportion of the high-order polarization conversion portion with respect to the entire high-order polarization conversion device increases. Therefore, efficient conversion in a shorter distance becomes possible. However, it is necessary to set the waveguide of a portion other than the high-order polarization conversion portion so that loss is reduced.

Figure 41A:
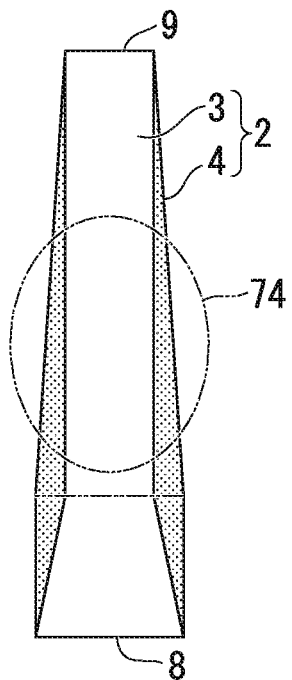
FIG. 41A is a diagram showing a design example of a high-order polarization conversion portion using the embodiment according to the present invention.
Figure 41B:
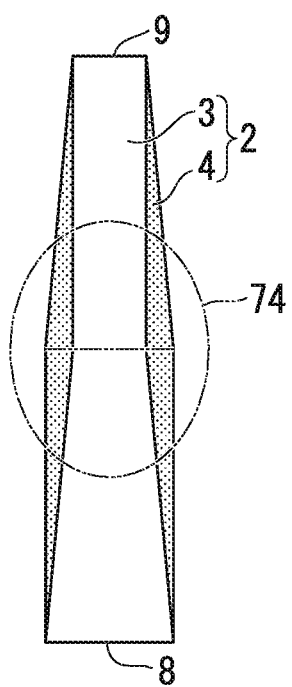
FIG. 41B is a diagram showing a design example of a high-order polarization conversion portion using the embodiment according to the present invention.
Figure 41C:
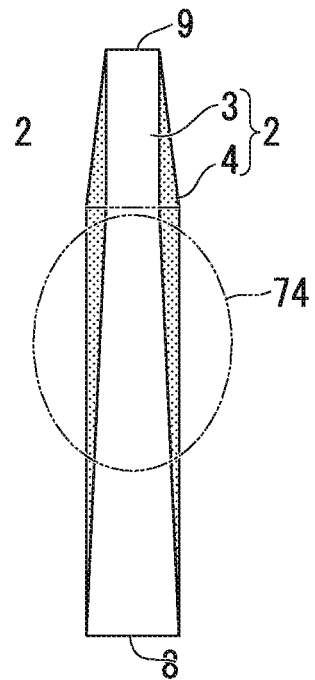
FIG. 41C is a diagram showing a design example of a high-order polarization conversion portion using the embodiment according to the present invention.

As another example, if the high-order polarization conversion device of the above embodiment is used, it is also possible to adjust the position of the high-order polarization conversion portion 74 with respect to the entire high-order polarization conversion device. When the widths of the start portion 8 and the end portion 9 are different, the position of the high-order polarization conversion portion is shifted if the adjustment of the manner of the change of the two-stage taper is the same. Preferably, the position of the high-order polarization conversion portion is at the center of the device as described later, in terms of a wavelength range and manufacturing errors. Similar to FIG. 40, by adjusting the manner of the change of the two-stage taper for the traveling direction of light, it is possible to provide the high-order polarization conversion portion 74 near the center of the high-order polarization conversion device for the start portion 8 and the end portion 9 having arbitrary widths as shown in FIGS. 41A to 41C. In FIGS. 41A to 41C, the widths of the start portion 8 and the end portion 9 are decreased in the order of FIGS. 41A, 41B, and 41C, but the high-order polarization conversion portion 74 is disposed at the center in all of the diagrams.

In addition, if the wavelength of guided light is changed, the degree of confinement of light in the core is changed. Accordingly, the effective refractive index is changed, and the position of the high-order polarization conversion portion 74 defined in Example 10, which is described later, is changed. In the embodiment described above, since there is always a vertically asymmetric structure between the start portion and the end portion, conversion is possible as long as there is the high-order polarization conversion portion 74 between the start portion and the end portion even if the position of the high-order polarization conversion portion is shifted. Accordingly, the high-order polarization conversion device of the embodiment described above can operate over a wide wavelength range. In particular, when the high-order polarization conversion portion 74 is located at the center of the high-order polarization conversion device, the high-order polarization conversion device can operate over a wider wavelength range. This is because the positional shift of the high-order polarization conversion portion 74 increases as the wavelength change increases. By using the embodiment described above, a high-order polarization conversion portion can be easily designed in the center of the high-order polarization conversion device.

In addition, even if the effective refractive index is changed by the influence of manufacturing error and the position of the high-order polarization conversion portion is changed, high-order polarization conversion is possible in the above embodiment in which the high-order polarization conversion portion 74 can be designed in the center of the high-order polarization conversion device. As examples in which a manufacturing error occurs, it is possible to mention a case in which the width of the upper core 3 or the lower core 4 deviates from the design value, or a case in which the height of the upper core 3 or the lower core 4 deviates from the design value, a case in which the relative positions of the upper core 3 and the lower core 4 are shifted from each other, and a case in which the side wall of the upper core or the lower core has inclines relative to a direction perpendicular to the substrate.

Figure 42A:
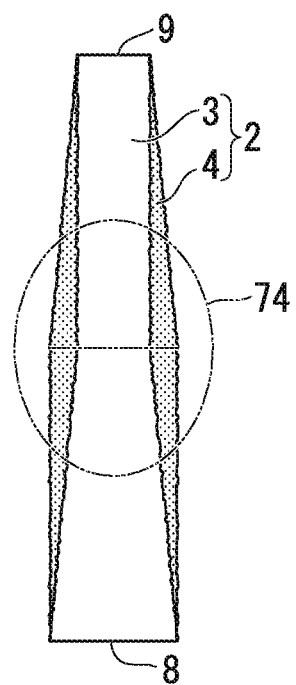
FIG. 42A is a diagram showing a conversion multiplexing device in which side wall roughness occurs.

When forming the core 2 by etching, as shown in FIG. 42A, the width of the upper core 3 or the lower core 4 may be slightly changed from the design value (side wall roughness). When a slight change in the width of the core occurs, the confinement of light is changed. Then, the effective refractive index is also changed randomly. Accordingly, the effective refractive index curve becomes substantially thick, and the degree of separation of the intersection between the effective refractive indices of $TE_1$ and $TM_0$ becomes weak. That is, the conversion efficiency of the high-order polarization conversion portion is reduced by the influence of the side wall roughness. According to the present embodiment, since the proportion of the high-order polarization conversion portion 74 with respect to the total device length can be increased, it is possible to limit the conversion efficiency reduction in the entire high-order polarization conversion device.

Figure 42B:
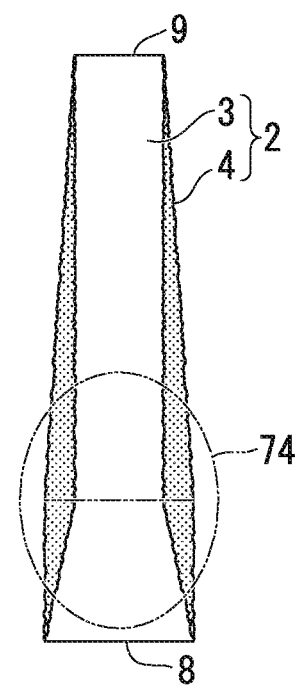
FIG. 42B is a diagram showing a conversion multiplexing device in which side wall roughness occurs.

In addition, the influence of the side wall roughness decreases as the widths of the upper core 3 and the lower core 4 increase. The reason is that light is confined in the core when the core width is large. As a result, it is possible to reduce the influence due to the change in the core width. In this case, since the core width increases as a distance from the start portion 8 decreases, a reduction in the efficiency of high-order polarization conversion due to side wall roughness can be limited by providing the high-order polarization conversion portion 74 at a position close to the start portion 8 as shown in FIG. 42B.

For example, when the high-order polarization conversion device has a portion (wide portion) in which the width of the lower core 4 is larger than the width of the lower core 4 of the start portion 8, the degree of confinement of light in the core in the wide portion is higher than that at the start portion 8. That is, a higher-order waveguide mode (waveguide mode having an effective refractive index smaller than $TE_1$ and $MT_0$), which was not guided at the start portion 8, may be guided. In this case, perturbation occurs due to the change in the core width due to a manufacturing error, and the input $TE_1$ may be converted to the high-order mode. Loss is caused by the conversion to the high-order mode, and inverse conversion from the high-order mode to $TE_1$ is performed after traveling by a certain distance through the waveguide of the high-order polarization conversion device. In this case, the original $TE_1$ and $TE_1$ having a shifted phase propagate so as to overlap each other. This may cause the wavelength dependence of loss.

On the other hand, in the embodiment described above, the widths of the upper core 3 and the lower core 4 are not larger than the width of the start portion 8. Therefore, since the high-order mode that is not guided at the start portion does not become a waveguide mode even thereafter, the above problem does not occur.

Figure 8A:
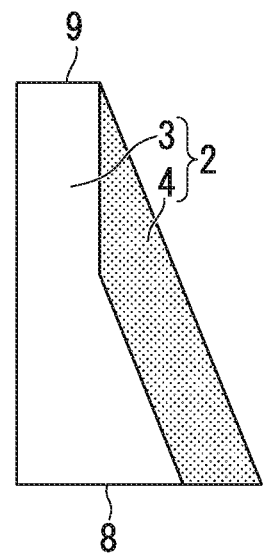
FIG. 8A is a plan view of the core of a modification example of the high-order polarization conversion device according to the third embodiment of the present invention.
Figure 8B:
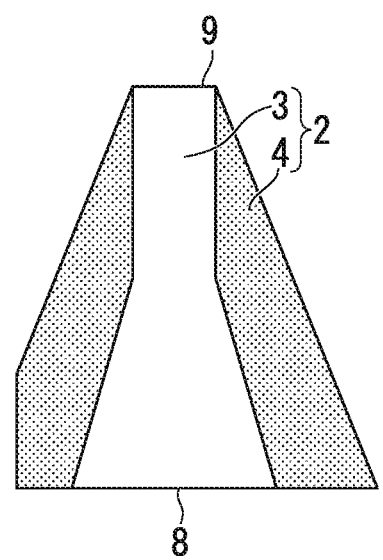
FIG. 8B is a plan view of the core of a modification example of the high-order polarization conversion device according to the third embodiment of the present invention.
Figure 8C:
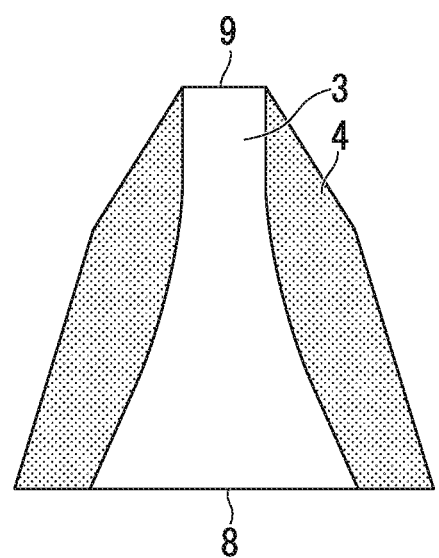
FIG. 8C is a plan view of the core of a modification example of the high-order polarization conversion device according to the third embodiment of the present invention.

FIGS. 8A to 8C show modification examples of the high-order polarization conversion device according to the third embodiment of the present invention. FIGS. 8A to 8C are plan views of the respective cores. As in the third embodiment, each of these optical waveguides has a rib structure in which the section of the start portion 8 is vertically asymmetric and has a rectangular core in which the section of the end portion 9 is vertically symmetric.

In FIG. 8A, there is a stepped portion, which is formed by the protrusion of the lower core 4, on one side of the upper core 3. In FIG. 8B, there is a stepped portion, which is formed by the protrusion of the lower core 4, on both sides of the upper core 3. However, the upper core 3 may not be located at the center of the lower core 4 in the width direction, and may be horizontally asymmetric. In FIG. 8C, changes in the widths of the upper core 3 and the lower core 4 in tapered portions are continuous changes. However, these are not linear shapes (straight lines) but curved shapes.

In the case of the optical waveguide of the third embodiment, as a specific example of the sizes, it is preferable that the height of the lower core serving as a slab of the rib waveguide be 75 nm to 115 nm, the height of the entire core be 210 nm to 230 nm, and the width of the upper core be 600 nm or more in the section of the start portion and that the height of the entire core be 210 nm to 230 nm and the width of the entire core be 620 nm or less in the section of the end portion. Thus, if the height of the entire core and the height of the lower core are fixed to specific values so that only the core width is changed, the process of manufacturing an optical waveguide having a lower core from a substrate with a core material (Si) layer having a specific thickness, such as an SOI substrate, by etching or the like becomes easy. When the manufacturing error is set to ±10 nm, it is preferable that the height of the entire core in the section of each of the start portion and the end portion be approximately 210 nm to 230 nm, and it is preferable that the height of the lower core be approximately 80 nm to 110 nm.

It is preferable that the width of the upper core at the start portion be larger than the width of the entire core at the end portion. More preferably, the width of the upper core at the start portion be 700 nm or more. When the width of the upper core at the start portion is equal to or less than the width of the entire core at the end portion, it is preferable that the width of the lower core at the start portion be larger than the width of the entire core at the end portion.

Figure 9A:
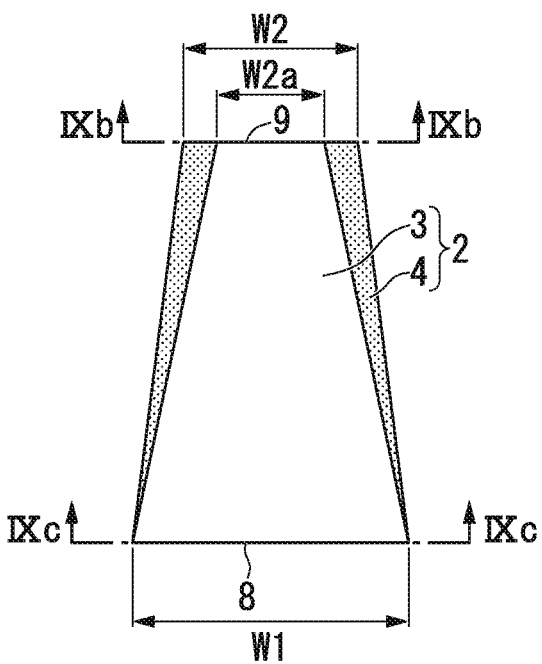
FIG. 9A is a plan view of the core of a high-order polarization conversion device according to a fourth embodiment of the present invention.
Figure 9B:
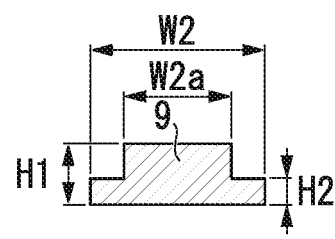
FIG. 9B is a sectional view taken along the line IXb-IXb of FIG. 9A.
Figure 9C:
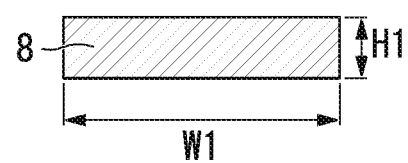
FIG. 9C is a sectional view taken along the line IXc-IXc of FIG. 9A.

FIGS. 9A to 9C show a high-order polarization conversion device according to a fourth embodiment of the present invention. FIG. 9A shows a plan view of the core 2, and FIGS. 9B and 9C show sectional views of an end portion and a start portion of the high-order polarization conversion device, respectively. Although the clad 5 is disposed around the core 2 as in FIG. 2A, the clad 5 is not shown in FIGS. 9A to 9C. The details of this structure will be described later as Example 4.

Figure 10A:
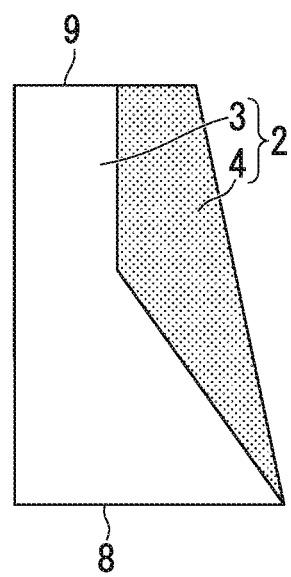
FIG. 10A is a plan view of the core of a modification example of the high-order polarization conversion device according to the fourth embodiment of the present invention.
Figure 10B:
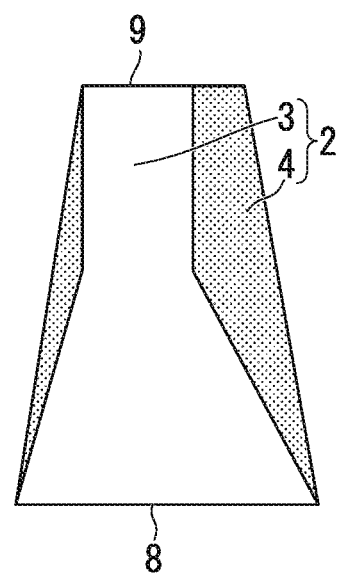
FIG. 10B is a plan view of the core of a modification example of the high-order polarization conversion device according to the fourth embodiment of the present invention.
Figure 10C:
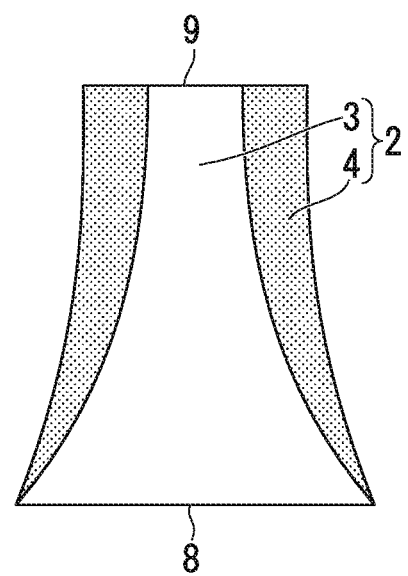
FIG. 10C is a plan view of the core of a modification example of the high-order polarization conversion device according to the fourth embodiment of the present invention.

FIGS. 10A to 10C show modification examples of the fourth embodiment of the high-order polarization conversion device of the present invention. FIGS. 10A to 10C are plan views of the respective cores.

The optical waveguide of the present embodiment has a core in which the section of the start portion 8 is a vertically symmetric rectangular shape and the section of the end portion 9 is a vertically asymmetric rib structure. By gradually changing the length of the upper bottom from W1 to W2a and the length of the lower base from W1 to W2 along the longitudinal direction of the optical waveguide between the start portion 8 and the end portion 9, conversion from $TE_1$ to $TM_0$ is possible. The symmetry of the core shape in the left and right directions is not necessarily required.

As shown in FIGS. 10A to 10C, the upper core 3 may not be located at the center of the lower core 4, and the tapered portion may not be linear (straight line) as long as this is a continuous change.

In the case of the optical waveguide of the fourth embodiment, based on the same reason as in the first to third embodiments, it is preferable that the height of the entire core is equal to 220 nm and the width of the entire core be 700 nm or more in the section of the start portion and that the height of the entire core be equal to 220 nm, the height of the lower core be equal to 95 nm, and the width of the upper core be 620 nm or less.

Figure 11A:
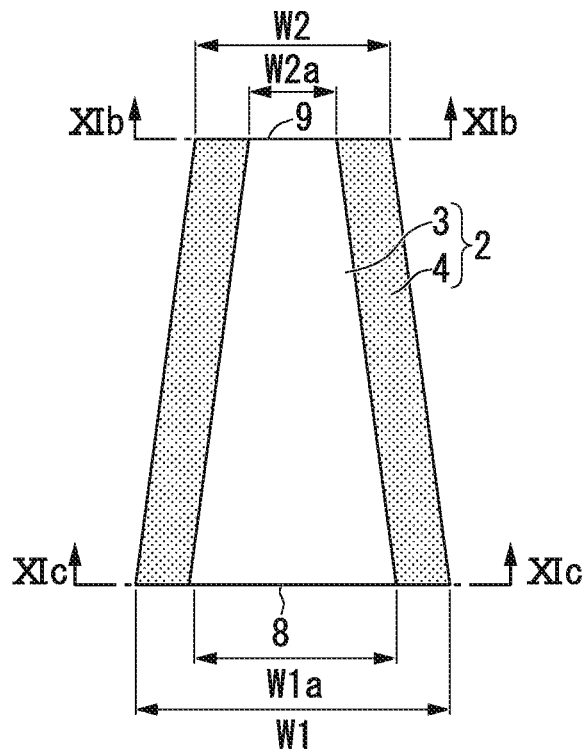
FIG. 11A is a plan view of the core of a high-order polarization conversion device according to a fifth embodiment of the present invention.
Figure 11B:
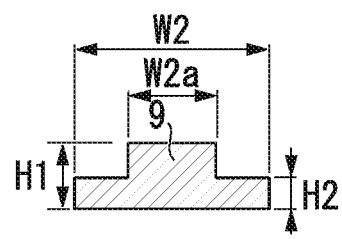
FIG. 11B is a sectional view taken along the line XIb-XIb of FIG. 11A.
Figure 11C:
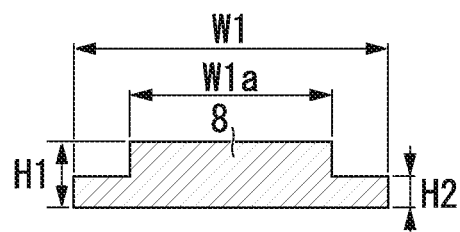
FIG. 11C is a sectional view taken along the line XIc-XIc of FIG. 11A.

FIGS. 11A to 11C show a high-order polarization conversion device according to a fifth embodiment of the present invention. FIG. 11A shows a plan view of the core 2, and FIGS. 11B and 11C show sectional views of an end portion and a start portion, respectively. Although the clad 5 is disposed around the core 2 as in FIG. 2A, the clad 5 is not shown in FIGS. 11A to 11C. The details of this structure will be described later as Example 5.

Figure 12A:
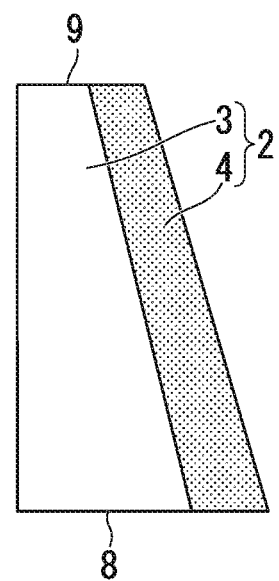
FIG. 12A is a plan view of the core of a modification example of the high-order polarization conversion device according to the fifth embodiment of the present invention.
Figure 12B:
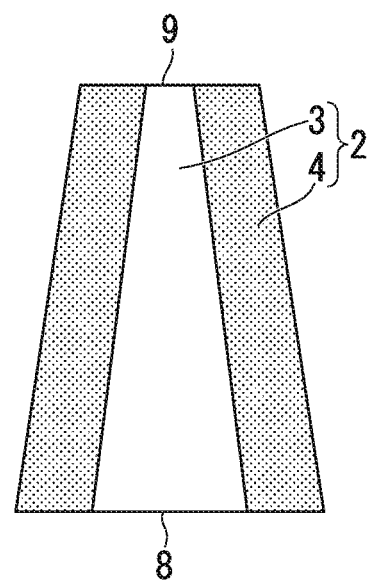
FIG. 12B is a plan view of the core of a modification example of the high-order polarization conversion device according to the fifth embodiment of the present invention.
Figure 12C:
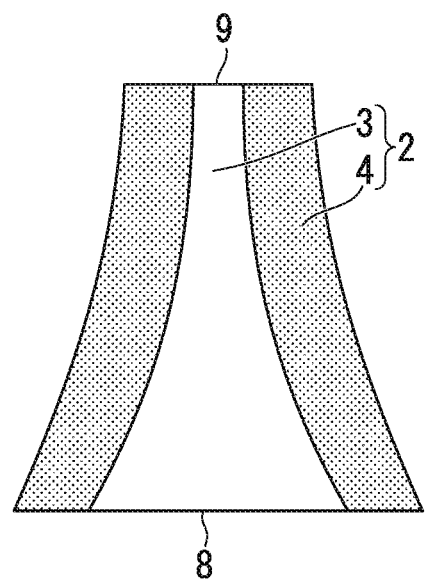
FIG. 12C is a plan view of the core of a modification example of the high-order polarization conversion device according to the fifth embodiment of the present invention.

FIGS. 12A to 12C show modification examples of the high-order polarization conversion device according to the fifth embodiment of the present invention. FIGS. 12A to 12C are plan views of the respective cores.

The optical waveguide of the present embodiment has a core in which the sections of the start portion 8 and the end portion 9 are vertically asymmetric. By gradually changing the length of the upper bottom from W1a to W2a and the length of the lower base from W1 to W2 along the longitudinal direction of the optical waveguide between the start portion 8 and the end portion 9, conversion from $TE_1$ to $TM_0$ is possible.

The symmetry of the core shape in the left and right directions is not necessarily required. As shown in FIGS. 12A to 12C, the upper core 3 may not be located at the center of the lower core 4, and the tapered portion (the upper core 3 is the width of the lower core 4) may not be linear (straight line) as long as this is a continuous change.

In the case of the optical waveguide of the fifth embodiment, based on the same reason as in the third embodiment, it is preferable that the height of the lower core be 95 nm, the height of the entire core be 220 nm, and the width of the upper core be 600 nm or more in the section of the start portion and that the height of the lower core be 95 nm, the height of the entire core be 220 nm, and the width of the upper core be 620 nm or less in the section of the end portion. It is preferable that the width of the upper core at the start portion be larger than the width of the upper core at the end portion. More preferably, the width of the upper core at the start portion be 700 nm or more. When the width of the upper core at the start portion is equal to or less than the width of the upper core at the end portion, it is preferable that the width of the lower core at the start portion be larger than the width of the upper core at the end portion.

<Polarization Conversion Device Combined with an Asymmetric Directional Coupler>

The high-order polarization conversion device of the present invention can be used in combination with other elements in the optical waveguide on the same substrate. For example, it is possible to realize a polarization conversion device by combining the asymmetric directional coupler and the high-order polarization conversion device of the present invention. The polarization conversion device converts $TE_0$ to $TE_1$ using the asymmetric directional coupler, and converts $TE_1$ to $TM_0$ using the high-order polarization conversion device.

Figure 13A:
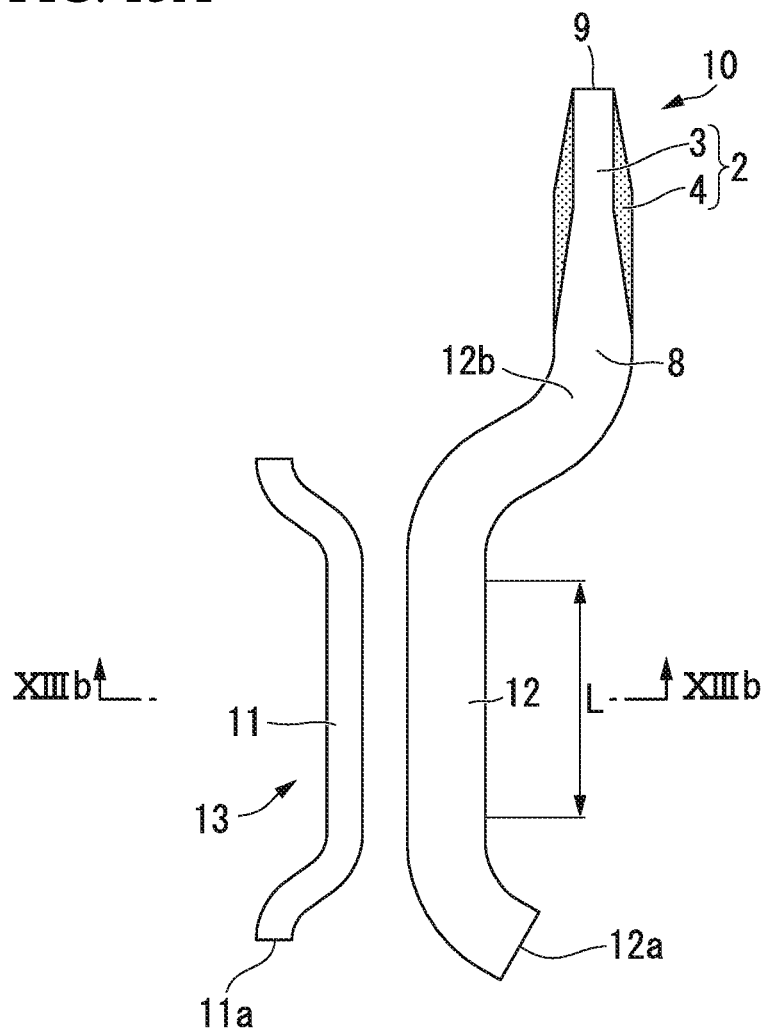
FIG. 13A is a plan view of the core of an example of a polarization conversion device that is formed by combining the high-order polarization conversion device according to the embodiment of the present invention with an asymmetric directional coupler, and (b) is a sectional view taken along the line XIIIb-XIIIb of (a).
Figure 13B:
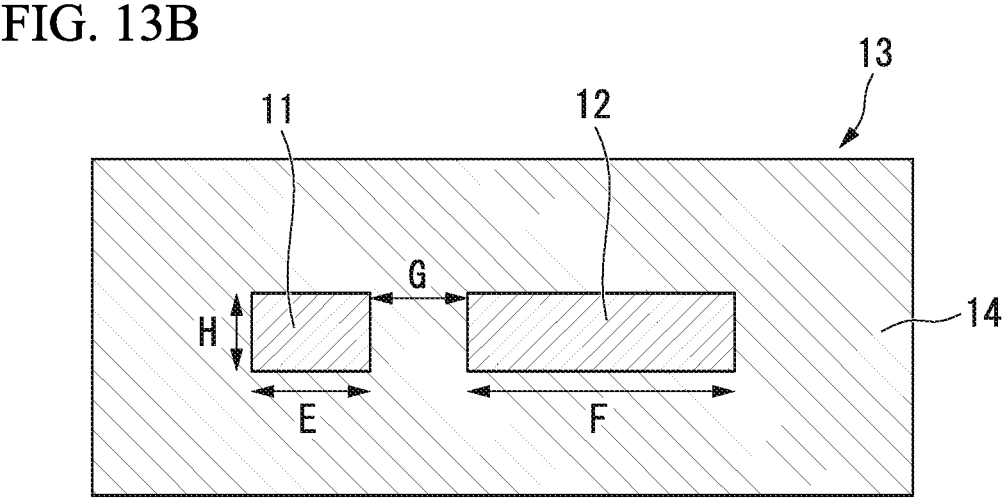
FIG. 13B is a sectional view taken along line the XIIIb-XIIIb of FIG. 13A.

FIGS. 13A and 13B show an example of a polarization conversion device formed by combining the high-order polarization conversion device of the present invention with an asymmetric directional coupler. FIG. 13A is a plan view of the core, and FIG. 13B is a sectional view in the asymmetric directional coupler. The details of this structure is described later as Example 6.

An asymmetric directional coupler 13 is configured to include a first optical waveguide 11 and a second optical waveguide 12 that are two rectangular waveguides. Portions around these waveguides are covered with a clad 14, as shown in FIG. 13B. A high-order polarization conversion device 10 is connected to only the second optical waveguide 12 of the first optical waveguide 11 and the second optical waveguide 12.

$TE_0$ is guided through the first optical waveguide 11. $TE_1$ is guided through the second optical waveguide 12. Since $TE_0$ of the first optical waveguide 11 and $TE_1$ of the second optical waveguide 12 have close effective refractive indices, coupling from the first optical waveguide 11 to the second optical waveguide 12 is possible. The input-side waveguide connected to the first optical waveguide 11 is assumed to be a first port 11a, and the input-side waveguide connected to the second optical waveguide 12 is assumed to be a second port 12a. A third port 12b on the output side of the second optical waveguide 12 is connected to the start portion 8 of the high-order polarization conversion device 10. Although the same structure as in FIGS. 4A to 4D is shown as an example, the high-order polarization conversion device 10 shown in FIG. 13A is not particularly limited thereto.

$TE_0$ input to the first port 11a is coupled to $TE_1$ of the second optical waveguide 12 in the asymmetric directional coupler 13, and is output as $TE_1$ from the third port 12b. $TE_1$ output from the third port 12b is input to the high-order polarization conversion device 10, and is finally converted to $TM_0$.

On the other hand, when $TE_0$ is input to the second port 12a, in the asymmetric directional coupler 13, the effective refractive index of $TE_0$ of the second optical waveguide 12 is largely different from the effective refractive index of any mode of the first optical waveguide 11. Therefore, neither mode coupling nor conversion occurs. Also in the high-order polarization conversion device 10, since there is no mode conversion of $TE_0$, $TE_0$ input from the third port 12b is transmitted almost without loss until the end portion 9 of the high-order polarization conversion device 10. Accordingly, when $TE_0$ is simultaneously input to the first port 11a and the second port 12a, an output in which $TE_0$ and $TM_0$ are multiplexed is obtained at the end portion 9 of the high-order polarization conversion device 10 that is an output portion of this structure. That is, this structure can also operate as a device having functions of polarization conversion and polarization multiplexing.

In addition, since this structure is reversible with respect to time, modes of the multiplexed light of $TE_0$ and $TM_0$ input from the output portion are separated from each other, and the separated modes are output from the first port 11a and the second port 12a as $TE_0$. That is, this structure can operate as a device having both functions of polarization separation and polarization conversion.

As a degree of the difference between the effective refractive index of $TE_0$ of the second optical waveguide 12 and the effective refractive index of the mode of the first optical waveguide 11, it is preferable that the difference between the effective refractive index of $TE_0$ of the first optical waveguide 11 of the asymmetric directional coupler 13 and the effective refractive index of $TE_0$ of the second optical waveguide 12 be 0.2 or more.

Figure 14A:
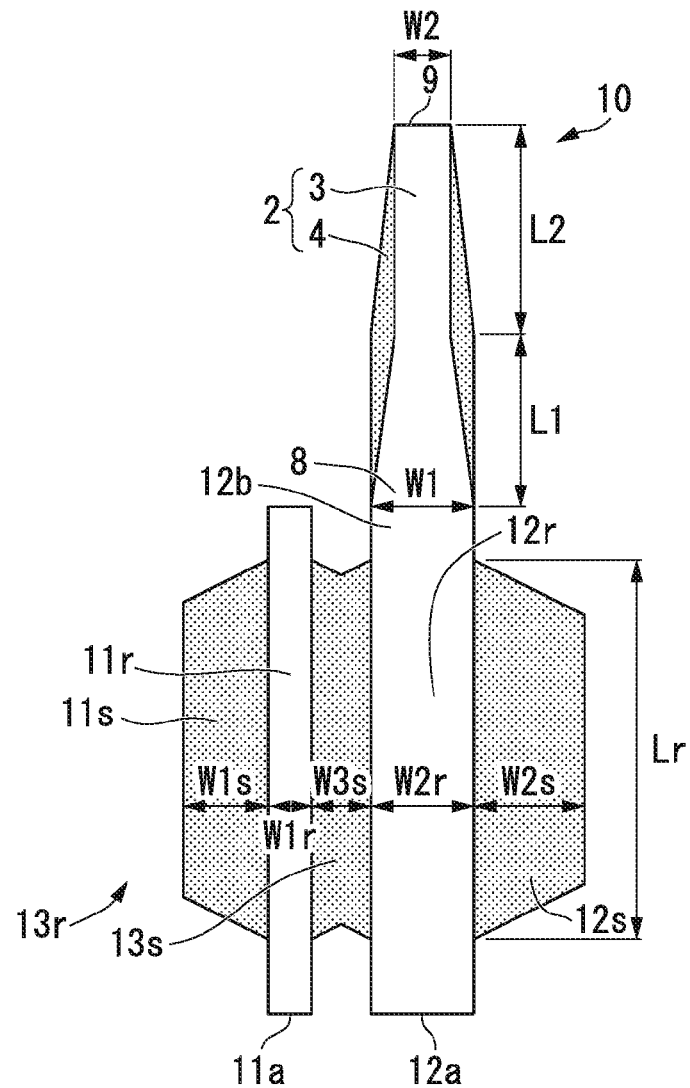
FIG. 14A is a plan view of the core of another example of the polarization conversion device that is formed by combining the high-order polarization conversion device according to the embodiment of the present invention with the asymmetric directional coupler.
Figure 14B:
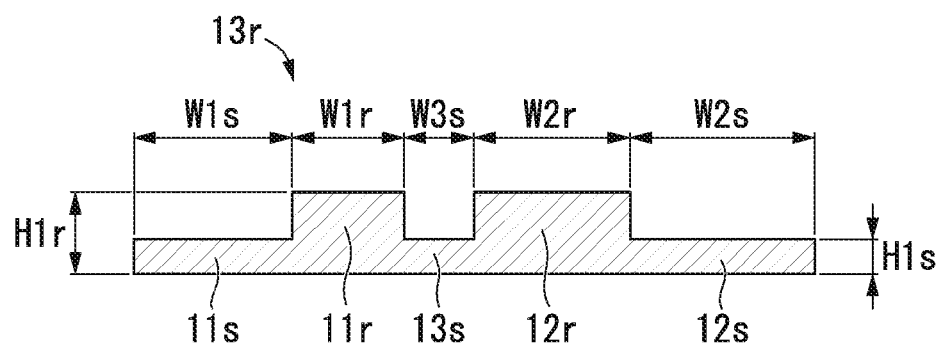
FIG. 14B is a sectional view of the core of an asymmetric directional coupler of another example of the polarization conversion device that is formed by combining the high-order polarization conversion device according to the embodiment of the present invention with the asymmetric directional coupler.

FIGS. 14A and 14B show another example of the polarization conversion device formed by combining the high-order polarization conversion device of the present embodiment with the asymmetric directional coupler. FIG. 14A is a plan view of the core, and FIG. 14B is a sectional view of the core of the asymmetric directional coupler. The details of this structure is described later as Example 7.

In this polarization conversion device, an asymmetric directional coupler 13r is configured to include a rib type waveguide. A slab 13s is formed between ribs 11r and 12r of two optical waveguides, and slabs 11s and 12s are also formed outside the ribs 11r and 12r.

The function of the polarization conversion device shown in FIGS. 14A and 14B is the same as that of the polarization conversion device shown in FIGS. 13A and 13B. Accordingly, when $TE_0$ is simultaneously input to the first port 11a and the second port 12a, an output in which $TE_0$ and $TM_0$ are multiplexed is obtained from the end portion 9 of the high-order polarization conversion device 10. Therefore, the polarization conversion device can be used as a device for performing polarization multiplexing.

<DP-QPSK Modulator>

Figure 15:
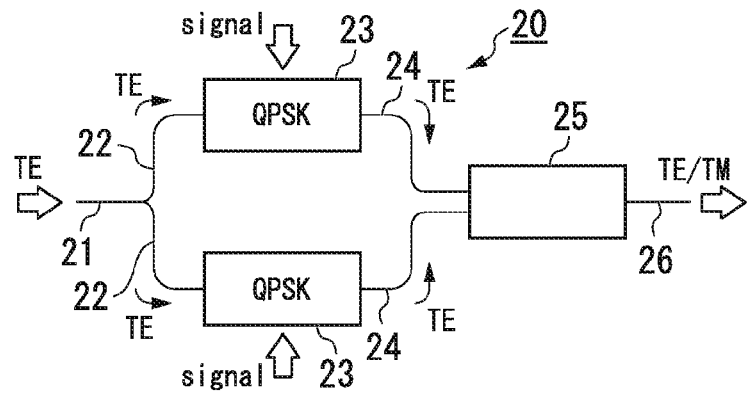
FIG. 15 is a schematic diagram showing an example of a DP-QPSK modulator.

The polarization conversion device of the present embodiment of the present embodiment can be used for Dual Polarization-Quadrature Phase Shift Keying (DP-QPSK) disclosed in the references (P. Dong, C. Xie, L. Chen, L. L. Buhl, and Y.-K. Chen, "112-Gb/s Monolithic PDM-QPSK modulator in Silicon," European Conference and Exhibition on Optical Communication, Vol. 1, p. Th.3.B.1, Jun. 16, 2012). FIG. 15 schematically shows an example of the DP-QPSK modulator. In this DP-QPSK modulator 20, using the fact that the two modes of $TE_0$ and $TM_0$ can be present in the normal optical waveguide, the DP-QPSK modulator 20 performs DP-QPSK modulation having a QPSK signal that is independent of both modes of $TE_0/TM_0$. Specifically, light that is input as $TE_0$ from an input portion 21 is branched into two optical waveguides 22, and two QPSK modulators 23 modulate the light to the QPSK signal. Then, $TE_0$ on one side of each optical waveguide 24 is converted to $TM_0$ by a polarization conversion device 25, the two modes are combined on the same optical waveguide by polarization beam combination, and a signal independent of $TE_0$ and $TM_0$ is output to an output portion 26.

For example, the polarization conversion device of the embodiment shown in FIGS. 13A to 14B can be used as the polarization conversion device 25 that converts one $TE_0$ to $TM_0$ and multiplexes the converted $TM_0$ and the other $TE_0$. For example, the first port 11a and the second port 12a shown in FIGS. 13A to 14B correspond to the optical waveguide 24 shown in FIG. 15. In addition, the end portion 9 of the high-order polarization conversion device 10 shown in FIGS. 13A to 14B corresponds to the output portion 26 shown in FIG. 15.

The method of modulating $TE_0$ and $TM_0$ is not limited to QPSK, and even other modulators having a complex structure can perform polarization multiplexing using the polarization conversion device of the present embodiment.

<Polarization Diversity Coherent Receiver>

Figure 16:
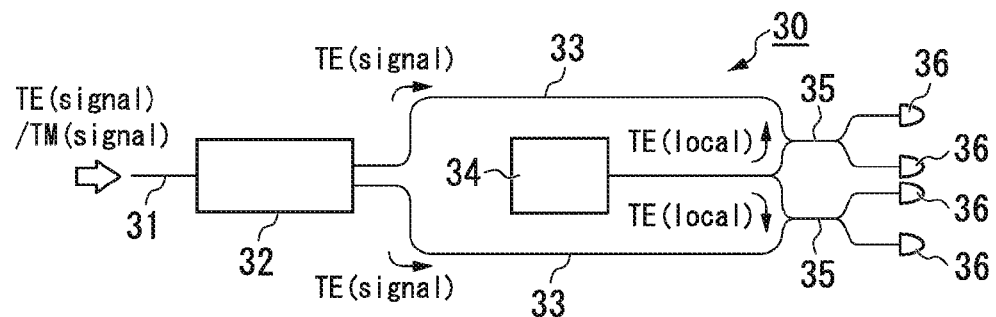
FIG. 16 is a schematic diagram showing an example of a polarization diversity coherent receiver.

The polarization conversion device of the present embodiment can be used in a coherent receiver on the Si optical waveguide of the polarization multiplexing signal based on the simultaneous transmission of $TE_0$ and $TM_0$, which is disclosed in the references (C. Doerr et al., "Packaged Monolithic Silicon 112-Gb/s Coherent Receiver," IEEE Photonics Technology Letters, Vol. 23, pp. 762-764, 2011). FIG. 16 schematically shows an example of the polarization diversity coherent receiver. In this coherent receiver 30, an optical waveguide 31 of the polarization multiplexing signal based on the simultaneous transmission of $TE_0$ and $TM_0$ is connected to a polarization conversion device 32 that can simultaneously perform polarization conversion and polarization beam splitting, and a signal of $TE_0$ is branched into one of the optical waveguides 33. In addition, a signal of $TE_0$ converted from $TM_0$ is branched into the other one of the two optical waveguides 33. A semiconductor laser light source that is generally used as local light 34 uses only single polarization, for example, an output of $TE_0$ (local). When such a light source is used, polarization conversion of local light is usually required. In the coherent receiver 30 shown in FIG. 16, however, polarization conversion of local light is not required since the signal of $TE_0$ is guided through both the optical waveguides 33 after polarization separation of signal light. The signal light and the local light are output from a coupling portion 36 through a light coupler section 35.

When using an optical waveguide type structure for the polarization conversion device 32, it is possible to use a coupler that does not have a polarization separation function, such as a reverse tapered mode field converter coupled from the substrate side, for the coupling of light with respect to the outside of the element in the coupling portion 36. As a coupler, for example, it is possible to use a reverse tapered structure disclosed in the references (Qing Fang, et al., "Suspended optical fiber-to-waveguide mode size converter for silicon photonics," Optics Express, Vol. 18, No. 8, pp. 7763-7769 (2010)).

For example, the polarization conversion device of the embodiment shown in FIGS. 13A to 14B can be used as the polarization conversion device 32 that can simultaneously perform polarization conversion and polarization beam splitting. For example, the end portion 9 of the high-order polarization conversion device 10 shown in FIGS. 13A to 14B corresponds to the optical waveguide 31 shown in FIG. 16, and the first port 11a and the second port 12a shown in FIGS. 13A to 14B correspond to the optical waveguide 33 shown in FIG. 16.

<Polarization Diversity Scheme>

Figure 17:
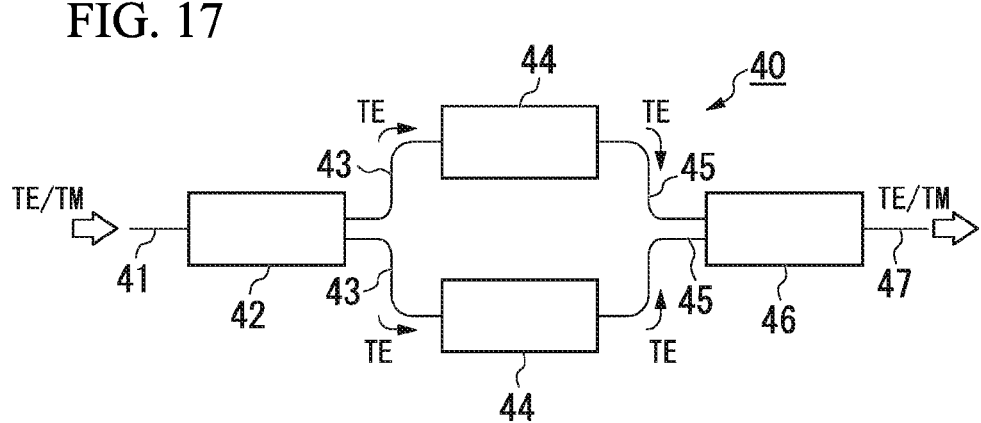
FIG. 17 is a schematic diagram showing an example of the polarization diversity scheme.

The polarization conversion device of the present embodiment can be used to execute the polarization diversity scheme shown in FIG. 17 when a device to provide the same operation for both modes needs to be used in polarization multiplexing transmission, in which $TE_0$ and $TM_0$ are simultaneously transmitted, and when a single polarized wave is transmitted at random, as disclosed in the references (Hiroshi Fukuda et al., "Silicon photonic circuit with polarization diversity," Optics Express, Vol. 16, No. 7, pp. 4872-4880 (2008)). In a polarization diversity scheme 40 shown in FIG. 17, an optical waveguide 41 for the polarization multiplexing signal through which $TE_0$ and $TM_0$ are simultaneously transmitted is connected to a polarization conversion device 42 that can simultaneously perform polarization conversion and polarization beam splitting, and a signal of $TE_0$ is branched into one of optical waveguides 43. In addition, a signal of $TE_0$ converted from $TM_0$ is branched into the other one of the two optical waveguides 43. The optical signal of $TE_0$ operated by an element 44 is combined from an optical waveguide 45 in a polarization conversion device 46, and is output to an optical waveguide 47 of the polarization multiple signal through which $TE_0$ and $TM_0$ are simultaneously transmitted.

Similar to the coherent receiver 30 shown in FIG. 16, the polarization conversion device of the present embodiment that can simultaneously perform polarization conversion and polarization beam splitting can be used as the polarization conversion device 42.

Similar to the DP-QPSK modulator 20 shown in FIG. 15, the polarization conversion device of the present invention that can simultaneously perform polarization conversion and polarization beam combination can be used as the polarization conversion device 46.

<Polarization Conversion Device Combined with a Branching Portion>

By combining a branching unit with the high-order polarization conversion device of the present embodiment, polarization conversion is possible. As a branching portion, a "2×1" MMI (multi-mode interferometer) and a Y-branch can be mentioned. These can generate $TE_1$ by adjusting the phase of an electrical field input to two input portions. Alternatively, $TE_1$ may be input from only one side. Therefore, since it is possible to convert $TE_1$ to $TM_0$ by connecting the high-order polarization conversion device of the present embodiment to the subsequent stage, it is possible to provide the function of polarization conversion.

In the references (Wangqing Yuan, et al., "Mode-evolution-based polarization rotator-splitter design via simple fabrication process," Optics Express, Vol. 20, No. 9, pp. 10163-10169 (2012)), the functions of a polarization beam splitter and polarization conversion are simultaneously realized by connecting an asymmetric Y branch and a high-order polarization conversion device. However, it is possible to realize the same effect even if the asymmetric Y-branch and the present embodiment are used.

Figure 32:
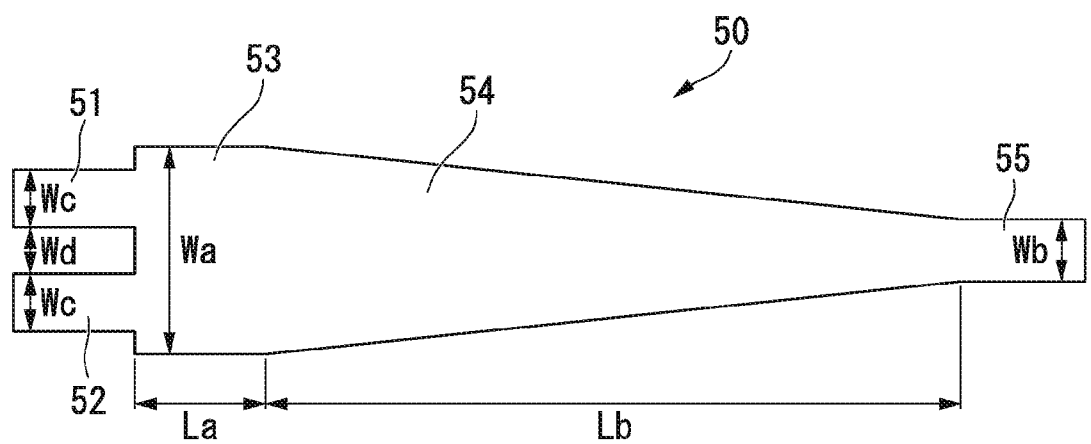
FIG. 32 is a plan view showing an example of a conversion multiplexing device that generates $TE_1$.

FIG. 32 shows an example of a conversion multiplexing device that generates $TE_1$. The details of this structure will be described later as Example 8. A conversion multiplexing device 50 uses a characteristic that two mode distributions of $TE_1$ in a planar rectangular coupler section 53 is similar to the mode distribution of $TE_0$ of two input portions 51 and 52. When $TE_0$ is input from one or both of the two input portions 51 and 52, $TE_0$ is converted to $TE_1$ while passing through a tapered portion 54 from the coupler section 53, and is output from an output portion 55 as $TE_1$.

It is preferable to set the phase difference between two TE0 input to the input portions 51 and 52 to π. Since the input has an asymmetric (anti-symmetric) mode distribution, $TE_0$ having a symmetric mode distribution is not generated after multiplexing. Accordingly, since it is possible to prevent the generation of $TE_0$ that is not necessary after multiplexing, it is possible to limit a reduction in the polarization extinction ratio.

When the output portion 55 of the conversion multiplexing device 50 is connected to the start portion 8 of the high-order polarization conversion device shown in FIGS. 4A to 4D, for example, $TE_1$ output from the output portion 55 is converted to $TM_0$, and $TM_0$ is output from the end portion 9. For the multiplexing of $TM_0$ and $TE_0$, for example, it is possible to use a symmetric directional coupler 60 shown in FIG. 33. The details of the structure of the symmetric directional coupler 60 will be described later in Example 9. The symmetric directional coupler 60 has a structure in which two waveguides 61 and 62 having the same core width W are disposed in parallel with a predetermined gap G therebetween over a predetermined coupling length L. When $TE_0$ is input from the waveguide 61 and $TM_0$ is input from the waveguide 62 on the input side, $TM_0$ is shifted to the waveguide 61. Therefore, a polarization-multiplexed signal (TE/TM) can be obtained from the output side of the waveguide 61.

Figure 34:
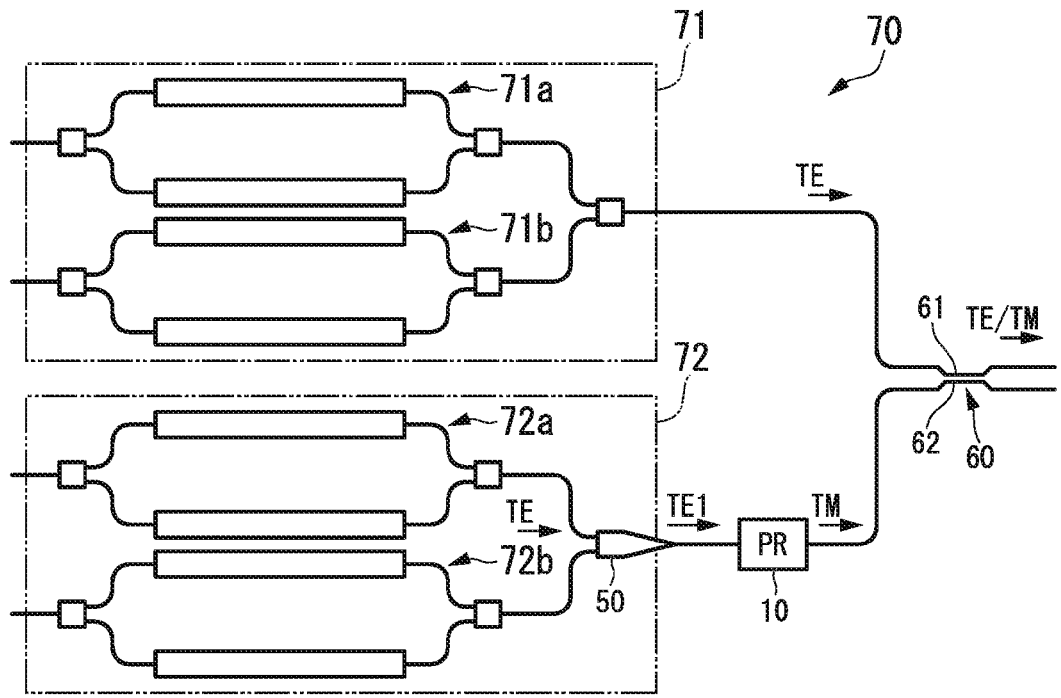
FIG. 34 is a plan view showing an example of a DP-QPSK modulator including the conversion multiplexing device shown in FIG. 32.
Figure 35:
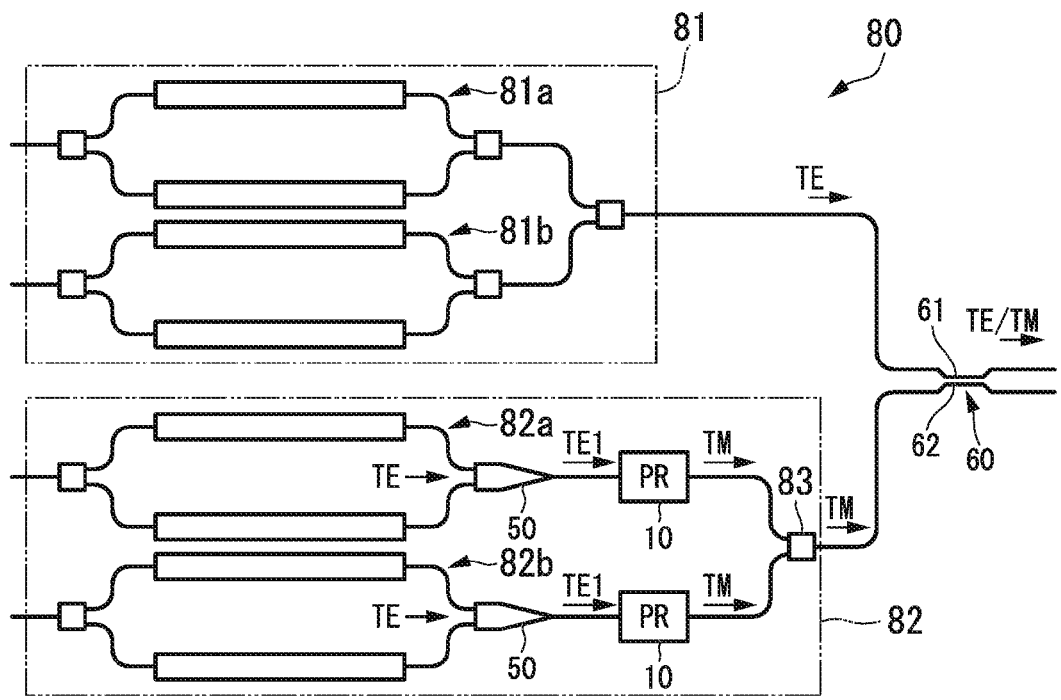
FIG. 35 is a plan view showing another example of the DP-QPSK modulator including the conversion multiplexing device shown in FIG. 32.

FIGS. 34 and 35 show examples of the configuration of a DP-QPSK modulator including the conversion multiplexing device 50 shown in FIG. 32. In the diagrams, $TE_0$ (fundamental TE mode), high-order TE mode, and $TM_0$ (fundamental TM mode) are abbreviated as "TE", "$TE_1$", and "TM", respectively. Each of QPSK modulators 71, 72, 81, and 82 includes two Mach-Zehnder interferometers. Mach-Zehnder interferometers 71*a*, 72*a*, 81*a*, and 82*a* on one side are for the in-phase component (I), and Mach-Zehnder interferometers 71*b*, 72*b*, 81*b*, and 82*b* on the other side are for the quadrature phase component (Q).

In a DP-QPSK modulator 70 shown in FIG. 34, the conversion multiplexing device 50 is provided in an I and Q coupler section of one QPSK modulator 72 of the two QPSK modulators 71 and 72 in order to convert $TE_0$ to $TE_1$, and the high-order polarization conversion device 10 converts $TE_1$ to $TM_0$. This $TM_0$ is multiplexed with $TM_0$ output from the other QPSK modulator 71 by the symmetric directional coupler 60.

In a DP-QPSK modulator 80 shown in FIG. 35, the conversion multiplexing device 50 is provided in coupler sections of two Mach-Zehnder interferometers 82*a* and 82*b* of one QPSK modulator 82 in order to convert $TE_0$ to $TE_1$, and the high-order polarization conversion device 10 converts $TE_1$ to $TM_0$. An MMI coupler section 83 for a TM mode is provided in an I and Q coupler section of the QPSK modulator 82, and the multiplexed $TM_0$ is multiplexed with $TM_0$ output from the other QPSK modulator 81 by the symmetric directional coupler 60.

According to these DP-QPSK modulators 70 and 80, the symmetric directional coupler 60 having better performance than the asymmetric directional coupler can be used for the multiplexing of $TM_0$ and $TE_0$. In addition, since the conversion multiplexing device 50 also serves as a coupler section, it is possible to reduce the polarization dependent loss (excess loss of MMI is 0.3 dB or less).

While the present invention has been described based on the preferred embodiments, the present invention is not limited to the embodiments described above, and various modifications can be made without departing from the scope of the present invention. By the same principle as in the present invention, a degenerate point where $TE_{2n-1}$ mode (n is an integer of 0 or more) and $TM_0$ cross each other in the effective refractive index curve can be separated by the same vertically asymmetric structure as in the present invention. Accordingly, it is possible to perform conversion by tapering the region therebetween. Here, $TE_{2n+1}$ refers to a mode having the (2n+2)-th highest effective refractive index among TE modes ($TE_0$, $TE_1$, $TE_2$, . . . ). The $TE_1$ mode is a $TE_{2n+1}$ mode when n=0.

The reason why the odd-order mode of the TE mode is converted is as follows. An x component (Ex) of the electric field of $TM_0$ propagating through the rectangular core (symmetric structure (refractive index distribution) in both the width and height directions) has anti-symmetric distribution in both the width and height directions. On the other hand, Ex of the odd-order TE mode including $TE_1$ has an anti-symmetric electric field distribution in the width direction and a symmetric electric field distribution in the height direction. For this reason, by making the refractive index distribution asymmetric with respect to the height direction, the symmetry of $TE_{2n+1}$ in the height direction is lost. Then, the respective modes are mixed near the degenerate point by interaction with $TM_0$. Accordingly, the degenerate point is separated. Therefore, by the same structure as in the present invention, conversion between $TE_{2n+1}$ mode and $TM_0$ is possible.

EXAMPLES

Hereinafter, the invention will be specifically described by way of examples.

Calculation Example 1

Figure 18:
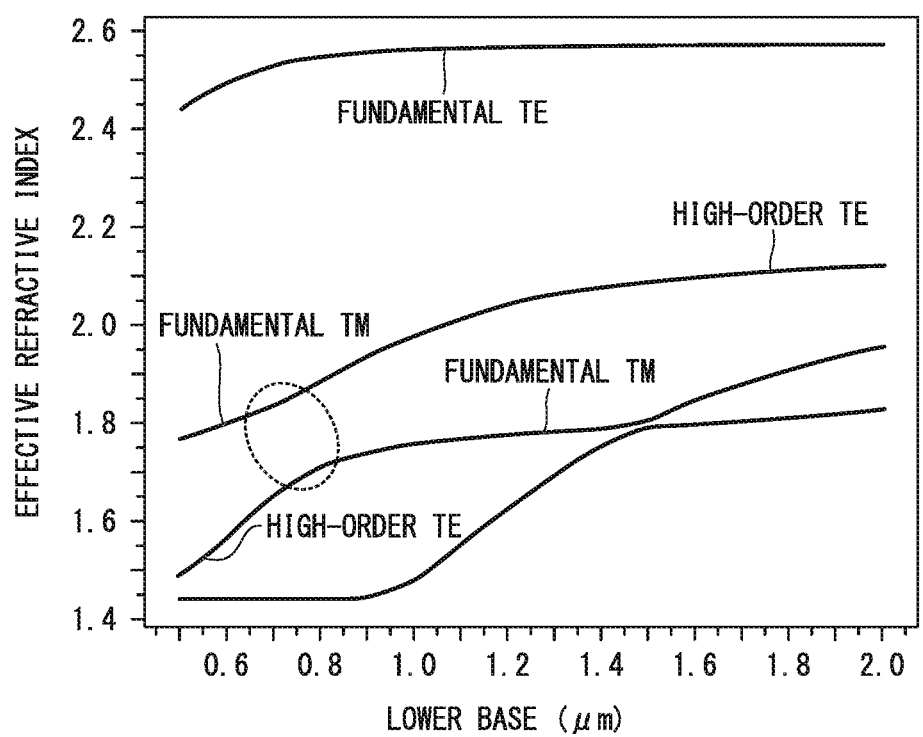
FIG. 18 is a graph showing a change in the effective refractive index with respect to the lower base in Calculation Example 1.

FIG. 18 is a graph showing changes in effective refractive indices of four modes in descending order of the effective refractive index when changing the lower base of an optical waveguide having a convex core as shown in FIGS. 2A and 2B. The wavelength is 1.55 μm, the core is formed of Si and has a refractive index of 3.48, each of an upper clad and a lower clad is formed of $SiO_2$ and has a refractive index of 1.44, the height of the optical waveguide is 0.22 μm, the height of the lower core is 0.095 μm, the width of the upper core is 0.5 μm, and the upper core is located at the center of the lower core.

As shown in FIG. 18, a mode having the highest effective refractive index is $TE_0$, and a mode having the second or third highest effective refractive index depends on (width of) the lower base and is $TE_1$, $TM_0$, or a mode changed from these modes. A mode having the fourth highest effective refractive index is a higher-order mode although not specified in the diagram.

As can be seen from FIG. 18, due to the vertical asymmetry of the sectional shape of the core, there is always an effective refractive index difference between $TE_1$ and $TM_0$ without degeneracy. In FIG. 18, as a dotted ellipse (near 0.7 μm of the lower base), the outline range of a mode conversion portion is shown. In this mode conversion portion, the mode having the second highest effective refractive index is $TM_0$ when the lower base is narrow and $TE_1$ when the lower base is wide. On the contrary, the mode having the third highest effective refractive index is $TE_1$ when the lower base is narrow and $TM_0$ when the lower base is wide. Therefore, each mode can be converted by following the same effective refractive index curve (either the mode having the second highest effective refractive index or the mode having the third highest effective refractive index).

In order to see the transition of these modes, FIGS. 19 to 22 show the electric field amplitude of an Ex component (component in the width direction) and an Ey component (component in the height direction) of the electric field in each of the mode (#1) having the second highest effective refractive index or the mode (#2) having the third highest effective refractive index for several widths of the lower base. In common to FIGS. 19 to 22, (a) in each diagram shows the electric field amplitude of the Ex component of "#1", (b) in each diagram shows the electric field amplitude of the Ey component of "#1", (c) in each diagram shows the electric field amplitude of the Ex component of "#2", and (d) in each diagram shows the electric field amplitude of the Ey component of "#2".

Figure 19:
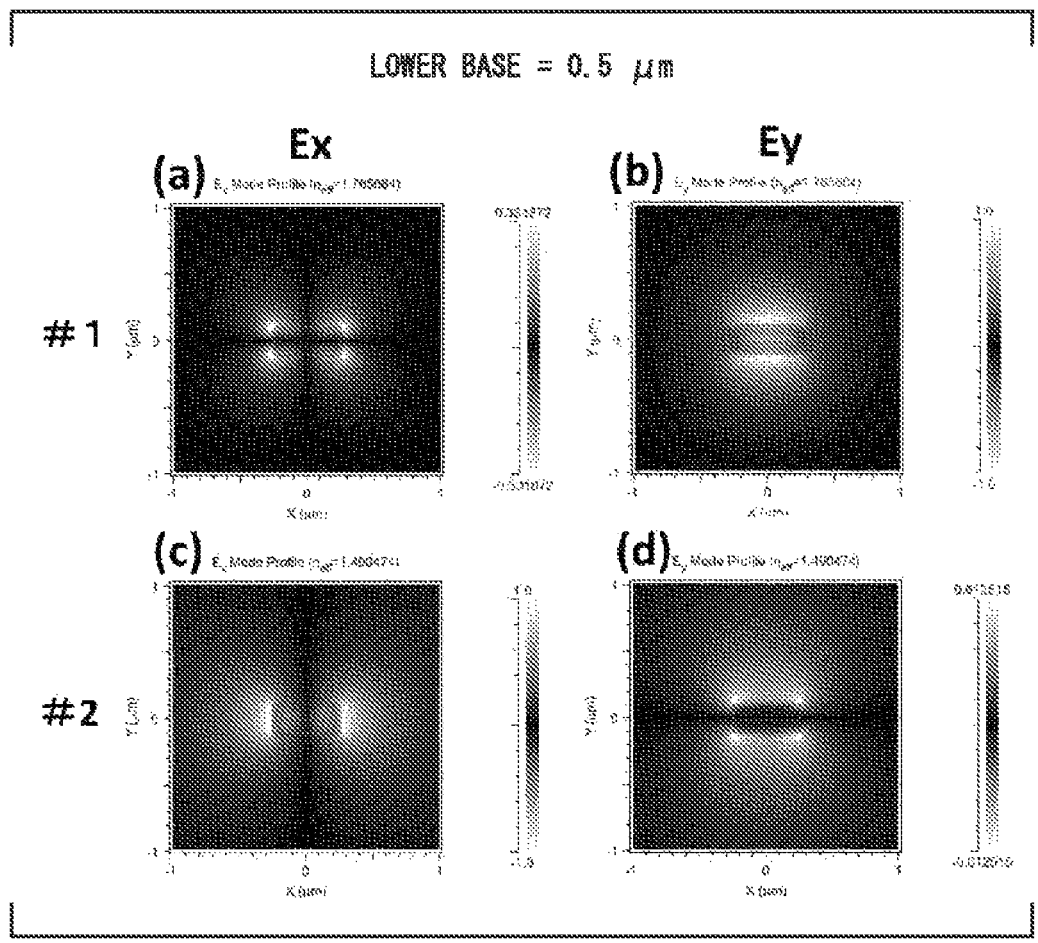
FIG. 19 contains diagrams showing the electric field amplitude when the lower base is 0.5 µm in Calculation Example 1.
Figure 20:
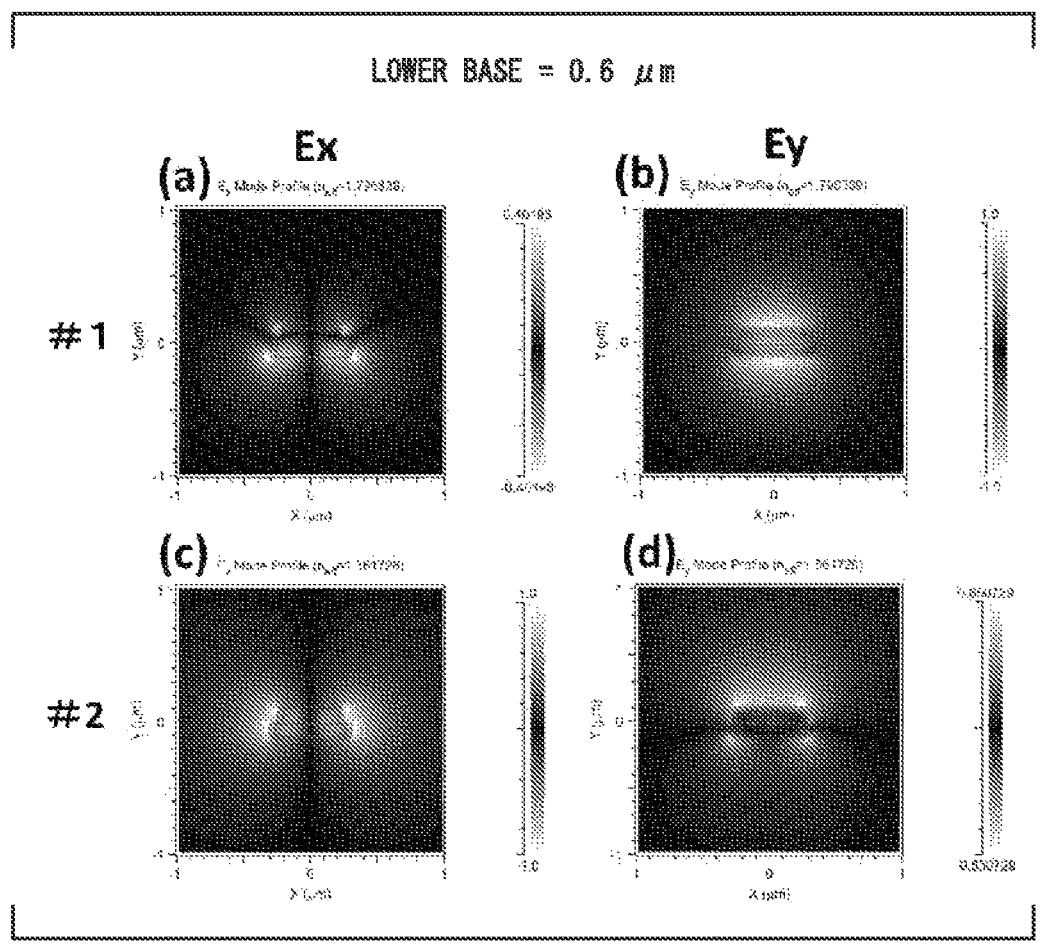
FIG. 20 contains diagrams showing the electric field amplitude when the lower base is 0.6 µm in Calculation Example 1.
Figure 21:
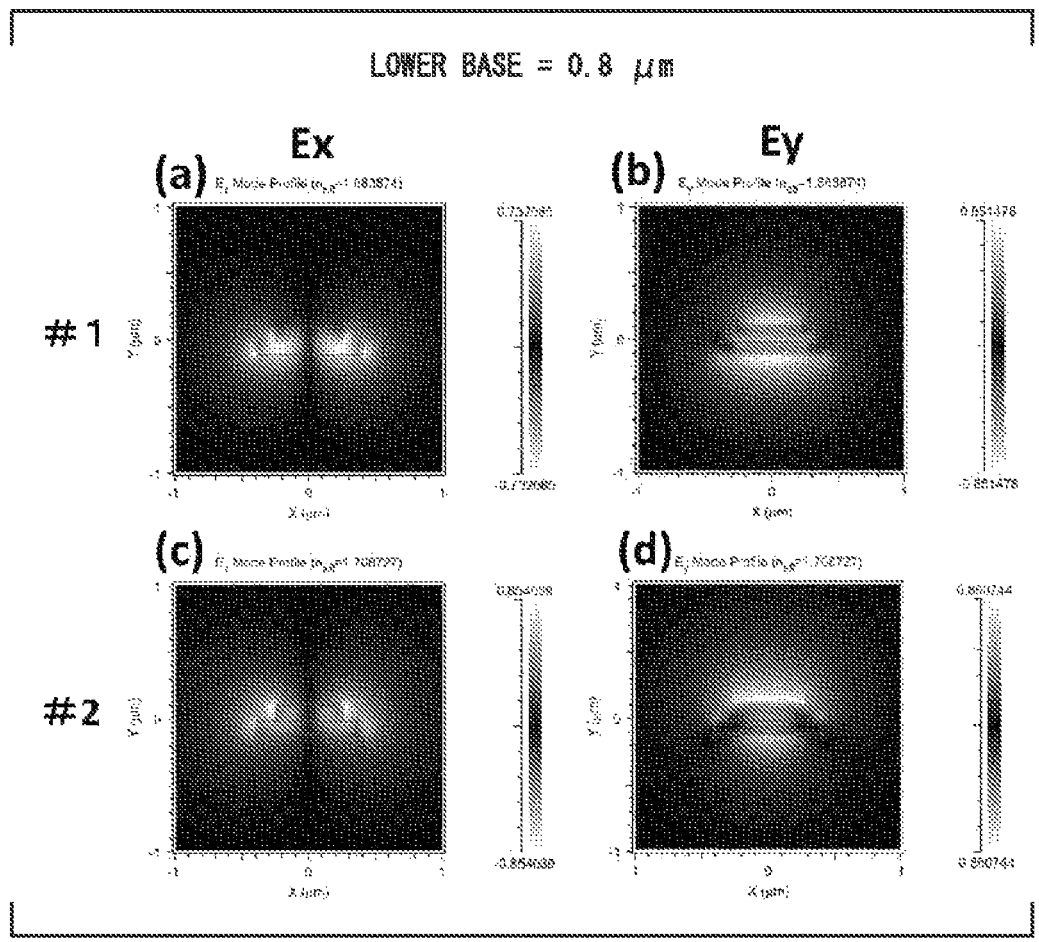
FIG. 21 contains diagrams showing the electric field amplitude when the lower base is 0.8 µm in Calculation Example 1.
Figure 22:
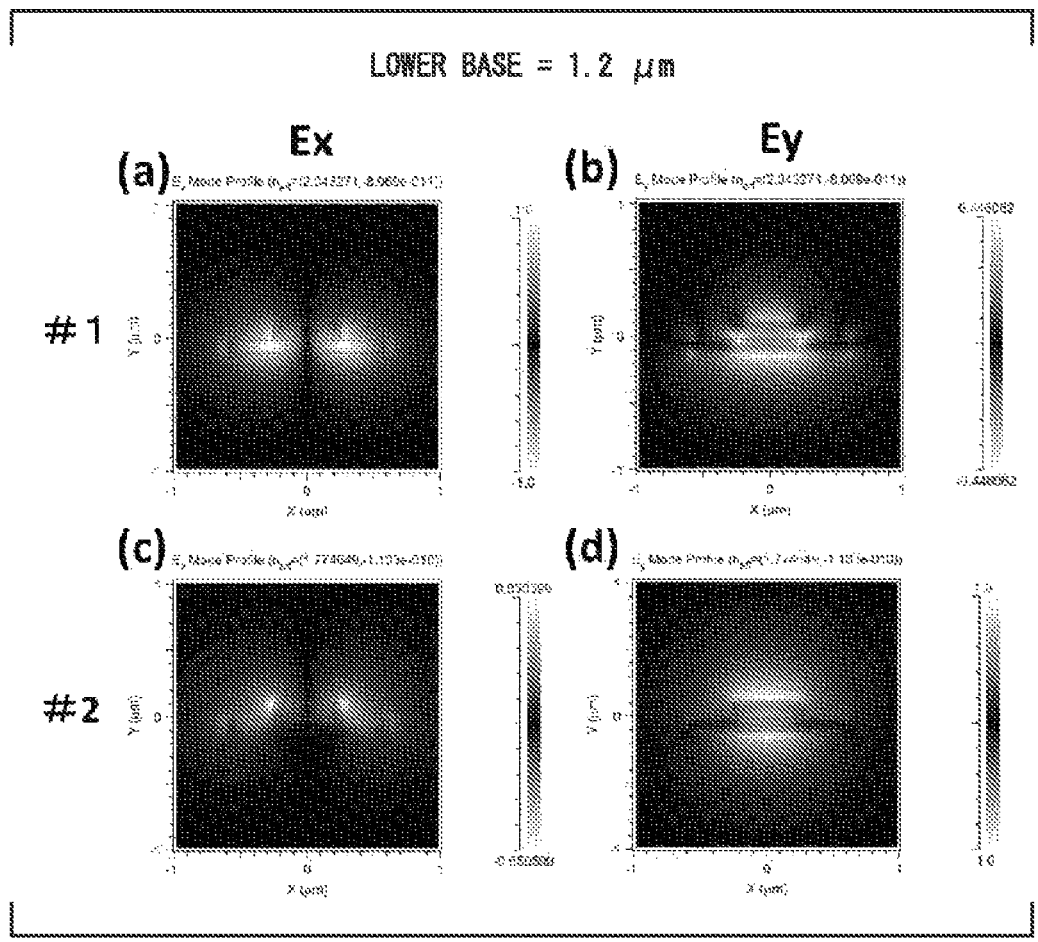
FIG. 22 contains are diagrams showing the electric field amplitude when the lower base is 1.2 µm in Calculation Example 1.

Focusing on the electric field amplitude, it can be seen that #1 is $TM_0$ and #2 is $TE_1$ in FIG. 19 in which the width of the lower base is 0.5 μm and that #1 is $TE_1$ and #2 is $TM_0$ in FIG. 22 in which the width of the lower base is 1.2 μm on the contrary. On the other hand, it can be seen that the electric field components of #1 and #2 have started to change in FIG. 20 in which the width of the lower base is 0.6 μm and both the Ex and Ey components have close electric field amplitudes in FIG. 21 in which the width of the lower base is 0.8 μm.

From the above, it is possible to see how $TE_1$ and $TM_0$ are continuously converted. This also shows that polarization conversion between $TE_1$ and $TM_0$ is possible.

Comparative Example 1

In Comparative Example 1, a waveguide 101 shown in FIGS. 3A and 3B has a structure in which a core 102 is formed of Si, the material of a lower clad 103 is $SiO_2$, and an upper clad 104 is formed of air, the height H0 of the core 102 is 0.22 μm, the width W1 of the start portion is 0.84 μm, the width W2 of the end portion is 0.5 μm, a length L0 in the longitudinal direction is 35 μm, and the core width is linearly changed in the longitudinal direction from the rectangular waveguide of the start portion. The conversion loss (ratio expressed by the power of output $TM_0$/power of input $TE_1$) in high-order polarization conversion calculated by simulation using a finite-difference time domain (FDTD) method was 0.587 dB.

Example 1

Based on Calculation Example 1, a waveguide device of Example 1 having a structure (refer to the first embodiment described above) in which the upper core is located at the center of the lower core is manufactured.

FIGS. 4A to 4D are diagrams showing the device of this example. In this example, a waveguide is manufactured based on a silicon on insulator (SOI) substrate formed of Si—$SiO_2$—Si. An intermediate $SiO_2$ layer is used as a lower clad, and an upper Si layer is used as a core. After forming the core, the $SiO_2$ layer is disposed as an upper clad.

The height H2 of the lower core 4 is 0.095 μm, the height (difference of H1-H2) of the upper core 3 is 0.125 μm, and the core height H1 including the lower core 4 and the upper core 3 is 0.22 μm. At the start portion 8, the width W1 of each of the upper core and the lower core is 0.84 μm. In a section L2 (15 μm in length), the width W2 of the upper core 3 is 0.5 μm, and the upper core 3 is located at the center of the lower core 4. In a section L1 (20 μm in length), the width W1 of the lower core 4 is 0.84 μm. At the end portion 9, the width W2 of each of the upper core and the lower core is 0.5 μm. In the section L2 of the structure in Example 1, parameters, such as the width of the upper core of 0.5 μm, are the same as in Calculation Example 1. Accordingly, a range where the width of the lower base is 0.5 to 0.84 μm in the graph of FIG. 18 obtained above can be applied to Example 1.

Figure 23:
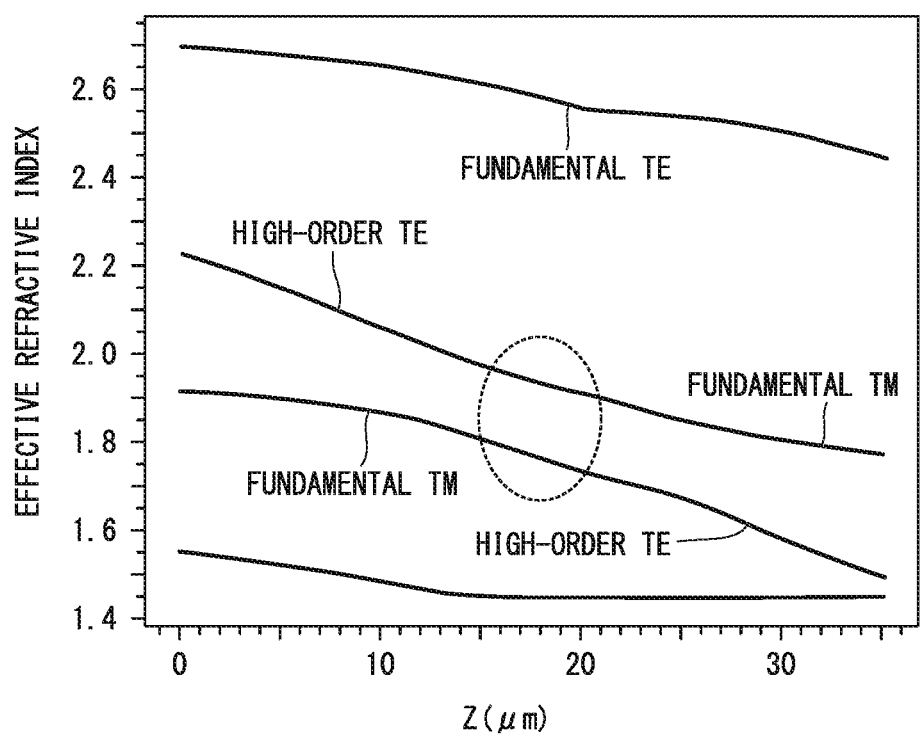
FIG. 23 is a graph showing a change in the effective refractive index with respect to the Z coordinate in Example 1.
Figure 24:
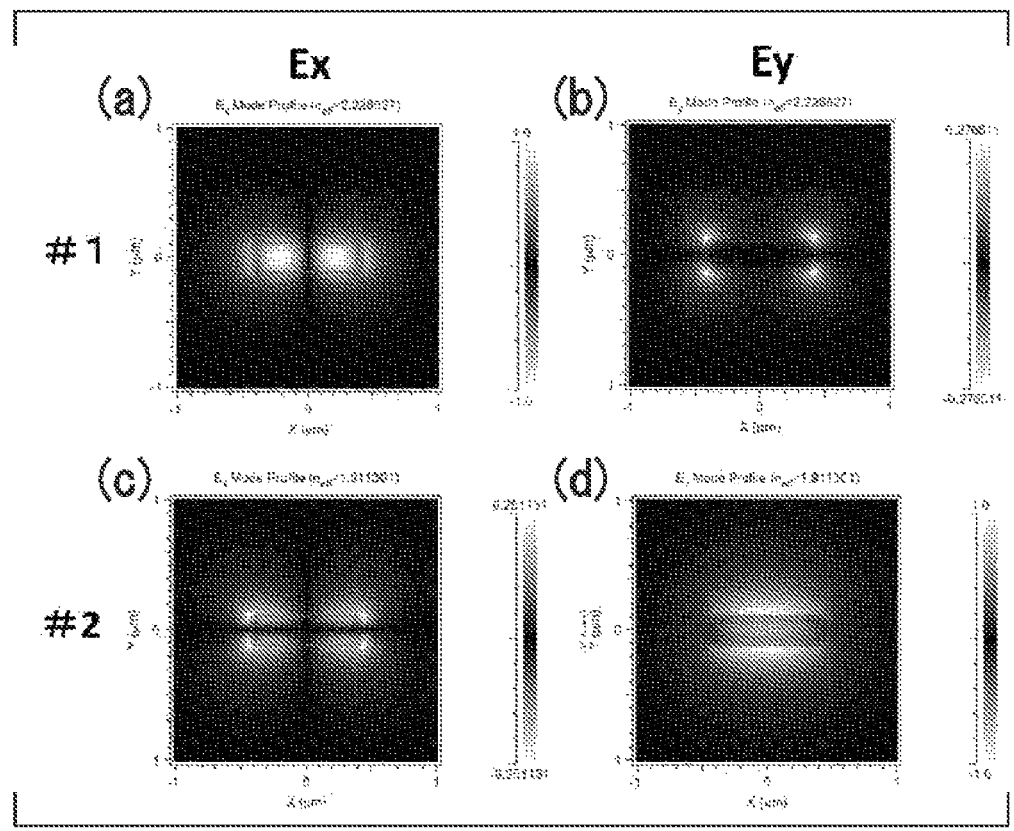
FIG. 24 contains diagrams showing the electric field amplitude of the start portion section in Example 1.

Assuming that the coordinates of light in the propagation direction are Z, an effective refractive index curve calculated in the section of Z for the total length of Example 1 is shown in FIG. 23. Mode conversion is performed near the elliptical region in the diagram. In order to show that it is possible to perform high-order polarization conversion, Ex and Ey components of waveguide modes having the second (#1) and third (#2) largest effective refractive indices between the start portion and the end portion are compared. In FIG. 23, the start portion is Z=0 μm, the end portion is Z=35 μm, and the position of IVc (intermediate portion) in FIG. 4A is Z=20 μm. The mode of the start portion section (Z=0 μm) is shown in FIG. 24, and the mode of the end portion section (Z=35 μm) is the same as in FIG. 19. From these, it can be seen that the main electric field is changed from Ex to Ey between the start portion and the end portion in the mode of #1 and the main electric field is changed from Ey to Ex between the start portion and the end portion in the mode of #2. Given that these effective refractive index curves are continuously connected to each other without crossing each other, it can be seen that conversion from high-order TE to fundamental TM (from fundamental TM to high-order TE) is possible. FIG. 21 corresponds to the electric field near Z=21.8 µm, Ex and Ey are approximately the same, and the transient electric field distribution of conversion can be seen.

According to FIGS. 18 and 23, the effective refractive index difference between the mode having the second highest effective refractive index and the mode having the third highest effective refractive index is 0.16 at a point where both the modes are closest to each other.

As a comparison, in a structure including the same ends of the upper core and the lower core in Example 2 to be described later, the effective refractive index difference at the point where both the modes are closest to each other is 0.10. As the effective refractive index difference increases, the efficiency of high-order polarization conversion increases. Therefore, in the case of the structure in which the upper core is located at the center of the lower core, it is possible to reduce the length (taper length) of the high-order polarization conversion device.

In addition, even if the upper core is shifted in the width direction by +60 nm (it is assumed that, if the upper core is shifted to a range with no lower core, a new lower core is formed in the range), the effective refractive index difference at the point where both the modes are closest to each other is 0.15. Accordingly, since the effective refractive index curve is separated (does not degenerate), high-order polarization conversion is possible.

In the above structure, the wavelength dependence of the conversion loss (ratio expressed by the power of output $TM_0$/power of input $TE_1$) of $TM_0$ that was output from the end portion 9 when $TE_1$ was input to the start portion 8 was calculated using the FDTD method. As a result, it was confirmed that there was little loss with respect to high-order polarization conversion.

Figure 25:
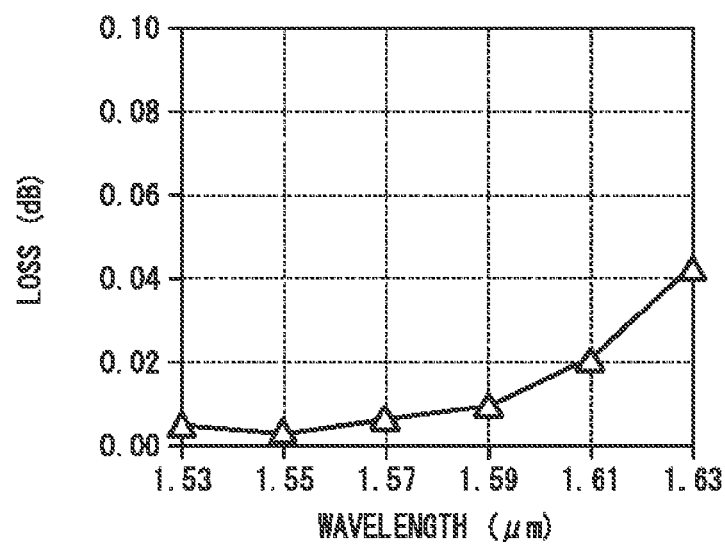
FIG. 25 is a graph of the wavelength dependence of the conversion loss calculated in Example 1.

FIG. 25 shows the wavelength dependence of the conversion loss. From this, it can be seen that the conversion loss is 0.05 dB or less over the wide band of 1530 nm to 1630 nm. Conversion loss at a wavelength of 1550 nm is 0.004 dB. Compared with the structure of Comparative Example 1 described above, the input and end portions have the same core shape and the lengths in the longitudinal direction are also the same in Example 1. On the other hand, conversion loss in Comparative Example 1 is 0.587 dB, and conversion loss in Example 1 is 0.004 dB. Therefore, conversion in Example 1 can be performed with less loss than in Comparative Example 1.

Figure 26:
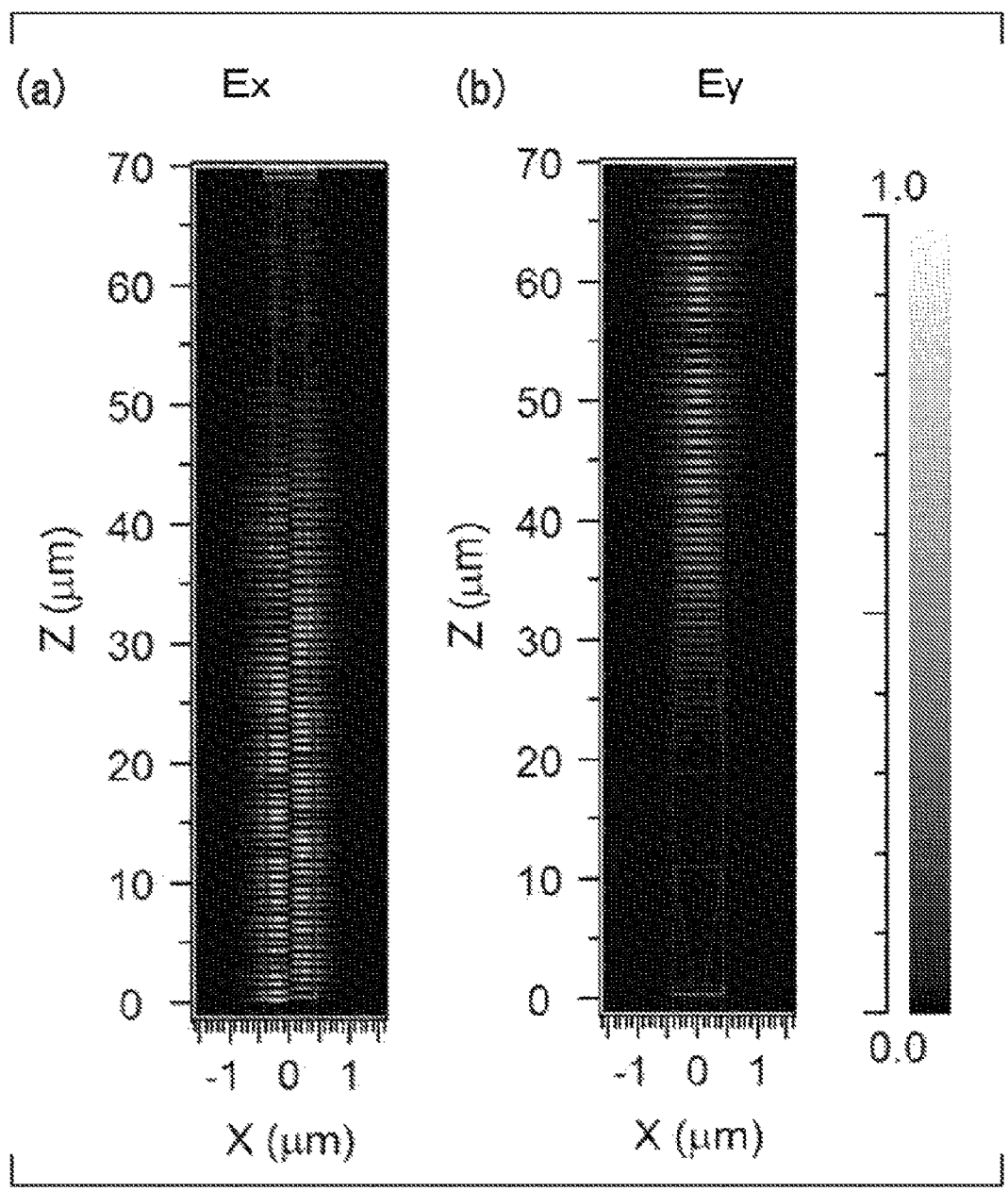
FIG. 26 result (a) is a simulation result when the Ex component of the electric field along the waveguide is calculated using the FDTD method in Example 1, and FIG. 26 result (b) is a simulation result when the Ey component of the electric field along the waveguide is calculated using the FDTD method in Example 1.

FIG. 26 shows a result obtained by calculating the electric field at the wavelength of 1550 nm in the structure of Example 1 using the FDTD method. In FIG. 26, the start portion 8 is located at a position of Z=20 µm, and the end portion 9 is located at a position of Z=55 µm. In addition, FIG. 26 diagram (a) shows an Ex component, and FIG. 26 diagram (b) shows an Ey component. It can be seen how the input $TE_1$ (the Ex component is the main component) is finally changed to $TM_0$ (the Ey component is the main component) by this structure.

In addition, the transmission loss (ratio expressed by the power of output $TE_0$/power of input $TE_0$) of $TE_0$ that was output from the end portion 9 when $TE_0$ was input to the start portion 8, which was calculated for the same structure, was 0.001 dB or less (wavelength of 1.55 µm). Therefore, it can be seen that $TE_0$ is transmitted with a small loss.

Example 2

As shown in FIGS. 5A to 5D, a high-order polarization conversion device having a structure in which ends of the upper core and the lower core match each other (refer to the second embodiment described above) is manufactured using the same method as in Example 1.

The height H2 of the lower core 4 is 0.095 µm, the height (difference of H1-H2) of the upper core 3 is 0.125 µm, and the core height H1 including the lower core 4 and the upper core 3 is 0.22 µm. At the start portion 8, the width W1 of each of the upper core and the lower core is 0.84 µm. In a section L2 (15 µm in length), the width W2 of the upper core 3 is 0.5 µm. In a section L1 (20 µm in length), the width W1 of the lower core 4 is 0.84 µm. In addition, over the entire length of the sections L1 and L2, the upper core and the lower core are located so that the ends of the upper core and the lower core match each other. At the end portion 9, the width W2 of each of the upper core and the lower core is 0.5 µm.

In the above structure, assuming that the wavelength of light was 1550 nm, the conversion loss (ratio expressed by the power of output $TM_0$/power of input $TE_1$) of $TM_0$ that was output from the end portion 9 when $TE_1$ was input to the start portion 8 was calculated using the FDTD method. As a result, conversion loss was 0.26 dB. Therefore, it was confirmed that the conversion efficiency is reduced rather than the device in Example 1, which has the same length, but it is possible to perform conversion with a small loss.

Example 3

As shown in FIGS. 6A to 6C, a high-order polarization conversion device having a structure (refer to the third embodiment described above) in which the sectional shape of the start portion 8 is a rib waveguide, the sectional shape of the end portion 9 is a rectangular waveguide, and the centers of the upper core 3 and the lower core 4 in the width direction match each other.

The height H2 of the lower core 4 is 0.095 µm, the height (difference of H1-H2) of the upper core 3 is 0.125 µm, and the core height H1 including the lower core 4 and the upper core 3 is 0.22 µm. At the start portion 8, the width W1a of the upper core 3 is 1 µm, and the width W1 of the lower core 4 is 4 µm. At the end portion 9, the width W2 of each of the upper core and the lower core is 0.5 µm. The maximum core width of the start portion 8 is 4 µm that is limited, but the distribution of TE1 passing through the section is sufficiently inward from both ends of the lower core 4 of the start portion 8. Therefore, since the slab width is sufficiently large, it can be regarded as a rib waveguide.

Figure 27:
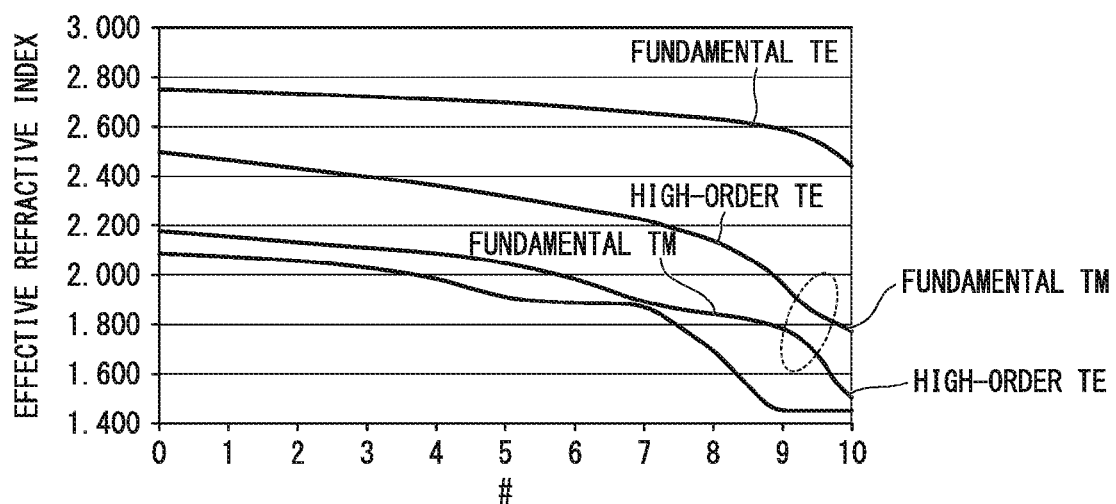
FIG. 27 is a graph showing a change in the effective refractive index in the structure of Example 3.

FIG. 27 is a graph showing changes in effective refractive indices of four modes in descending order of the effective refractive index on respective sections (denoted by #) in the structure of Example 3. A region from the start portion to the end portion is divided into ten equal portions in the longitudinal direction, and numbers are given in order from the start portion (#0) to the end portion (#10). Based on the point that the lower base decreases as the number of # increases, it can be seen that the four modes are the same as those in FIG. 18 in Calculation Example 1. Since the effective refractive indices of $TE_1$ and $TM_0$ are separated at the dotted ellipse (mode conversion portion) shown near #9 in FIG. 27, it can be seen that high-order polarization conversion between $TE_1$ and $TM_0$ is possible. In this case, the minimum effective refractive index difference is 0.15.

Example 4

As shown in FIGS. 9A to 9C, a high-order polarization conversion device having a structure (refer to the fourth embodiment described above), in which the sectional shape of the start portion 8 is a rectangular waveguide, the sectional shape of the end portion 9 is a protruding shape, and the centers of the upper core 3 and the lower core 4 in the width direction match each other, is manufactured using the same method as in Example 1.

The height H2 of the lower core 4 is 0.095 μm, the height (difference of H1-H2) of the upper core 3 is 0.125 μm, and the core height H1 including the lower core 4 and the upper core 3 is 0.22 μm. At the start portion 8, the width W1 of each of the upper core and the lower core is 0.8 μm. At the end portion 9, the width W2a of the upper core 3 is 0.44 μm, and the width W2 of the lower core 4 is 0.5 μm. In this case, the size relationship between the area of the lower base and the area of the upper bottom (unit: μm) is "area of upper bottom=0.8–1.2×(0.8–area of lower base)".

Figure 28:
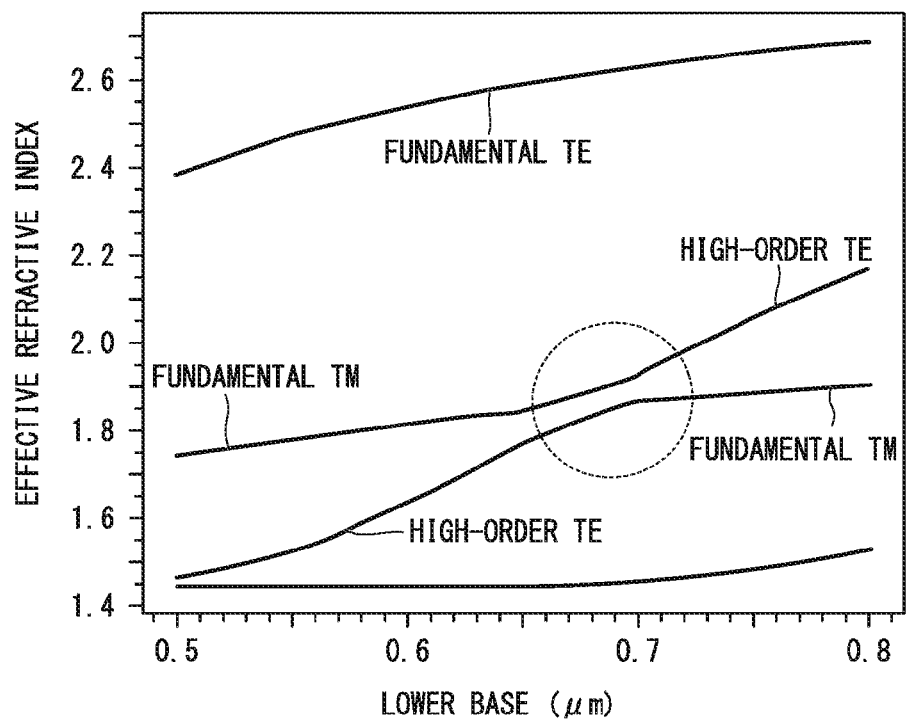
FIG. 28 is a graph showing a change in the effective refractive index in the structure of Example 4.

FIG. 28 is a graph showing changes in effective refractive indices of four modes in descending order of the effective refractive index for the size of the lower base in the structure of Example 4. It can be seen that the four modes are the same as those in FIG. 18 in Calculation Example 1. The effective refractive indices of $TE_1$ and $TM_0$ are separated at the dotted ellipse (mode conversion portion) shown near the lower base of 0.7 μm. Therefore, it can be seen that high-order polarization conversion between $TE_1$ and $TM_0$ is possible.

Example 5

As shown in FIGS. 11A to 11C, a high-order polarization conversion device having a structure (refer to the fifth embodiment described above), in which the sectional shapes of the start portion 8 and the end portion 9 are protruding shapes and the centers of the upper core 3 and the lower core 4 in the width direction match each other, is manufactured using the same method as in Example 1.

The height H2 of the lower core 4 is 0.095 μm, the height (difference of H1-H2) of the upper core 3 is 0.125 μm, and the core height H1 including the lower core 4 and the upper core 3 is 0.22 μm. At the end portion 8, the width W1a of the upper core 3 is 0.7 μm, and the width W1 of the lower core 4 is 1.1 μm. At the end portion 9, the width W2a of the upper core 3 is 0.3 μm, and the width W2 of the lower core 4 is 0.7 μm. In this case, the size relationship between the area of the upper bottom and the area of the lower base (unit: μm) is "area of lower base=area of upper bottom+0.4".

Figure 29:
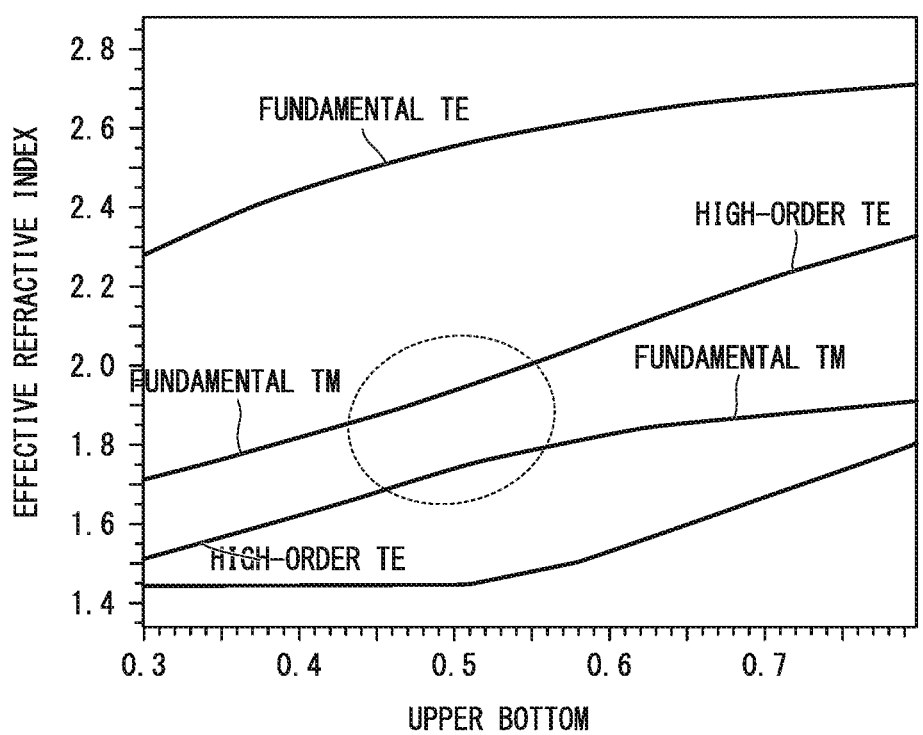
FIG. 29 is a graph showing a change in the effective refractive index in the structure of Example 5.

FIG. 29 is a graph showing changes in effective refractive indices of four modes in descending order of the effective refractive index for the area of the upper bottom in the structure of Example 5. It can be seen that the four modes are the same as those in FIG. 18 in Calculation Example 1. The effective refractive indices of $TE_1$ and $TM_0$ are separated at the dotted ellipse (mode conversion portion) shown near the upper bottom of 0.5 μm. Therefore, it can be seen that high-order polarization conversion between $TE_1$ and $TM_0$ is possible.

Example 6

FIGS. 13A and 13B show an example of a polarization conversion device formed by combining the high-order polarization conversion device of Example 1 with an asymmetric directional coupler.

In the section of the asymmetric directional coupler 13 shown in FIG. 13B, the core width E of the first optical waveguide 11 is 0.4 μm, the core width F of the second optical waveguide 12 is 0.84 μm, the height H of the core of each of the first and second optical waveguides 11 and 12 is 0.22 μm, and a gap G between the two waveguides is 0.35 μm.

The first optical waveguide 11 includes a linear portion having a length of 54 μm and a bent waveguide having a bending radius of the radius of 40 μm that is connected to the linear portion. The second optical waveguide 12 includes a linear portion having a length of 54 μm and a bent waveguide having a bending radius of 40 μm that is connected to the linear portion. The linear portions of the respective waveguides are parallel, and both end surfaces are on the same plane.

When $TE_0$ input to the first port 11a was coupled to $TE_1$ of the second optical waveguide 12 in the asymmetric directional coupler 13 and was output as $TE_1$ from the third port 12b, conversion loss at the time of conversion to $TE_1$ from $TE_0$ was calculated by simulation using the FDTD method. According to this structure, when the wavelength was 1550 nm, the conversion loss was 0.105 dB. From this, it can be seen that conversion between $TE_0$ and $TE_1$ is possible by use of this structure.

Since the conversion loss of the high-order polarization conversion device 10 is 0.004 dB as described in Example 1, the entire conversion loss as a polarization conversion device formed by combining the high-order polarization conversion device 10 with the asymmetric directional coupler 13 is 0.109 dB. Therefore, it can be seen that polarization conversion is possible.

Example 7

As shown in FIGS. 14A and 14B, it is also possible to manufacture a polarization conversion device in which an asymmetric directional coupler is a rib type waveguide. In the asymmetric directional coupler 13r shown in FIGS. 14A and 14B, the length Lr of the rib type waveguide is 20.8 μm. The width W1r of a rib 11r of the first optical waveguide is 0.4 μm, the width W2r of a rib 12r of the second optical waveguide is 0.95 μm, and the height H1r of each of ribs 11r and 12r is 0.22 μm. The width W1s of a slab 11s on the outer side of the first optical waveguide is 0.8 μm or more, the width W2s of a slab 12s on the outer side of the second optical waveguide is 1.1 μm or more, the width W3s of a slab 13s between the two waveguides is 0.3 μm, and the height H1s of the slab is 0.095 μm.

Figure 30:
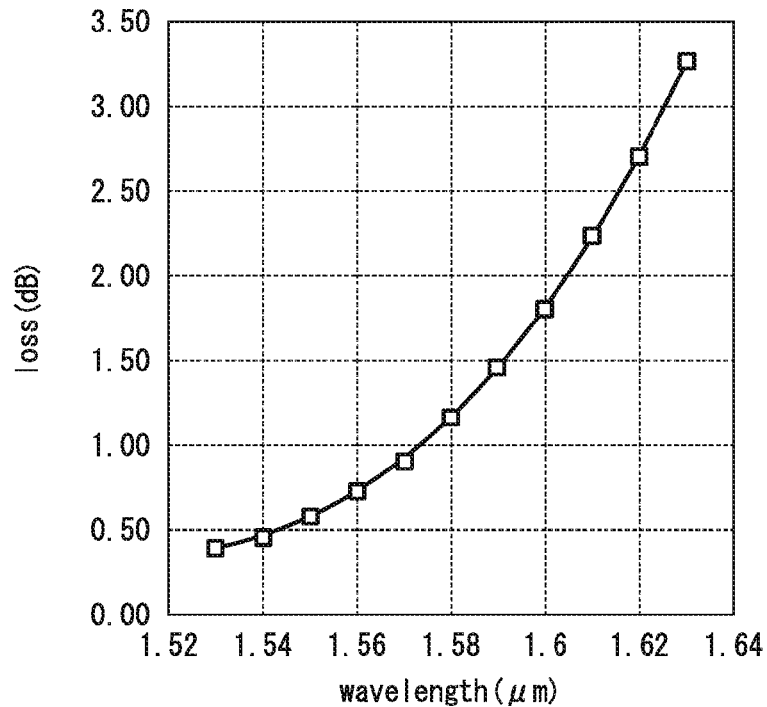
FIG. 30 is a graph showing the wavelength dependence of the polarization conversion loss in the structure of Example 7.
Figure 31:
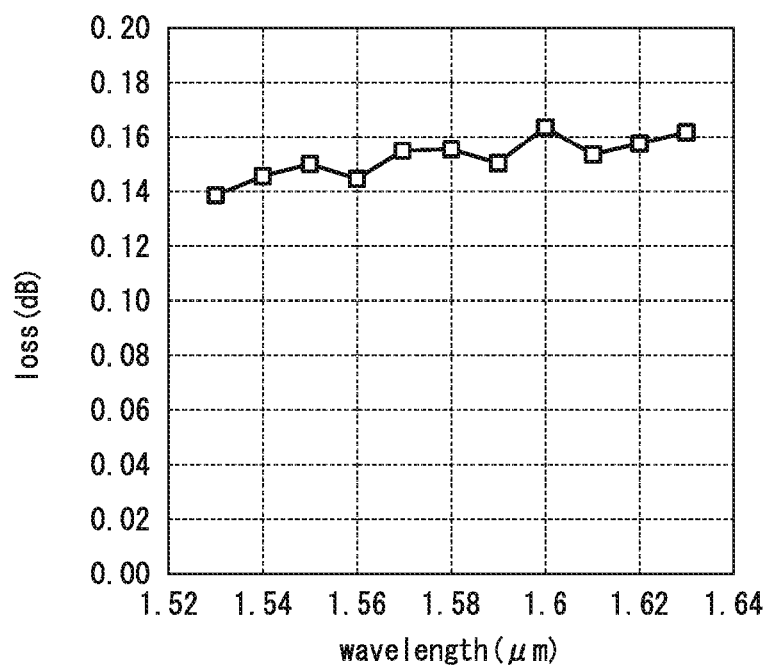
FIG. 31 is a graph showing the wavelength dependence of the transmission loss of $TE_0$ in the structure of Example 7.

The high-order polarization conversion device 10 is manufactured in the same manner as in Example 1. However, in this example, the width W1 of the start portion 8 is set to 0.95 μm that is the same as the width W2r of the rib 12r, and the width W2 of the end portion 9 is set to 0.6 μm. In addition, the length L1 of a section where the width of the upper core 3 changes is set to 15 μm or more, and the length L2 of a section where the width of the lower core 4 changes is set to 20 μm or more. FIGS. 30 and 31 show the results of the wavelength dependence of the loss calculated by simulation using the FDTD method for the polarization conversion device of Example 7.

FIG. 30 is a graph showing the wavelength dependence of the polarization conversion loss. The polarization conversion loss (loss in FIG. 30) is about 0.4 dB to 3.3 dB in a range of 1.53 μm to 1.63 μm. FIG. 31 is a graph showing the wavelength dependence of the transmission loss of $TE_0$. The transmission loss (loss in FIG. 31) is about 0.14 dB to 0.16 dB in a wavelength range of 1.53 μm to 1.63 μm. From these graphs, it can be seen that conversion between $TE_0$ and $TE_1$ is possible and that polarization multiplexing is also possible since $TE_0$ is transmitted with little loss.

Example 8

A conversion multiplexing device to generate $TE_1$ ($TE_1$) shown in FIG. 32 is manufactured based on a silicon on insulator (SOI) substrate formed of Si—$SiO_2$—Si as in Example 1. An intermediate $SiO_2$ layer is used as a lower clad, and an upper Si layer is used as a core. After forming the core, the $SiO_2$ layer is disposed as an upper clad.

The width We of each of the input portions 51 and 52 is 600 nm, a gap Wd between the input portions 51 and 52 is 350 nm, the width Wa of the coupler section 53 is 1700 nm, and the width Wb of the output portion 55 is 840 nm. The length La of the coupler section 53 is 1000 nm, and the length Lb of the tapered portion 54 is 6000 nm.

Figure 36:
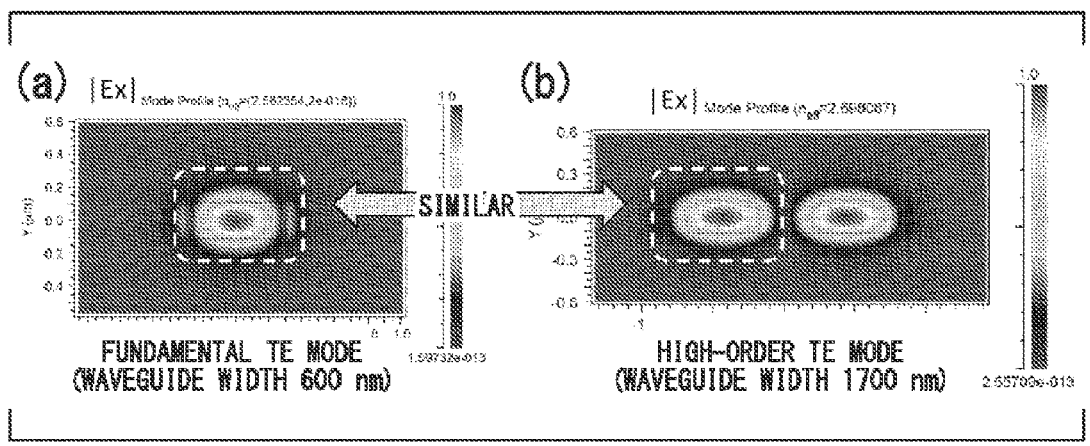
FIG. 36 diagram (a) is a diagram showing the mode distribution of a fundamental TE mode in the section of an input portion in a conversion multiplexing device of Example 8, and FIG. 36 diagram (b) is a diagram showing the simulation results of the mode distribution of the high-order TE mode in the section of a coupler section.

FIG. 36 result (a) and result (b) show the simulation results of the mode distribution of $TE_0$ in the section of an input portion (600 nm in width) and $TE_1$ in the section of a coupling portion (1700 nm in width). In the section of each of the input portions 51 and 52, $TE_0$ has one mode distribution having an elliptical shape that is long in the width direction of the waveguide. In the section of the coupler section 53, $TE_1$ has two mode distributions aligned in the width direction. However, the mode distribution in the section of each of the input portions 51 and 52 and the mode distribution in the section of the coupler section 53 are similar. From this, in the conversion multiplexing device 50 of this example, $TE_0$ of each of the input portions 51 and 52 can be coupled to $TE_1$ of the coupler section 53, and it is possible to convert $TE_0$ to $TE_1$.

Figure 37:
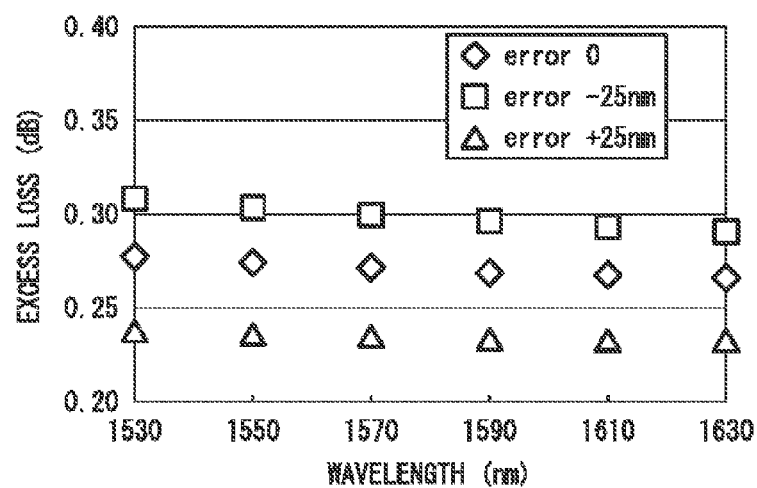
FIG. 37 is a graph showing the simulation results of the excess loss in the conversion multiplexing device of Example 8.

FIG. 37 shows the results of the simulation of the excess loss of the conversion multiplexing device of this example using a finite element method (FEM). Even when the manufacturing error of the width of the waveguide core was ±25 nm, excess loss over the range of 1530 nm to 1630 nm (equivalent to the C band and the L band) was less than 0.35 dB. This shows that this structure has high manufacturing tolerance and small wavelength dependence.

Figure 38:
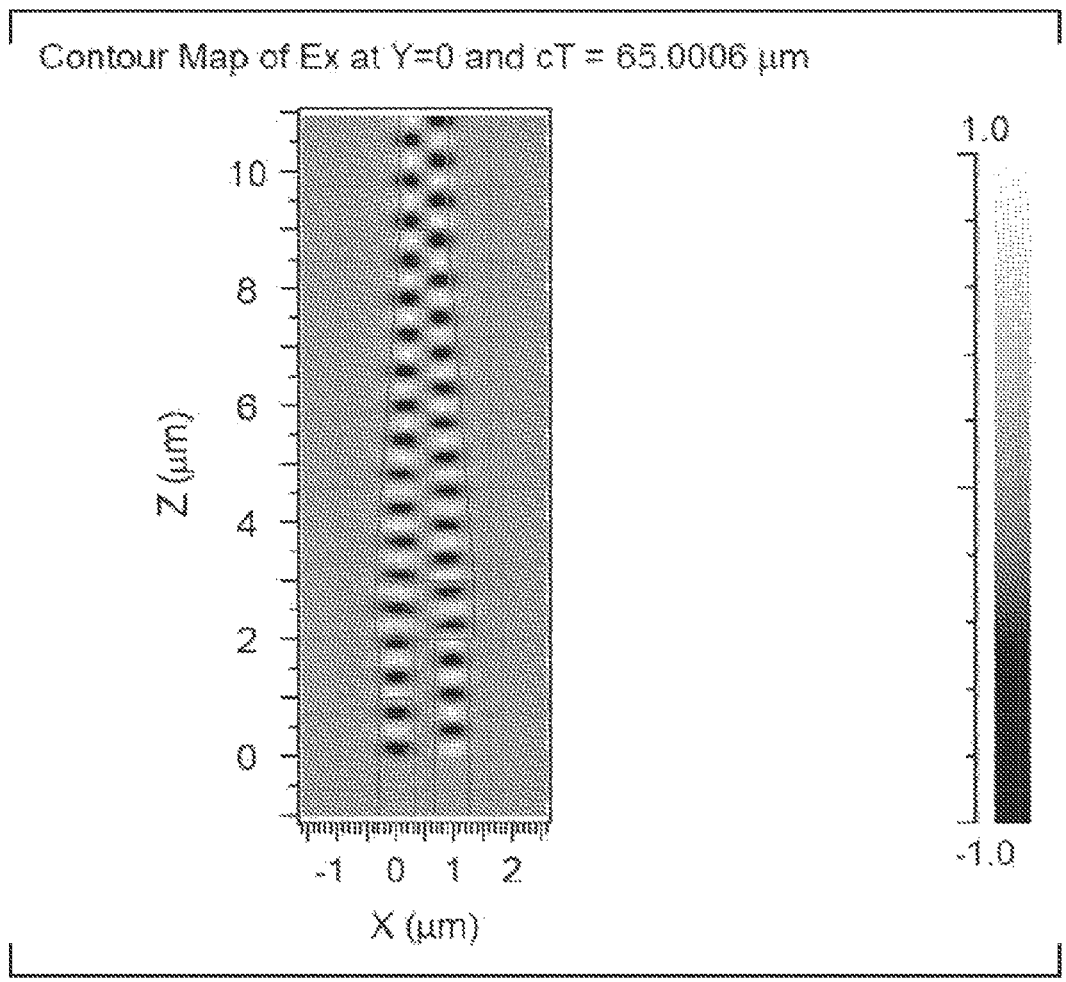
FIG. 38 is a diagram showing the results of the electric field simulation of the conversion multiplexing device of Example 8 using the FDTD method.

FIG. 38 shows the results of the electric field simulation of the conversion multiplexing device of this example using the FDTD method. In this diagram, the value of the electric field is displayed by being normalized in the range of +1 to −1, and +1 is white and −1 is black. From FIG. 38, it can be seen that the sections of $TE_0$ input from two input portions are coupled side by side by the coupling portion and the result is outputs as a $TE_1$ mode. In the distribution of the $TE_1$ mode, positive and negative signs are opposite in a waveguide width direction in which Z is equal. As described above, by setting the phase difference between the two input $TE_0$ to π, $TE_0$ with a symmetric mode distribution is not generated after multiplexing. Excess loss after $TE_1$ conversion can be 0.25 dB.

Example 9

Figure 33:
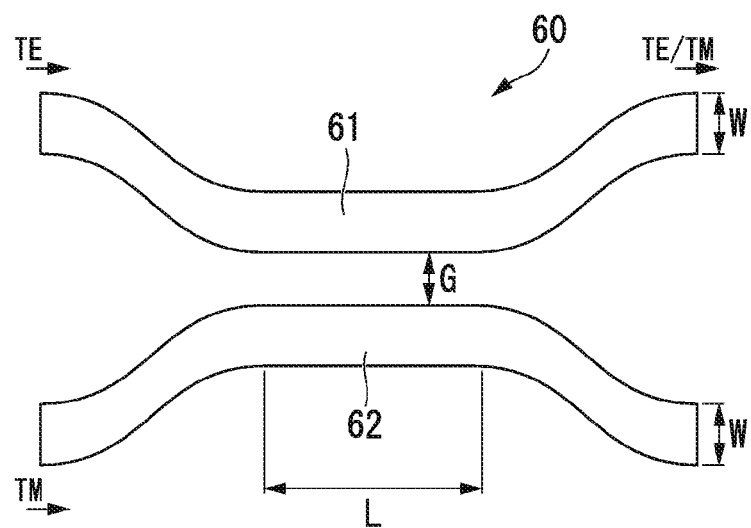
FIG. 33 is a plan view showing an example of a symmetric directional coupler.

The symmetric directional coupler shown in FIG. 33 is manufactured based on a silicon on insulator (SOI) substrate formed of Si—$SiO_2$—Si as in Example 1. An intermediate $SiO_2$ layer is used as a lower clad, and an upper Si layer is used as a core. After forming the core, the $SiO_2$ layer is disposed as an upper clad. The width W of each of the waveguides 61 and 62 is 500 nm, and the gap G between the waveguides 61 and 62 is 350 nm.

In the symmetric directional coupler 60 of this example, by appropriately setting the length L in which the two waveguides 61 and 62 are disposed in parallel using the fact that there is a difference between the coupling length of $TE_0$ and the coupling length of $TM_0$, only the $TM_0$ can be transmitted from one waveguide to the other waveguide. That is, a directional coupler is obtained in which the coupling loss of $TM_0$ is small and the coupling loss of $TE_0$ is large (with respect to the other waveguide, $TM_0$ is easy to be coupled and $TE_0$ is hard to be coupled).

As simulation results using the FDTD method, even when the manufacturing error of the waveguide core was ±25 nm, excess loss was small. In addition, in a wide wavelength range of 1530 nm to 1630 nm (equivalent to the C band and the L band), the coupling loss of $TM_0$ was less than 0.6 dB, and the coupling loss of $TE_0$ was 12 dB or more. This shows that this structure has high manufacturing tolerance and small wavelength dependence.

Example 10

Figure 43A:
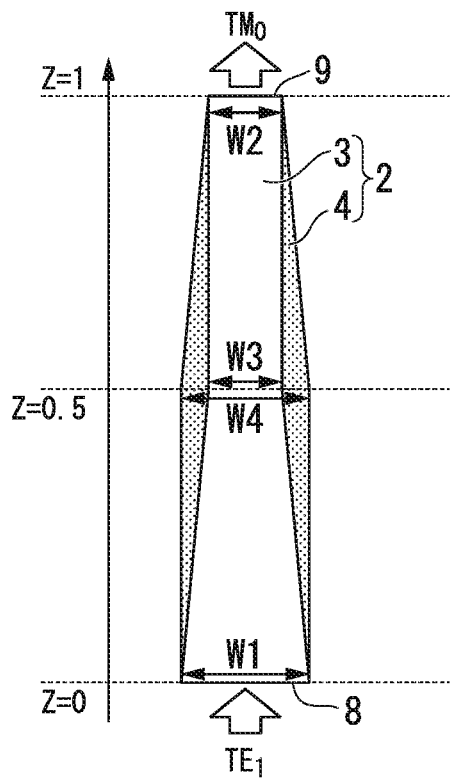
FIG. 43A is a diagram showing the structure of a high-order polarization conversion device of Example 10.
Figure 43B:
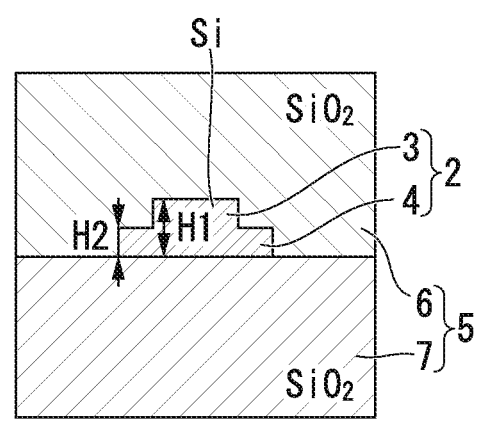
FIG. 43B is a diagram showing the structure of a high-order polarization conversion device of Example 10.

FIG. 43A shows a high-order polarization conversion device of Example 10 having a structure based on the first embodiment, and FIG. 43B shows a sectional view in the central portion (Z=0.5). Here, the coordinates of FIG. 43A indicate normalized value when the total device length is set to 1. The core 2 is formed of Si, and the clad 5 is formed of $SiO_2$. The width W1 of the start portion 8 (Z=0) was set to W1=850 nm, the width W2 of the end portion 9 (Z=1) was set to W2=500 nm, and the width of the upper core 3 and the width of the lower core 4 in a central portion (Z=0.5) were set to W3=500 nm and W4=850 nm, respectively. In both of the width of the upper core 3 and the lower core 4, the start portion, the central portion, and the end portion are connected in a straight line. In addition, the height of the core 2 and the height of the lower core 4 were fixed to H1=220 nm and H2=90 nm, respectively.

The high-order polarization conversion device shown in FIGS. 43A and 43B can be formed by removing an SI layer of the SOI substrate by etching and depositing $SiO_2$ thereon. This example shows through simulation that the high-order polarization conversion according to the embodiment described above is possible.

First, the definition of a high-order polarization conversion portion will be described. In order to quantitatively show whether the dominant electric field component of waveguide modes is Ex or Ey, amounts $R_{TE}$ and $R_{TM}$ showing each proportion are defined as in the following Equation (1) and (2).

$$R_{TE} = \frac{\left|\int_S E_x H_y ds\right|}{\left|\int_S E_x H_y ds\right| + \left|\int_S E_y H_x ds\right|} \quad (1)$$

$$R_{TM} = \frac{\left|\int_S E_y H_x ds\right|}{\left|\int_S E_x H_y ds\right| + \left|\int_S E_y H_x ds\right|} \quad (2)$$

Here, Hx and Hy are magnetic field components in the width direction and the height direction, respectively, and a case is assumed in which integration is performed in the entire plane including the width direction and the height direction. In a waveguide mode in which Ex (Ey) is dominant, Hy (Hx) is dominant, and the integral value of the product between the electric field component and the magnetic field component has a dimension of electricity. Accordingly, $R_{TE}$ ($R_{TM}$) indicates the power ratio of Ex (Ey). In this specification, "Ex (Ey) is dominant" refers to a case in which $R_{TE}$ ($R_{TM}$) is 0.7 or more, and a case of $0.3<R_{TE}<0.7$ ($0.3<R_{TM}<0.7$) is referred to as a hybrid mode. Accordingly, the high-order polarization conversion portion is defined as a portion having a waveguide mode of $0.3<R_{TE}<0.7$ ($0.3<R_{TM}<0.7$) with respect to the traveling direction of light.

Figure 44:
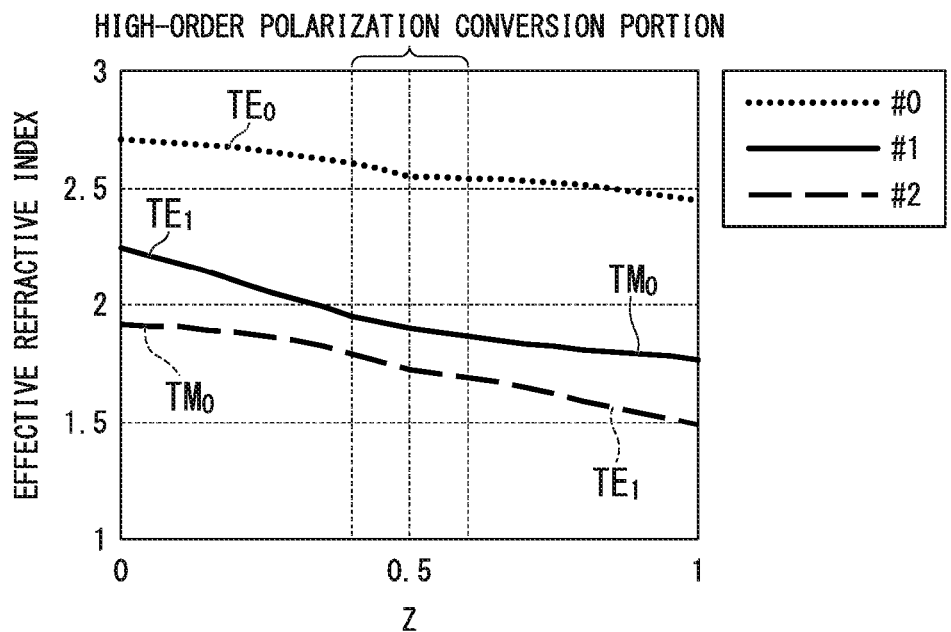
FIG. 44 is a graph showing the effective refractive index of a mode guided through a high-order polarization conversion device of Example 10.
Figure 45:
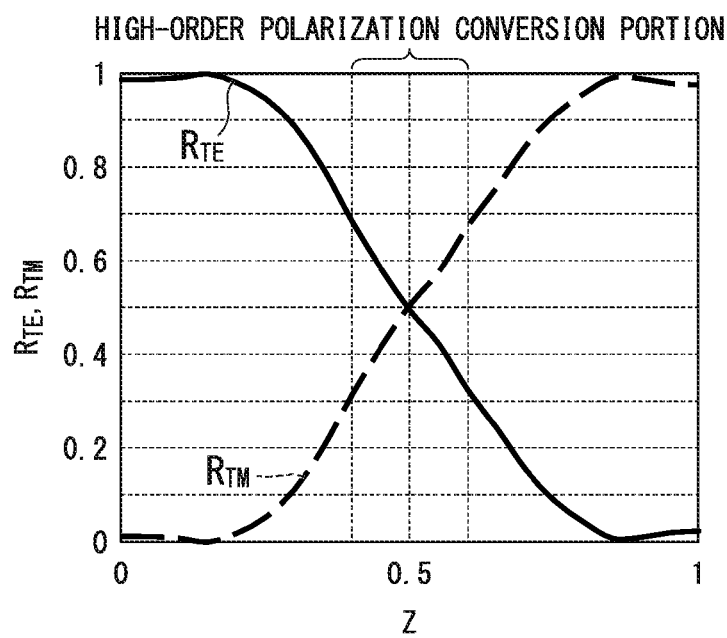
FIG. 45 is a graph showing $R_{TE}$ and $R_{TM}$ of a mode guided through the high-order polarization conversion device of Example 10.

In order to examine the high-order polarization conversion portion shown in FIG. 43A, graphs (called #0, #1, and #2 in descending order of the effective refractive index) of the effective refractive indices of modes guided through the high-order polarization conversion device in Example 10 and $R_{TE}$ and $R_{TM}$ of #1 were calculated for the coordinates (z) in the traveling direction of light. FIGS. 44 and 45 show the results. FIG. 44 shows the effective refractive index in this example, and FIG. 45 shows $R_{TE}$ and $R_{TM}$ in this example. In FIG. 44, #0 is $TE_0$, #1 is $TE_1$ at the start portion 8, and #2 is $TM_0$ at the start portion 8. From FIG. 44, it can be seen that the effective refractive index of #1 monotonically decreases in the traveling direction of light and is efficiently connected to the effective refractive index of the end portion. In FIG. 45, at the start portion, the Ex component is dominant. However, a hybrid mode is generated near the center of the device, and the Ey component is dominant over the subsequent end portion. That is, FIG. 45 shows that high-order polarization conversion is possible by using the two-stage tapered waveguide structure. In addition, since the hybrid mode is in the central portion of the device, FIG. 45 also shows that the high-order polarization conversion portion is located in the central portion.

Comparative Example 2

Figure 46A:
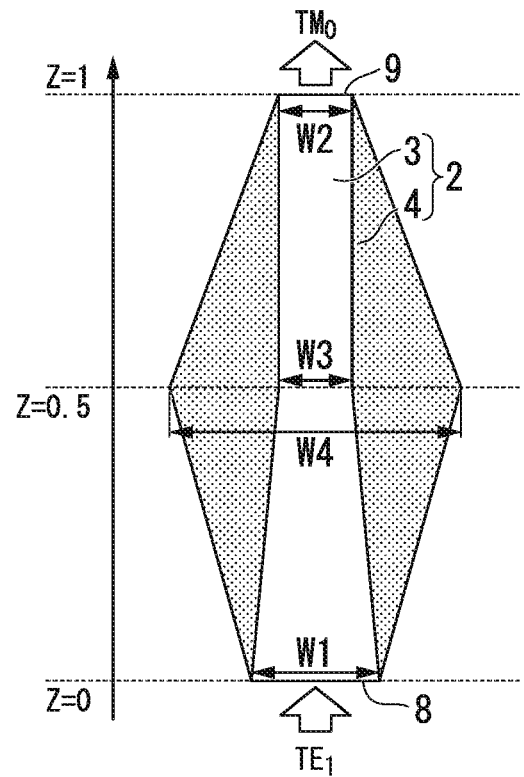
FIG. 46A is a diagram showing the structure of a high-order polarization conversion device of Comparative Example 2.
Figure 46B:
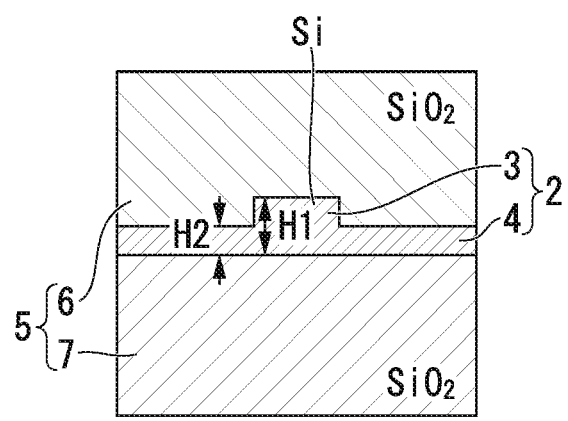
FIG. 46B is a diagram showing the structure of the high-order polarization conversion device of Comparative Example 2.

Subsequently, FIG. 46A shows the structure of a high-order polarization conversion device of Comparative Example 2 for Example 10, and FIG. 46B shows a sectional view in the central portion (Z=0.5). FIGS. 46A and 46B are the same as Example 10 except for the width of the core 2. In Comparative Example 2, the width W1 of the start portion 8 (Z=0) was set to W1=850 nm, the width W2 of the end portion 9 (Z=1) was set to W2=500 nm, and the width of the upper core 3 and the width of the lower core in a central portion (Z=0.5) were set to W3=550 nm and W4=1550 nm, respectively.

Figure 47:
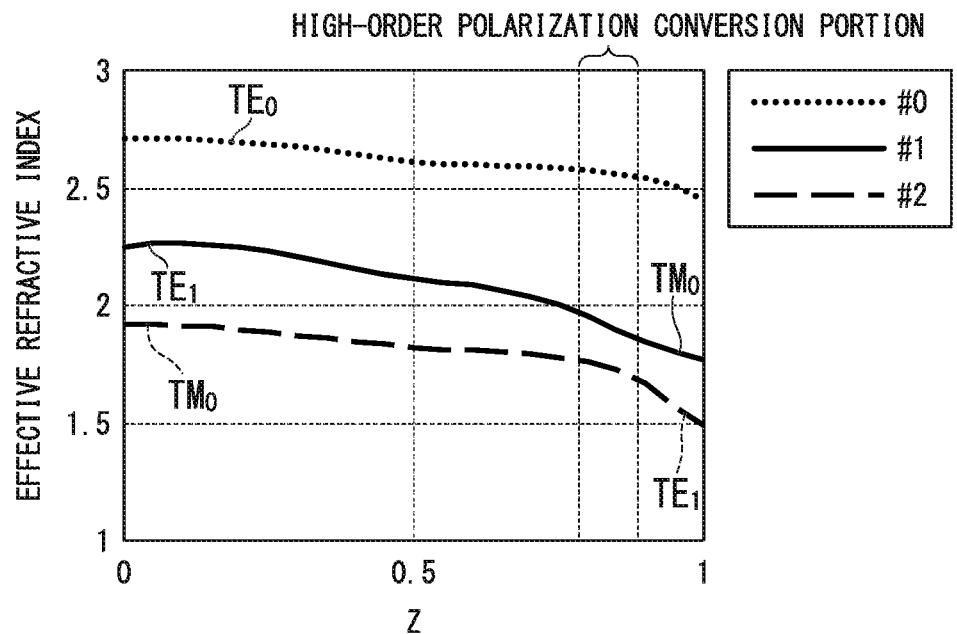
FIG. 47 is a graph showing the effective refractive index of a mode guided through the high-order polarization conversion device of Comparative Example 2.
Figure 48:
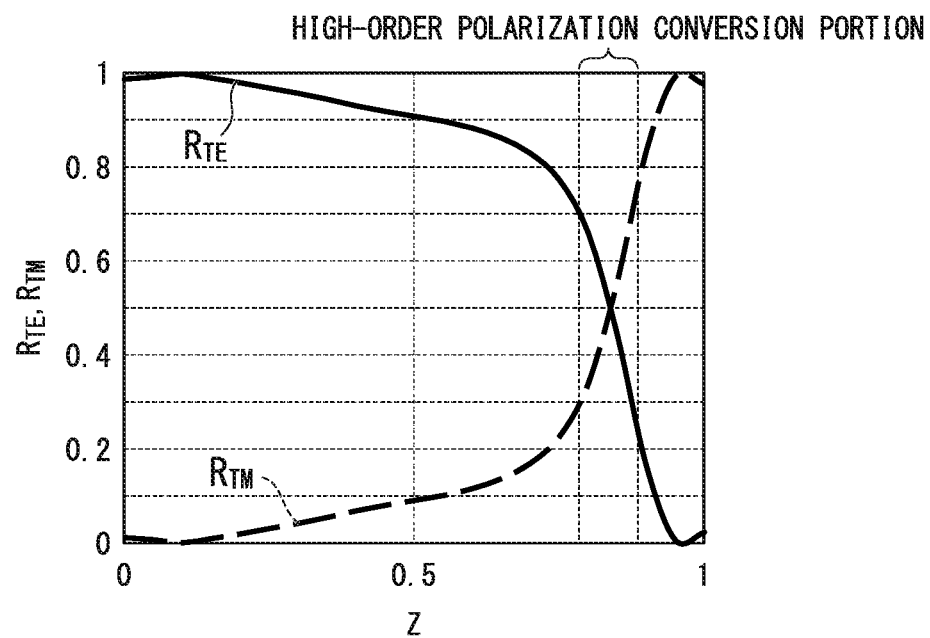
FIG. 48 is a graph showing $R_{TE}$ and $R_{TM}$ of a mode guided through the high-order polarization conversion device of Comparative Example 2.

For the structure of Comparative Example 2, FIG. 47 shows the calculation results of the effective refractive indices (called #0, #1, and #2 in descending order of the effective refractive index) of modes guided through the structure of the example for the coordinates (z) in the traveling direction of light. In addition, FIG. 48 shows the calculation results of $R_{TE}$ and $R_{TM}$ of #1. From FIGS. 47 and 48, it can be seen that the high-order polarization conversion portion is generated on the end portion 9 side compared with Example 10. In addition, it can be seen that the proportion of the high-order polarization conversion portion with respect to the total device length is low. This indicates that the high-order polarization conversion efficiency is low.

Figure 49:
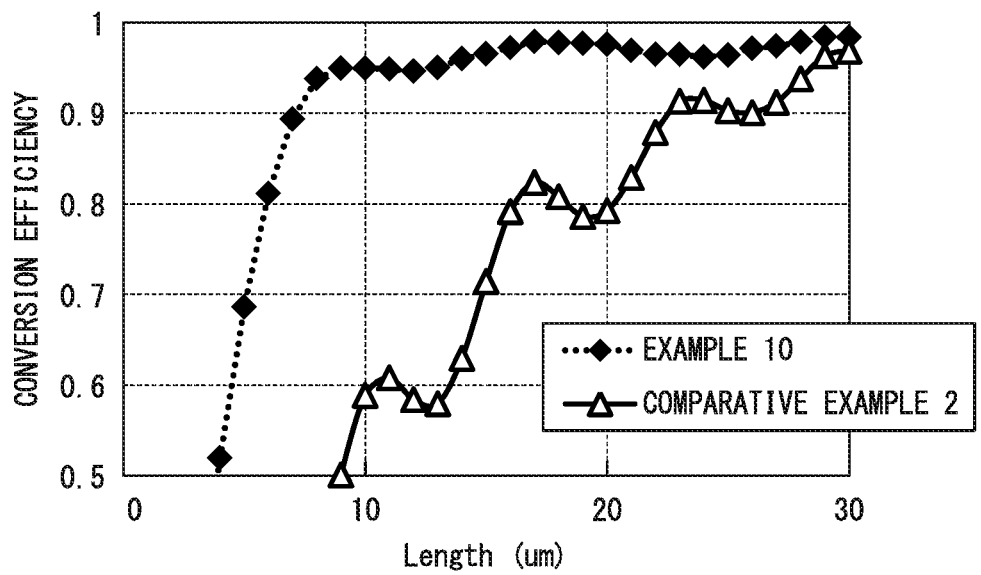
FIG. 49 is a graph showing the conversion efficiency at the time of high-order polarization conversion for the total device length of Example 10 and Comparative Example 2.

FIG. 49 shows specific high-order polarization conversion efficiencies in Example 10 and Comparative Example 2 and the calculation results of the total device length by simulation at that time. The wavelength of guided light was 1550 nm. FIG. 49 shows that it is possible to obtain the high conversion efficiency in a shorter distance in Example 10 when Example 10 and Comparative Example 2 of the same conversion efficiency are compared. For example, the device length required to obtain the conversion efficiency of 90% is 7 µm in Example 10 and 22.5 µm in Comparative Example 2. In this Example 10, it is possible to reduce the device length to ⅓ or less of the device length in Comparative Example 2.

Therefore, in the optical circuit component in which optical elements are integrated on the plane, it is possible to reduce the area to ⅑ or less of the area in Comparative Example 2.

Figure 50:
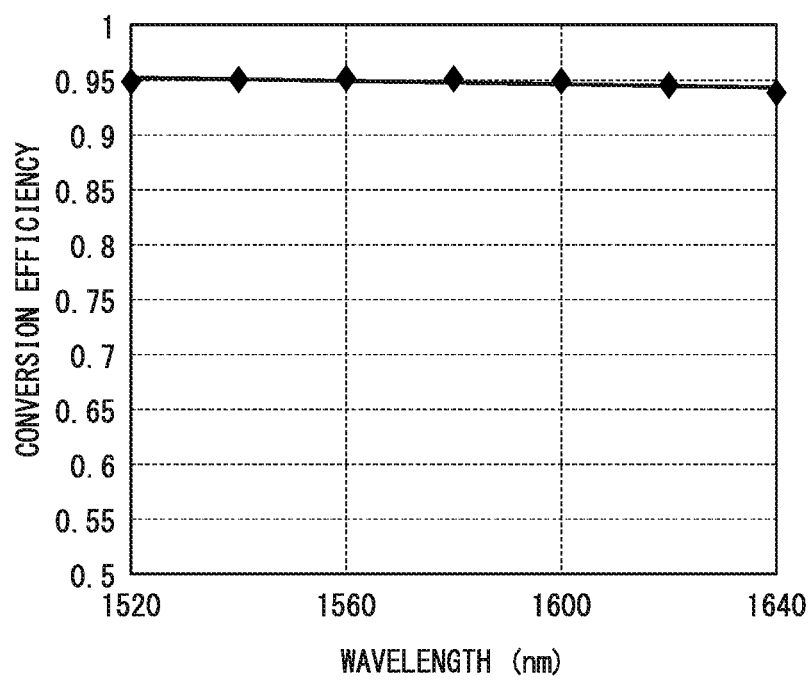
FIG. 50 is a diagram showing the calculation results of the wavelength dependence of the high-order polarization conversion efficiency of the high-order polarization conversion device of Example 10 by simulation.

FIG. 50 shows the calculation results of the wavelength dependence of the conversion efficiency based on simulation in Example 10. The device length was 10 µm. From FIG. 50, in the wavelength range of 1520 nm to 1640 nm, the conversion efficiency of high-order polarization conversion is 94% or more. Accordingly, the conversion efficiency is high over the wide wavelength range. Since this wavelength range includes C-band (1530 nm to 1565 nm) and L-band (1565 nm to 1625 nm) that are used in optical communication, it can be seen that this example can also be applied to wavelength division multiplexing (WDM) communication. The reason why such a wide wavelength band can be obtained is that the high-order polarization conversion portion can be designed at the center of the device as in this example.

Example 11

A device based on Example 10 described above was manufactured and evaluated. The structure of the high-order polarization conversion device of this example is the same as that in Example 10 except for the width and height of the core 2. In this example, the width W1 of the start portion 8 (Z=0) was W1=860 nm, the width W2 of the end portion 9 (Z=1) was W2=500 nm, and the width of the upper core 3 and the width of the lower core in a central portion (Z=0.5) were W3=500 nm and W4=860 nm, respectively. In addition, the height of the core 2 and the height of the lower core 4 were H1=220 nm and H2=95 nm, respectively.

Figure 51:
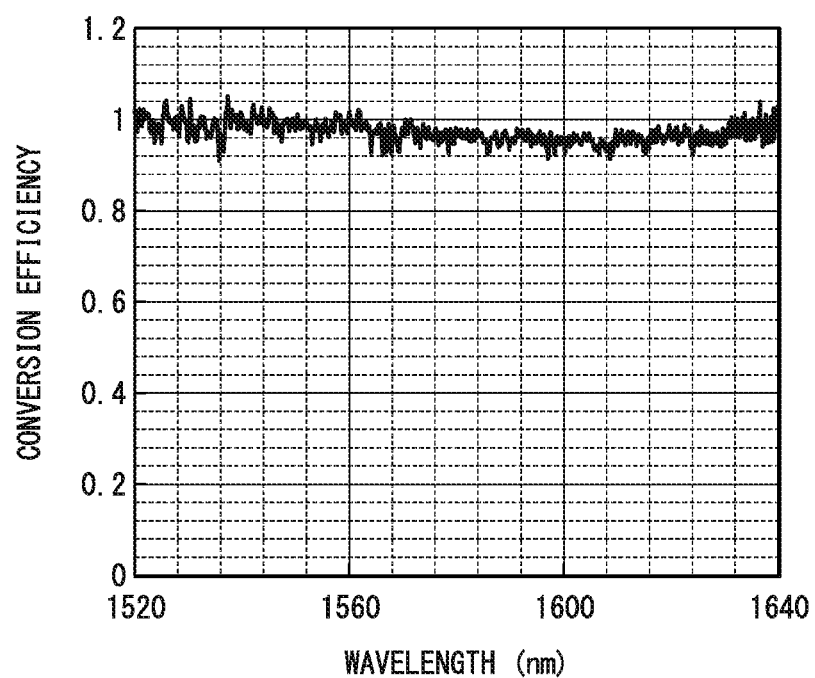
FIG. 51 is a diagram showing the measurement results of the wavelength dependence of the high-order polarization conversion efficiency of a device manufactured in Example 11.

FIG. 51 shows the measurement results. From FIG. 51, it was confirmed that the high conversion efficiency of 92% or more was obtained in the wavelength range of 1520 nm to 1640 nm.

What is claimed is:

1. A high-order polarization conversion device configured of a planar optical waveguide, comprising:
   a substrate;
   a lower clad disposed on the substrate;
   a core comprising a lower core and an upper core, the lower core being disposed on the lower clad and having a fixed height in a rectangular sectional shape, the upper core being formed of the same material as the lower core and having a fixed height in a rectangular sectional shape that is disposed continuously on the lower core; and
   an upper clad that is disposed on the core and the lower clad and is formed of the same material as the lower clad, wherein
   the core forms an optical waveguide through which light is configured to be guided from a start portion, at which a width of the lower core and a width of the upper core are the same, to an end portion, at which the width of the lower core and the width of the upper core are the same, at the start portion and the end portion, both ends of the upper core in a width direction overlap both ends of the lower core in the width direction, and a section of the core is rectangular shaped, at least one of the width of the upper core and the width of the lower core continuously decreases in a guiding direction of the light between the start portion and the end portion, and neither of the width of the upper core nor the width of the lower core is increased from the start portion to the end portion, at the start portion, an effective refractive index of $TE_0$ is larger than an effective refractive index of $TE_1$, and the effective refractive index of the $TE_1$ is larger than an effective refractive index of $TM_0$, at the end portion of the optical waveguide, the effective refractive index of the $TE_0$ is larger than the effective refractive index of the $TM_0$, and the effective refractive index of the $TM_0$ is larger than the effective refractive index of the $TE_1$, in a portion of the optical waveguide between the start portion and the end portion excluding the start portion and the end portion, the core has a vertically asymmetric structure in which the width of the upper core and the width of the lower core are different, and the high-order polarization conversion device performs high-order polarization conversion between $TE_1$ of the start portion and $TM_0$ of the end portion.

2. The high-order polarization conversion device according to claim 1, wherein in the optical waveguide between the start portion and the end portion excluding the start portion and the end portion, the width of the lower core is consistently larger than the width of the upper core, and a lower side of the upper core is consistently included in an upper side of the lower core in a section perpendicular to a direction in which the light is guided.

3. The high-order polarization conversion device according to claim 2, wherein in the optical waveguide between the start portion and the end portion excluding the start portion and the end portion, both ends of the upper core in a width direction are consistently arranged without overlapping both ends of the lower core in the width direction.

4. The high-order polarization conversion device according to claim 2, wherein between the start portion and the end portion, one end of the upper core in a width direction consistently overlaps one end of the lower core in the width direction.

5. The high-order polarization conversion device according to claim 1, wherein at the start portion, a height of the core is 210 nm to 230 nm, and a width of the core is 700 nm or more, and at the end portion, the height of the core is 210 nm to 230 nm, and the width of the core is 620 nm or less.

6. The high-order polarization conversion device according to claim 1, wherein the lower core and the upper core are formed of Si, and the lower clad and the upper clad are formed of $SiO_2$.

7. The high-order polarization conversion device according to claim 1, wherein the width of the upper core decreases from the start portion to an intermediate portion and is fixed from the intermediate portion to the end portion, and the width of the lower core is fixed from the start portion to the intermediate portion and decreases from the intermediate portion to the end portion.

8. An optical waveguide device, comprising:

the high-order polarization conversion device according to claim 1; and a directional coupler configured to include a first optical waveguide, to which the high-order polarization conversion device is not connected, and a second optical waveguide connected to the start portion of the high-order polarization conversion device, wherein $TE_0$ is guided through the first optical waveguide, $TE_1$ is guided through the second optical waveguide, and $TE_0$ of the first optical waveguide is configured to be coupled to $TE_1$ of the second optical waveguide.

9. The optical waveguide device according to claim 8, wherein a difference between an effective refractive index of $TE_0$ of the first optical waveguide and an effective refractive index of $TE_0$ of the second optical waveguide is 0.2 or more.

10. A DP-QPSK modulator comprising the optical waveguide device according to claim 8.

* * * * *